(12) United States Patent
Oh

(10) Patent No.: US 8,737,348 B2
(45) Date of Patent: *May 27, 2014

(54) MOBILE STATION APPARATUS, BASE STATION APPARATUS, WIRELESS COMMUNICATIONS SYSTEM, COMMUNICATIONS CONTROL METHOD, COMMUNICATIONS CONTROL PROGRAM, AND PROCESSOR

(75) Inventor: Wahoh Oh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/581,246

(22) PCT Filed: Feb. 16, 2011

(86) PCT No.: PCT/JP2011/053240
§ 371 (c)(1),
(2), (4) Date: Aug. 24, 2012

(87) PCT Pub. No.: WO2011/105261
PCT Pub. Date: Sep. 1, 2011

(65) Prior Publication Data
US 2012/0322455 A1    Dec. 20, 2012

(30) Foreign Application Priority Data
Feb. 26, 2010    (JP) .................. P2010-042810

(51) Int. Cl.
*H04W 72/04* (2009.01)
*H04B 7/208* (2006.01)
*H04J 3/16* (2006.01)

(52) U.S. Cl.
USPC ........... 370/330; 370/344; 370/345; 370/437; 370/281; 370/252; 455/450; 455/452.2; 455/509

(58) Field of Classification Search
None
See application file for complete search history.

(56) References Cited

U.S. PATENT DOCUMENTS

| 6,907,250 B2 | 6/2005 | Ishikawa et al. | |
| 7,961,700 B2 * | 6/2011 | Malladi et al. | 370/345 |
| 8,311,060 B2 * | 11/2012 | Chen et al. | 370/473 |

(Continued)

FOREIGN PATENT DOCUMENTS

| WO | 2006/046307 A1 | 5/2006 |
| WO | 2008/056425 A1 | 5/2008 |
| WO | 2009/119834 A1 | 10/2009 |
| WO | WO 2010/005233 A2 | 1/2010 |

OTHER PUBLICATIONS

3GPP TR36.814 V1.5.0(Nov. 2009), Further advancements for E-UTRA Physical layer aspects, http://www.3gpp.org/ftp/Specs/html-in_fo/36814.htm.

(Continued)

*Primary Examiner* — Candal Elpenord
(74) *Attorney, Agent, or Firm* — Birch, Stewart, Kolasch & Birch, LLP

(57) ABSTRACT

An ASN coding unit of a mobile station apparatus generates mobile station component carrier capability information including information that defines a component carrier that supported by communication with a base station apparatus. A transceiver device transmits, to the base station apparatus, mobile station component carrier capability information. A control unit controls a communication with a base station apparatus, the control being made by using a component carrier allocated by a base station apparatus, the allocation being made based on mobile station component carrier capability information.

12 Claims, 31 Drawing Sheets

(56) References Cited

U.S. PATENT DOCUMENTS

| | | | |
|---|---|---|---|
| 8,489,105 B2* | 7/2013 | Choi | 455/452.1 |
| 2007/0117570 A1* | 5/2007 | Noh et al. | 455/452.2 |
| 2007/0223611 A1 | 9/2007 | Ode et al. | |
| 2008/0075187 A1 | 3/2008 | Sutskover | |
| 2009/0210766 A1* | 8/2009 | Katayama et al. | 714/748 |
| 2009/0213806 A1 | 8/2009 | Ode | |
| 2010/0020757 A1* | 1/2010 | Walton et al. | 370/329 |
| 2010/0050034 A1 | 2/2010 | Che et al. | |
| 2010/0118720 A1* | 5/2010 | Gauvreau et al. | 370/252 |
| 2010/0267394 A1* | 10/2010 | Wu | 455/450 |
| 2010/0271970 A1 | 10/2010 | Pan et al. | |
| 2010/0303011 A1* | 12/2010 | Pan et al. | 370/328 |
| 2011/0051711 A1 | 3/2011 | Kishiyama et al. | |
| 2011/0205976 A1* | 8/2011 | Roessel et al. | 370/329 |
| 2011/0211541 A1 | 9/2011 | Yuk et al. | |
| 2012/0039298 A1 | 2/2012 | Lee et al. | |
| 2013/0201921 A1* | 8/2013 | Chen et al. | 370/329 |

OTHER PUBLICATIONS

3GPP TR36.815 V0.4.0(Nov. 2009), LTE-Advanced feasibility studies in RAN WG4, http:/www.3gpp.org/ftp/Specs/html-info/36815.htm.

3GPP TR36.913 V9.0.0 (Dec. 2009), Requirements for Further Advancements for E-UTRA, http://www.3gpp.org/ftp/Specs/html-info/36913.htm.

3GPP TS 36.101 V8.8.0 (Dec. 2009).

3GPP TS 36.213 V9.0.1 (Dec. 2009).

3GPP TS 36.331 V8.8.0 (Dec. 2009).

Ericsson, R4-090594, 3GPP TSG-RAN WG4 Meeting #50, Athens, Greece, Feb. 9-13, 2009.

LG Electronics, R1-082946, 3GPP TSG RAN WG1 Meeting #54bis, Jeju, Korea Aug. 18-22, 2008.

Motorola, R1-083828, 3GPP TSG RAN WG1 Meeting#54bis, Prague, Czech Replublic, Sep. 29-Oct. 3, 2008.

Nokia, R4-091204, 3GPP TSG-RAN WG4 Meeting #50bis, Seoul, South Korea, Mar. 23-27, 2009.

NTT docomo, T-Mobile Intl., CMCC, Orange, Vodafone, Telecom Italia, R4-091011, 3GPP TSG-RAN WG4 Meeting #50, Athens, Greece, Feb. 9, 2009.

U.S. Cellular Corporation, Alcatel-Lucent, RP-091211, 3GPP TSG RAN Meeting #46, Sanya, P.R. China, Dec. 1-4, 2009.

3GPP TS 36.101, V9.0.0 User Equipment (UE) radio transmission and reception; Jun. 2009, pp. 1-142.

Ericsson, Report of the email discussion [67#24] LTE: RRC Protocol extensions, 3GPP TSG RAN WG2 meeting #67b is R2-095759, Oct. 12, 2009, URL, ftp://ftp.3gpp.org/tsg_ran/WG2_RL2/TSGR2_67bis/Docs/R2-095759.zip.

NTT docomo, Inc.: "Update Views on Support of Wider Bandwidth in LTE-Advanced", R1-083015, 3GPP TSG-RAN1 Meeting #54, Jeju, Korea, Aug. 18-22, 2008, pp. 1-19.

NTT DoCoMo: "Initial Access Procedure for Asymmetric Wider Bandwidth in LTE-Advanced", 3GPP TSG RAN WG1 Meeting #57bis, R1-092802, Jul. 2009, pp. 1-4.

PCT/ISA/210—International Search Report dated Jan. 11, 2011, issued in PCT/JP2010/068474.

Reply to Written Opinion recieved Aug. 17, 2011, issued in PCT/JP2010/068474.

U.S. Notice of Allowance issued in U.S. Appl. No. 13/454,707 on Jul. 31, 2013.

U.S. Office Action issued in U.S. Appl. No. 13/454,707 on Apr. 10, 2013.

U.S. Office Action issued in U.S. Appl. No. 13/454,707 on Oct. 30, 2012.

U.S. Supplemental Notice of Allowability issued in U.S. Appl. No. 13/454,707 on Sep. 5, 2013.

U.S. Notice of Allowance issued in U.S. Appl. No. 13/454,707 on Sep. 30, 2013.

* cited by examiner

FIG. 2

| E-UTRA Operating Band No. | Uplink (UL) operating band BS receive UE transmit $F_{UL\_low} - F_{UL\_high}$ | Downlink (DL) operating band BS transmit UE receive $F_{DL\_low} - F_{DL\_high}$ | Duplex Mode |
|---|---|---|---|
| 1 | 1920 MHz – 1980 MHz | 2110 MHz – 2170 MHz | FDD |
| 2 | 1850 MHz – 1910 MHz | 1930 MHz – 1990 MHz | FDD |
| 3 | 1710 MHz – 1785 MHz | 1805 MHz – 1880 MHz | FDD |
| 4 | 1710 MHz – 1755 MHz | 2110 MHz – 2155 MHz | FDD |
| 5 | 824 MHz – 849 MHz | 869 MHz – 894 MHz | FDD |
| 6 | 830 MHz – 840 MHz | 875 MHz – 885 MHz | FDD |
| 7 | 2500 MHz – 2570 MHz | 2620 MHz – 2690 MHz | FDD |
| 8 | 880 MHz – 915 MHz | 925 MHz – 960 MHz | FDD |
| 9 | 1749.9 MHz – 1784.9 MHz | 1844.9 MHz – 1879.9 MHz | FDD |
| 10 | 1710 MHz – 1770 MHz | 2110 MHz – 2170 MHz | FDD |
| 11 | 1427.9 MHz – 1447.9 MHz | 1475.9 MHz – 1495.9 MHz | FDD |
| 12 | 698 MHz – 716 MHz | 728 MHz – 746 MHz | FDD |
| 13 | 777 MHz – 787 MHz | 746 MHz – 756 MHz | FDD |
| 14 | 788 MHz – 798 MHz | 758 MHz – 768 MHz | FDD |
| 15 | Reserved | Reserved | FDD |
| 16 | Reserved | Reserved | FDD |
| 17 | 704 MHz – 716 MHz | 734 MHz – 746 MHz | FDD |
| 18 | 815 MHz – 830 MHz | 860 MHz – 875 MHz | FDD |
| 19 | 830 MHz – 845 MHz | 875 MHz – 890 MHz | FDD |
| 20 | 832 MHz – 862 MHz | 791 MHz – 821 MHz | FDD |
| 21 | 1447.9 MHz – 1462.9 MHz | 1495.9 MHz – 1510.9 MHz | FDD |
| 22 | 3410 MHz – 3500 MHz | 3510 MHz – 3600 MHz | FDD |
| ... | | | |
| 33 | 1900 MHz – 1920 MHz | 1900 MHz – 1920 MHz | TDD |
| 34 | 2010 MHz – 2025 MHz | 2010 MHz – 2025 MHz | TDD |
| 35 | 1850 MHz – 1910 MHz | 1850 MHz – 1910 MHz | TDD |
| 36 | 1930 MHz – 1990 MHz | 1930 MHz – 1990 MHz | TDD |
| 37 | 1910 MHz – 1930 MHz | 1910 MHz – 1930 MHz | TDD |
| 38 | 2570 MHz – 2620 MHz | 2570 MHz – 2620 MHz | TDD |
| 39 | 1880 MHz – 1920 MHz | 1880 MHz – 1920 MHz | TDD |
| 40 | 2300 MHz – 2400 MHz | 2300 MHz – 2400 MHz | TDD |
| 41 | 3400 MHz – 3600 MHz | 3400 MHz – 3600 MHz | TDD |

FIG. 3

| Scenario No. | Deployment Scenario | Transmission BWs of LTE-A carriers | No. of LTE-A component carriers | Bands for LTE-A carriers | Duplex modes |
|---|---|---|---|---|---|
| 1 | Single-band contiguous spec. alloc. @ 3.5GHz band for FDD | UL: 40 MHz<br>DL: 80 MHz | UL: Contiguous 2x20 MHz CCs<br>DL: Contiguous 4x20 MHz CCs | 3.5 GHz band | FDD |
| 2 | Single-band contiguous spec. alloc. @ Band 40 for TDD | 100 MHz | Contiguous 5x20 MHz CCs | Band 40 (2.3 GHz) | TDD |
| 3 | Single-band contiguous spec. alloc. @ 3.5GHz band for TDD | 100 MHz | Contiguous 5x20 MHz CCs | 3.5 GHz band | TDD |
| 4 | Single-band, non-contiguous spec. alloc. @ 3.5GHz band for FDD | UL: 40 MHz<br>DL: 80 MHz | UL: Non-contiguous 20 + 20 MHz CCs<br>DL: Non-contiguous 2x20 + 2x20 MHz CCs | 3.5 GHz band | FDD |
| 5 | Single-band non-contiguous spec. alloc. @ Band 8 for FDD | UL: 10 MHz<br>DL: 10 MHz | UL/DL: Non-contiguous 5 MHz + 5 MHz CCs | Band 8 (900 MHz) | FDD |
| 6 | Single-band non-contiguous spec. alloc. @ Band 38 for TDD | 80 MHz | Non-contiguous 2x20 + 2x20 MHz CCs | Band 38 (2.6 GHz) | TDD |
| 7 | Multi-band non-contiguous spec. alloc. @ Band 1, 3 and 7 for FDD | UL: 40 MHz<br>DL: 40 MHz | UL/DL: Non-contiguous 10 MHz CC@Band 1 + 10 MHz CC@Band 3 + 20 MHz CC@Band 7 | Band 3 (1.8 GHz)<br>Band 1 (2.1 GHz)<br>Band 7 (2.6 GHz) | FDD |
| 8 | Multi-band non-contiguous spec. alloc. @ Band 1 and Band 3 for FDD | 30 MHz | Non-contiguous 1x15 + 1x15 MHz CCs | Band 1 (2.1 GHz)<br>Band 3 (1.8GHz) | FDD |
| 9 | Multi-band non-contiguous spec. alloc. @ 800 MHz band and Band 8 for FDD | UL: 20 MHz<br>DL: 20 MHz | UL/DL: Non-contiguous 10 MHz CC@UHF + 10 MHz CC@Band 8 | 800 MHz band<br>Band 8 (900 MHz) | FDD |
| 10 | Multi-band non-contiguous spec. alloc. @ Band 39, 34, and 40 for TDD | 90 MHz | Non-contiguous 2x20 + 10 + 2x20 MHz CCs | Band 39 (1.8GHz)<br>Band 34 (2.1GHz)<br>Band 40 (2.3GHz) | TDD |
| 11* | Single-band Contiguous spec. alloc. @ Band 7 for FDD | UL: 20 MHz<br>DL: 40 MHz | UL: 1x20 MHz CCs<br>DL: 2x20 MHz CCs | Band 7 (2.6 GHz) | FDD |
| 12 | Multi-band non-contiguous spec. alloc. @ Band 7 and the 3.5 GHz range for FDD | UL: 20 MHz<br>DL: 60 MHz | UL/DL: 20 MHz CCs @ Band 7<br>DL :Non- contiguous 20 + 20 MHz CCs @ 3.5 GHz band | Band 7 (2.6 GHz)<br>3.5 GHz band | FDD |

FIG. 4

| Scenario No. | Description of bandwidth aggregation scenarios | Transmission BWs of LTE-A carriers | No. of LTE-A component carriers | Bands for LTE-A carriers | Duplex modes |
|---|---|---|---|---|---|
| 13 | Multi-band, non-contiguous spectrum allocation @ Band 2 and Band 4 | UL: 10 MHz<br>DL: 10 MHz | UL/DL: Non-contiguous<br>5 MHz CC@Band 2 + 5 MHz CC@Band 4 | Band 2 (1.9 GHz)<br>Band 4 (2.1 GHz) | FDD |
| 14 | Multi-band, non-contiguous spectrum allocation @ Band 2 and Band 5 | UL: 10 MHz<br>DL: 10 MHz | UL/DL: Non-contiguous<br>5 MHz CC@Band 2 + 5 MHz CC@Band 5 | Band 2 (1.9 GHz)<br>Band 5 (850 MHz) | FDD |
| 15 | Multi-band, non-contiguous spectrum allocation @ Band 2 and Band 12 | UL: 10 MHz<br>DL: 10 MHz | UL/DL: Non-contiguous<br>5 MHz CC@Band 2 + 5 MHz CC@Band 12 | Band 2 (1.9 GHz)<br>Band 12<br>(Lower 700 MHz) | FDD |
| 16 | Multi-band, non-contiguous spectrum allocation @ Band 2 and Band 14 | UL: 10 MHz<br>DL: 10 MHz | UL/DL: Non-contiguous<br>5 MHz CC@Band 2 + 5 MHz CC@Band 14 | Band 2 (1.9 GHz)<br>Band 14<br>(Upper 700 MHz) | FDD |
| 17 | Multi-band, non-contiguous spectrum allocation @ Band 4 and Band 5 | UL: 10 MHz<br>DL: 10 MHz | UL/DL: Non-contiguous<br>5 MHz CC@Band 4 + 5 MHz CC@Band 5 | Band 4 (2.1 GHz)<br>Band 5 (850 MHz) | FDD |
| 18 | Multi-band, non-contiguous spectrum allocation @ Band 4 and Band 12 | UL: 10 MHz<br>DL: 10 MHz | UL/DL: Non-contiguous<br>5 MHz CC@Band 4 + 5 MHz CC@Band 12 | Band 4 (2.1 GHz)<br>Band 12<br>(Lower 700 MHz) | FDD |
| 19 | Multi-band, non-contiguous spectrum allocation @ Band 4 and Band 14 | UL: 10 MHz<br>DL: 10 MHz | UL/DL: Non-contiguous<br>5 MHz CC@Band 4 + 5 MHz CC@Band 14 | Band 4 (2.1 GHz)<br>Band 14<br>(Upper 700 MHz) | FDD |
| 20 | Multi-band, non-contiguous spectrum allocation @ Band 5 and Band 12 | UL: 10 MHz<br>DL: 10 MHz | UL/DL: Non-contiguous<br>5 MHz CC@Band 5 + 5 MHz CC@Band 12 | Band 5 (850 MHz)<br>Band 12<br>(Lower 700 MHz) | FDD |
| 21 | Multi-band, non-contiguous spectrum allocation @ Band 5 and Band 14 | UL: 10 MHz<br>DL: 10 MHz | UL/DL: Non-contiguous<br>5 MHz CC@Band 5 + 5 MHz CC@Band 14 | Band 5 (850 MHz)<br>Band 14<br>(Upper 700 MHz) | FDD |
| 22 | Multi-band, non-contiguous spectrum allocation @ Band 12 and Band 14 | UL: 10 MHz<br>DL: 10 MHz | UL/DL: Non-contiguous<br>5 MHz CC@Band 12 + 5 MHz CC@Band 14 | Band 12<br>(Lower 700 MHz)<br>Band 14<br>(Upper 700 MHz) | FDD |

FIG. 10

| WIRELESS PARAMETER | TRANSCEIVER DEVICE ACCOMMODATING SCENARIO #4 | TRANSCEIVER DEVICE ACCOMMODATING SCENARIO #7 | TRANSCEIVER DEVICE ACCOMMODATING SCENARIO #10 |
|---|---|---|---|
| SupportedBandListEUTRA | 22 | 3,1,7 | 39,34,40 |
| SupportedDLCCBWList | 6(20MHz) | 4(10MHz), 6(20MHz) | 6(20MHz), 4(10MHz), 6(20MHz) |
| SupportedDLCCCList | 2 | 1,1,1 | 2,1,2 |
| SupportedDLNCCCList | 2 | 1,1,1 | 1,1,1 |
| SupportedDLCCMIMOList | 1,1,1,1 | 1:2:4 | 1,2:2:4,4 |
| SupportedULCCBWList | 6(20MHz) | 4(10MHz), 6(20MHz) | 6(20MHz), 4(10MHz), 6(20MHz) |
| SupportedULCCCList | 1 | 1,1,1 | 2,1,2 |
| SupportedULNCCCList | 2 | 1,1,1 | 1,1,1 |
| SupportedULCCMIMOList | 1,1 | 1:1:1 | 1,1:1:4,2 |
| UL/DL CC COMBINATION | UL: 20MHz+20MHz<br>DL: 20MHzx2+20MHzx2 | UL: 10MHz+10MHz+20MHz<br>DL: 10MHz+10MHz+20MHz | UL/DL: 20MHzx2+10MHz+20MHzx2 |

FIG. 11

| CC FREQUENCY BANDWIDTH NUMBER | CC FREQUENCY BANDWIDTH [MHZ] |
|---|---|
| 0 | 0 |
| 1 | 1.4 |
| 2 | 3 |
| 3 | 5 |
| 4 | 10 |
| 5 | 15 |
| 6 | 20 |

FIG. 13

```
-- ASN1START
maxCCBWs INTEGER ::=6      --MAXIMUM CC FREQUENCY BANDWIDTH NUMBER
maxCOCCs INTEGER ::=6      --MAXIMUM NUMBER OF CONTIGUOUS CCS
maxNCCCs INTEGER ::=6      --MAXIMUM NUMBER OF NON-CONTIGUOUS CCS
maxMIMOs INTEGER ::=8      --MAXIMUM NUMBER OF MIMO STREAMS
maxBands INTEGER ::=64     --MAXIMUM FREQUENCY BAND NUMBER
maxUEBands INTEGER ::=6    --MAXIMUM NUMBER OF FREQUENCY BAND THAT CAN BE ACCOMMODATED
                             BY THE MOBILE STATION APPARATUS
--MOBILE STATION APPARATUS CC CAPABILITY MESSAGE
UE-CC-Capability ::=SEQUENCE {
   ue-Parameters   UE-Parameters,    --MOBILE STATION APPARATUS WIRELESS PARAMETER
   ...
}
--MOBILE STATION APPARATUS WIRELESS PARAMETER
UE-Parameters ::= SEQUENCE {
     supportedBandListEUTRA          SupportedBandListEUTRA
     supportedDLCCBWList             SupportedDLCCBWList
     supportedDLCOCCList             SupportedDLCOCCList
     supportedDLNCCCList             SupportedDLNCCCList
     supportedDLCCMIMOList              SupportedDLCCMIMOList
     supportedULCCBWList             SupportedULCCBWList
     supportedULCOCCList             SupportedULCOCCList
     supportedULNCCCList             SupportedULNCCCList
     supportedULCCMIMOList              SupportedULCCMIMOList
}
--FREQUENCY BAND NUMBER LIST
SupportedBandListEUTRA ::= SEQUENCE (SIZE (1..maxBands)) OF SupportedBandEUTRA
SupportedBandEUTRA ::=      SEQUENCE {
   bandEUTRA                    INTEGER (1..64),
}
--DOWNLINK CONTIGUOUS CC FREQUENCY BANDWIDTH LIST
SupportedDLCCBWList ::= SEQUENCE (SIZE (1..maxUEBands)) OF SupportedDLCCBW
SupportedDLCCBW ::=         SEQUENCE {
   DLCCBW                       INTEGER (0.. maxCCBWs),
}
--LIST OF NUMBER OF DOWNLINK CONTIGUOUS CS
SupportedDLCOCCList ::= SEQUENCE (SIZE (1..maxUEBands)) OF SupportedDLCOCC
SupportedDLCOCC ::=         SEQUENCE {
   DLCOCC                       INTEGER (0.. maxCOCCs),
}
--LIST OF NUMBER OF DOWNLINK NON-CONTIGUOUS CCS
SupportedDLNCCCList ::= SEQUENCE (SIZE (1..maxUEBands)) OF SupportedDLNCCC
SupportedDLNCCC ::=         SEQUENCE {
   DLNCCC                       INTEGER (0.. maxNCCCs),
}
--LIST OF NUMBER OF DOWNLINK CC MIMO STREAMS
SupportedDLCCMIMOList ::= SEQUENCE (SIZE (1..maxUEBands*maxCOCCs*maxNCCCs))OF SupportedDLCCMIMO
SupportedDLCCMIMO ::=       SEQUENCE {
   DLCCMIMO                     INTEGER (0.. maxMIMOs),
}
--LIST OF UPLINK CONTIGUOUS CC FREQUENCY BANDWIDTHS
SupportedULCCBWList ::= SEQUENCE (SIZE (1..maxUEBands)) OF SupportedULCCBW
SupportedULCCBW ::=         SEQUENCE {
   ULCCBW                       INTEGER (0.. maxCCBWs),
}
--LIST OF NUMBER OF DOWNLINK CC ACCOMMODATING UPLINK CONTIGUOUS CC FREQUENCY BANDWIDTHS
SupportedULCOCCList ::= SEQUENCE (SIZE (1..maxUEBands)) OF SupportedULCOCC
SupportedULCOCC ::=         SEQUENCE {
   ULCOCC                       INTEGER (0.. maxCOCCs),
}
--LIST OF NUMBER OF UPLINK NON-CONTIGUOUS CCS
SupportedULNCCCList ::= SEQUENCE (SIZE (1..maxUEBands)) OF SupportedULNCCC
SupportedULNCCC ::=         SEQUENCE {
   ULNCCC                       INTEGER (0.. maxNCCCs),
}
--LIST OF NUMBER OF UPLINK CC MIMO STREAMS
SupportedULCCMIMOList ::= SEQUENCE (SIZE (1..maxUEBands*maxCOCCs*maxNCCCs))OF SupportedULCCMIMO
SupportedULCCMIMO ::=       SEQUENCE {
   ULCCMIMO                     INTEGER (0.. maxMIMOs),
}
-- ASN1STOP
```

FIG. 14

```
ACTUAL DATA OF THE MOBILE STATION APPARATUS CC CAPABILITY MESSAGE OF MOBILE
STATION APPARATUS A1, WHICH CAN ACCOMMODATE SCENARIO #4 (S4)
UE-CC-Capability {
      UE-Parameters {
            SupportedBandListEUTRA=[41]
            SupportedDLCCBWList=[6],
            SupportedDLCOCCList=[2],
            SupportedDLNCCCList=[2],
            SupportedDLCCMIMOList=[1,1,1],
            SupportedULCCBWList=[6],
            SupportedULCOCCList=[1],
            SupportedULNCCCList=[[2],
            SupportedULCCMIMOList=[1,1]
      }
      ......
}

ACTUAL DATA OF THE MOBILE STATION APPARATUS CC CAPABILITY MESSAGE OF MOBILE
STATION APPARATUS A1, WHICH CAN ACCOMMODATE SCENARIO #7 (S7)
UE-CC-Capability {
      UE-Parameters {
            SupportedBandListEUTRA=[3,1,7]
            SupportedDLCCBWList=[4,4,6],
            SupportedDLCOCCList=[1,1,1],
            SupportedDLNCCCList=[1,1,1],
            SupportedDLCCMIMOList=[1,2,4],
            SupportedULCCBWList=[4,4,6],
            SupportedULCOCCList=[1,1,1],
            SupportedULNCCCList=[[1,1,1],
            SupportedULCCMIMOList=[1,1,1]
      }
      ......
}

ACTUAL DATA OF THE MOBILE STATION APPARATUS CC CAPABILITY MESSAGE OF MOBILE
STATION APPARATUS A1, WHICH CAN ACCOMMODATE SCENARIO #10 (S10)
UE-CC-Capability {
      UE-Parameters {
            SupportedBandListEUTRA=[39,34,40]
            SupportedDLCCBWList=[6,4,6],
            SupportedDLCOCCList=[2,1,2],
            SupportedDLNCCCList=[1,1,1],
            SupportedDLCCMIMOList=[1,2,2,4,4],
            SupportedULCCBWList=[6,4,6],
            SupportedULCOCCList=[2,1,2],
            SupportedULNCCCList=[[1,1,1],
            SupportedULCCMIMOList=[1,1,1,4,2]
      }
      ......
}
```

FIG. 18

```
ACTUAL DATA OF THE MOBILE STATION APPARATUS CC CAPABILITY MESSAGE OF MOBILE
STATION APPARATUS A1, ACCOMMODATING FIG. 17
UE-CC-Capability {
      UE-Parameters {
            SupportedBandListEUTRA=[8, 3, 1]
            SupportedDLCCBWList=[3, 4, 5],
            SupportedDLCOCCList=[1, 1, 2],
            SupportedDLNCCCList=[2, 1, 1],
            SupportedDLCCMIMOList=[2, 2, 1, 4, 4],
            SupportedULCCBWList=[3, 0, 5],
            SupportedULCOCCList=[2, 0, 1],
            SupportedULNCCCList=[1, 0, 1],
            SupportedULCCMIMOList=[1, 1, 0, 2]
      }
      ......
}
```

FIG. 19

| Category | | Category1 | Category2 | Category3 | Category4 | Category5 |
|---|---|---|---|---|---|---|
| Bit rate | DL | 10Mbps | 50Mbps | 100Mbps | 150Mbps | 300Mbps |
| | UL | 5Mbps | 25Mbps | 50Mbps | 50Mbps | 75Mbps |
| Modulation scheme | DL | QPSK, 16QAM, 64QAM | | | | |
| | UL | QPSK, 16QAM | | | | QPSK, 16QAM 64QAM |
| Number of MIMO stream | DL | 1 | 2 | 2 | 2 | 4 |

FIG. 20

| Channel bandwidth BW$_{Channel}$ [MHz] | 1.4 | 3 | 5 | 10 | 15 | 20 |
|---|---|---|---|---|---|---|
| Transmission bandwidth configuration N$_{RB}$ | 6 | 15 | 25 | 50 | 75 | 100 |

FIG. 21

| TBS Index | Channel bandwidth BW$_{Channel}$ [MHz] | | | | | |
|---|---|---|---|---|---|---|
| | 1.4 | 3 | 5 | 10 | 15 | 20 |
| 26 | 4392 | 11064 | 18336 | 36696 | 55056 | 75376 |

FIG. 22

| Scenario No. | UL/DL | Tran. BWs [MHz] | Duplex Mode | 1 Stream BR [kbps] | 2 Stream BR [kbps] | 4 Stream BR [kbps] |
|---|---|---|---|---|---|---|
| 1, 4 | UL | 20x2 | FDD | 150752 | 301504 | 603008 |
|  | DL | 20x4 |  | 301504 | 603008 | 1206016 |
| 2, 3 | UL | 20x5 | TDD | 376800 | 753600 | 1507200 |
|  | DL | 20x5 |  | 376800 | 753600 | 1507200 |
| 6 | UL | 20x4 | TDD | 301504 | 603008 | 1206016 |
|  | DL | 20x4 |  | 301504 | 603008 | 1206016 |
| 7 | UL | 10x2+20 | FDD | 148768 | 297536 | 595072 |
|  | DL | 10x2+20 |  | 148768 | 297536 | 595072 |
| 8 | UL | 15x2 | FDD | 110112 | 220224 | 440448 |
|  | DL | 15x2 |  | 110112 | 220224 | 440448 |
| 9 | UL | 10x2 | FDD | 73392 | 146784 | 293568 |
|  | DL | 10x2 |  | 73392 | 146784 | 293568 |
| 10 | UL | 20x4+10 | TDD | 338200 | 676400 | 1352800 |
|  | DL | 20x4+10 |  | 338200 | 676400 | 1352800 |
| 11 | UL | 20x1 | FDD | 35376 | 70752 | 141504 |
|  | DL | 20x2 |  | 150752 | 301504 | 603008 |
| 12 | UL | 20x1 | FDD | 35376 | 70752 | 141504 |
|  | DL | 20x3 |  | 226128 | 452256 | 904512 |
| 5, 13-22 | UL | 5x2 | FDD | 36672 | 73344 | 146688 |
|  | DL | 5x2 |  | 36672 | 73344 | 146688 |

FIG. 23

| | UL BR [kbps] | DL BR [kbps] | |
|---|---|---|---|
| BR11 | 35376 | 36672 | BR21 |
| | 36672 | 73344 | |
| | 70752 | 73392 | |
| | 73344 | 110112 | |
| BR12 | 73392 | 146688 | |
| | 110112 | 146784 | |
| | 141504 | 148768 | |
| | 146688 | 150752 | BR22 |
| BR13 | 146784 | 220224 | |
| | 148768 | 226128 | |
| | 150752 | 293568 | |
| | 220224 | 297536 | |
| | 293568 | 301504 | BR23 |
| | 297536 | 338200 | |
| | 301504 | 376800 | |
| BR14 | 301504 | 440448 | |
| | 338200 | 452256 | |
| | 376800 | 595072 | |
| | 440448 | 603008 | BR24 |
| | 595072 | 676400 | |
| BR15 | 603008 | 753600 | |
| | 676400 | 904512 | |
| | 753600 | 1206016 | BR25 |
| | 1206016 | 1352800 | |
| | 1352800 | 1507200 | |
| | 1507200 | – | |

FIG. 24

| | Category-6 | Category-7 | Category-8 | Category-9 | Category-10 |
|---|---|---|---|---|---|
| DL BR [kbps] | 36672 | 150752 | 301504 | 603008 | 1206016 |
| UL BR [kbps] | 35376 | 73392 | 146784 | 301504 | 603008 |

FIG. 26

```
— ASN1START
maxCCBWs      INTEGER ::=6   —MAXIMUM CC FREQUENCY BANDWIDTH NUMBER
maxCOCCs      INTEGER ::=6   —MAXIMUM NUMBER OF CONTIGUOUS CCS
maxNCCCs      INTEGER ::=6   —MAXIMUM NUMBER OF NON-CONTIGUOUS CCS
maxMIMOs      INTEGER ::=8   —MAXIMUM NUMBER OF MIMO STREAMS
maxBands      INTEGER ::=64  —MAXIMUM FREQUENCY BAND NUMBER
maxUEBands    INTEGER ::=6   —MAXIMUM NUMBER OF FREQUENCY BAND THAT CAN BE ACCOMMODATED
                              BY THE MOBILE STATION APPARATUS
maxUECategory INTEGER ::=10  —MAXIMUM NUMBER OF CATEGORIES —MOBILE STATION APPARATUS CC CAPABILITY MESSAGE
UE-CC-Capability ::=SEQUENCE {
   UE-Category    INTEGER (1.. maxUECategory),  —MOBILE STATION APPARATUS CATEGORIES
   ue-Parameters  UE-Parameters,                —MOBILE STATION APPARATUS WIRELESS PARAMETERS
     ...
}
—MOBILE STATION APPARATUS WIRELESS PARAMETER (OMITTED)
— ASN1STOP
```

FIG. 27

```
ACTUAL DATA OF THE MOBILE STATION APPARATUS CC CAPABILITY MESSAGE OF MOBILE
STATION APPARATUS A2, WHICH CAN ACCOMMODATE SCENARIO #5, #8 (S5, S8)
UE-CC-Capability {
      UE-Category=[8],
      UE-Parameters {
            SupportedBandListEUTRA=[8, 3, 1]
            SupportedDLCCBWList=[3, 5, 5],
            SupportedDLCOCCList=[1, 1, 1],
            SupportedDLNCCCList=[2, 1, 1],
            SupportedDLCCMIMOList=[2, 2, 4, 4],
            SupportedULCCBWList=[3, 5, 5],
            SupportedULCOCCList=[1, 1, 1],
            SupportedULNCCCList=[[2, 1, 1],
            SupportedULCCMIMOList=[1, 1, 2, 2]
      }
      ......
}
```

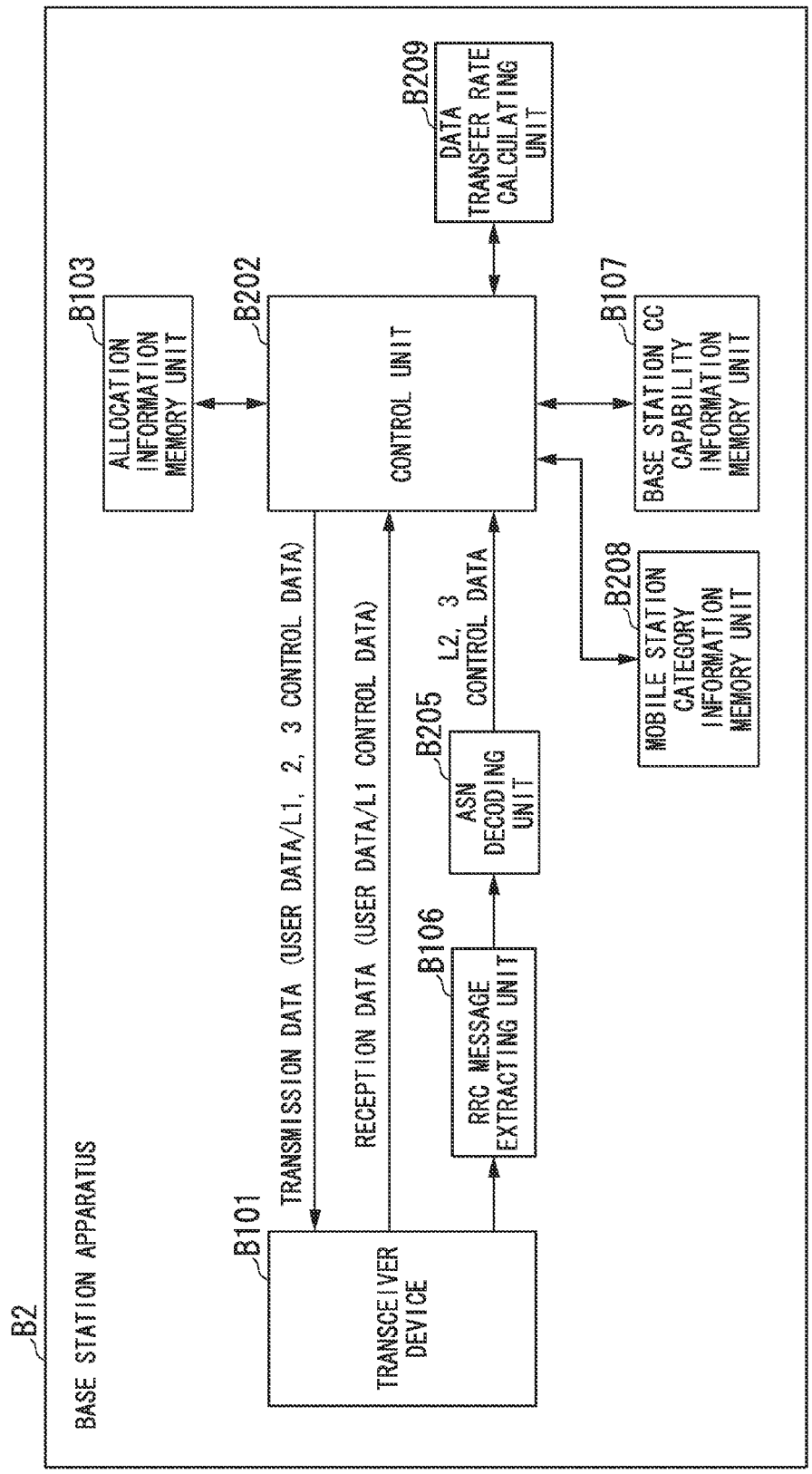

FIG. 29

```
ACTUAL DATA OF THE MOBILE STATION APPARATUS CC CAPABILITY MESSAGE OF MOBILE
STATION APPARATUS A2, ACCOMMODATING FIG. 17
UE-CC-Capability {
      UE-Category=[8],
      UE-Parameters {
            SupportedBandListEUTRA=[8,3,1]
            SupportedDLCCBWList=[3,4,5],
            SupportedDLCOCCList=[1,1,2],
            SupportedDLNCCCList=[2,1,1],
            SupportedDLCCMIMOList=[2,2,1,4,4],
            SupportedULCCBWList=[3,0,5],
            SupportedULCOCCList=[2,0,1],
            SupportedULNCCCList=[1,0,1],
            SupportedULCCMIMOList=[1,1,0,2]
      }
      ......
}
```

FIG. 31

```
ACTUAL DATA OF THE MOBILE STATION APPARATUS CC CAPABILITY MESSAGE OF MOBILE
STATION APPARATUS, WHICH CAN ACCOMMODATE SCENARIO #5, #8 (S5, S8)
UE-CC-Capability {
    UE-Category=[8],
    UE-Parameters {
        SupportedBandListEUTRA=[8, 3, 1]
        SupportedDLCCBWList=[3, 5, 5],
        SupportedDLCOCCList=[1, 1, 1],
        SupportedDLNCCCList=[2, 1, 1],
        SupportedULCCBWList=[3, 5, 5],
        SupportedULCOCCList=[1, 1, 1],
        SupportedULNCCCList=[[2, 1, 1]],
    }
    ......
}
```

FIG. 32

```
ACTUAL DATA OF THE MOBILE STATION APPARATUS CC CAPABILITY MESSAGE OF MOBILE
STATION APPARATUS A3, ACCOMMODATING FIG. 17
UE-CC-Capability {
    UE-Category=[8],
    UE-Parameters {
        SupportedBandListEUTRA=[8, 3, 1]
        SupportedDLCCBWList=[3, 4, 5],
        SupportedDLCOCCList=[1, 1, 2],
        SupportedDLNCCCList=[2, 1, 1],
        SupportedULCCBWList=[3, 0, 5],
        SupportedULCOCCList=[2, 0, 1],
        SupportedULNCCCList=[1, 0, 1],
    }
    ......
}
```

FIG. 35

```
-- ASN1START
maxUEScenarios   INTEGER ::=3    --MAXIMUM NUMBER OF SCENARIOS THAT CAN BE
                                   ACCOMMODATED BY THE MOBILE STATION APPARATUS
maxScenarios     INTEGER ::=22   --MAXIMUM SCENARIO NUMBER
maxUECategory    INTEGER ::=10   --MAXIMUM NUMBER OF CATEGORIES --MOBILE STATION APPARATUS CC CAPABILITY MESSAGE
UE-CC-Capability ::=SEQUENCE {
  UE-Category    INTEGER (1.. maxUECategory), --MOBILE STATION APPARATUS CATEGORIES
  ue-Parameters  UE-Parameters,               --MOBILE STATION APPARATUS WIRELESS PARAMETERS
  ...
}
--MOBILE STATION APPARATUS WIRELESS PARAMETERS
UE-Parameters ::= SEQUENCE {
    supportedScenarioList         SupportedScenarioList
}
--MOBILE STATION APPARATUS SCENARIO LIST
SupportedScenarioList ::= SEQUENCE (SIZE (1..maxUEScenarios)) OF
SupportedScenario
SupportedScenario ::= SEQUENCE {
    Scenario       INTEGER (1.. maxScenarios),
}

-- ASN1STOP
```

FIG. 36

```
ACTUAL DATA OF THE MOBILE STATION APPARATUS CC CAPABILITY MESSAGE OF MOBILE
STATION APPARATUS, WHICH CAN ACCOMMODATE SCENARIOS #5, #8 (S5, S8)
UE-CC-Capability {
      UE-Category=[8],
      UE-Parameters {
            SupportedSecnarioList=[5,8]
      }
      ......
}
```

FIG. 38

| Scenario No. | Supported BandListEUTRA | Supported DLCCBWList | Supported DLCCCCList | Supported DLNCBWList | Supported ULCCBWList | Supported ULCCCCList | Supported ULNCBWList | Duplex modes |
|---|---|---|---|---|---|---|---|---|
| 1 | 41 | 6 | 4 | 1 | 6 | 2 | 1 | FDD |
| 2 | 40 | 6 | 5 | 1 | 6 | 5 | 1 | TDD |
| 3 | 41 | 6 | 5 | 1 | 6 | 5 | 1 | TDD |
| 4 | 41 | 6 | 2 | 2 | 6 | 1 | 2 | FDD |
| 5 | 8 | 3 | 1 | 2 | 3 | 1 | 2 | FDD |
| 6 | 38 | 6 | 1 | 2 | 6 | 1 | 2 | TDD |
| 7 | 3, 1, 7 | 4, 4, 6 | 1, 1, 1 | 1, 1, 1 | 4, 4, 6 | 1, 1, 1 | 1, 1, 1 | FDD |
| 8 | 3, 1 | 5, 5 | 1, 1 | 1, 1 | 5, 5 | 1, 1 | 1, 1 | FDD |
| 9 | UHF, 8 | 4, 4 | 1, 1 | 1, 1 | 4, 4 | 1, 1 | 1, 1 | FDD |
| 10 | 39, 34, 40 | 6, 4, 6 | 1, 1, 1 | 2, 1, 2 | 6, 4, 6 | 1, 1, 1 | 2, 1, 2 | TDD |
| 11 | 7 | 6 | 2 | 1 | 4 | 1 | 1 | FDD |
| 12 | 7, 41 | 6, 6 | 1, 1 | 1, 2 | 6, 0 | 1, 0 | 1, 0 | FDD |
| 13 | 4, 2 | 3, 3 | 1, 1 | 2, 2 | 3, 3 | 1, 1 | 2, 2 | FDD |
| 14 | 5, 2 | 3, 3 | 1, 1 | 2, 2 | 3, 3 | 1, 1 | 2, 2 | FDD |
| 15 | 12, 2 | 3, 3 | 1, 1 | 2, 2 | 3, 3 | 1, 1 | 2, 2 | FDD |
| 16 | 14, 2 | 3, 3 | 1, 1 | 2, 2 | 3, 3 | 1, 1 | 2, 2 | FDD |
| 17 | 5, 4 | 3, 3 | 1, 1 | 2, 2 | 3, 3 | 1, 1 | 2, 2 | FDD |
| 18 | 12, 4 | 3, 3 | 1, 1 | 2, 2 | 3, 3 | 1, 1 | 2, 2 | FDD |
| 19 | 14, 4 | 3, 3 | 1, 1 | 2, 2 | 3, 3 | 1, 1 | 2, 2 | FDD |
| 20 | 12, 5 | 3, 3 | 1, 1 | 2, 2 | 3, 3 | 1, 1 | 2, 2 | FDD |
| 21 | 14, 5 | 3, 3 | 1, 1 | 2, 2 | 3, 3 | 1, 1 | 2, 2 | FDD |
| 22 | 12, 14 | 3, 3 | 1, 1 | 2, 2 | 3, 3 | 1, 1 | 2, 2 | FDD |
| ... | | | | | | | | |
| 32 | | | | | | | | |

US 8,737,348 B2

MOBILE STATION APPARATUS, BASE STATION APPARATUS, WIRELESS COMMUNICATIONS SYSTEM, COMMUNICATIONS CONTROL METHOD, COMMUNICATIONS CONTROL PROGRAM, AND PROCESSOR

TECHNICAL FIELD

The present invention relates to a mobile station apparatus, a base station apparatus, a wireless communications system, a communications control method, a communications control program, and a processor.

The subject application claims priority based on the patent application No. 2010-042810 filed in Japan on Feb. 26, 2010 and incorporates by reference herein the content thereof.

BACKGROUND ART

3GPP (3rd Generation Partnership Project) is a standardization project that studies and establishes the specifications for a cellular mobile communication system based on a network that develops GSM (Global System for Mobile Communications) and W-CDMA (Wideband-Code Division Multiple Access). In 3GPP, W-CDMA has been standardized as the 3rd generation cellular mobile communication system, and is successively being put into service. HSPA (High-Speed Packet Access), which is a further improvement in communication speed, has also been standardized, and is beginning to come into service. 3GPP is studying EUTRA (Evolved Universal Terrestrial Radio Access), which is an evolved third-generation wireless access technology, and Release 8 of the specifications was completed at the end of 2008. Additionally, a study of Advanced EUTRA (also referred to as LTE-Advanced or LTE-A), which is an extension of EUTRA, is progressing (Non-Patent Document 1).

In LTE-A, carrier aggregation (referred to hereinafter as CA) has been proposed as a technology for enabling high-speed data transfer equivalent to or exceeding IMT-Advanced while maintaining compatibility with EUTRA. CA technology is technology whereby a mobile station apparatus simultaneously receives signals using multiple downlink component carriers (hereinafter, referred as CCs; for example, a 20-MHz bandwidth) having either contiguous or non-contiguous frequency bands, so as to emulate the formation of a carrier signal with a broadband frequency bandwidth (for example, 100 MHz using five CCs) and achieve high-speed downlink data transfer. In the same manner, using CA technology, the base station apparatus simultaneously receives multiple uplink contiguous or non-contiguous CCs (having, for example, a bandwidth of 20 MHz) from a mobile station apparatus, so as to emulate the formation of a carrier signal having a broadband frequency bandwidth (for example 40 MHz with two CCs) and achieve high-speed uplink data transfer.

<The Relationship Between the Adoption of CA Technology and Combination of Mobile Station Apparatus Configurations>

The combination of CCs in CA technology is dependent upon diverse variables, such as the overall number of uplink CCs (for example, two), the overall number of downlink CCs (for example, five), the number of frequency bands (for example, three) (for example, 700-MHz band, 2-GHz band, 3-GHz band, or the like), contiguous or non-contiguous CCs, and the transfer mode (for example, FDD, TDD).

FIG. 39 is a simplified drawing that shows a combination of CCs in the conventional art. In this drawing, the horizontal axis indicates frequency. This drawing also shows the case of two frequency bands, frequency band 1 (2-GHz band) and frequency band 2 (3-GHz band). What is shown in this drawing are the six cases divided vertically, of which cases 1 to 3 show the case of the FDD (frequency division duplex) transmission mode and the cases 4 to 6 shows the TDD (time division duplex) transmission mode.

Case 1 in FIG. 39 shows the combination of CCs if three contiguous CCs (center frequencies of f1_R1, f1_R2, and f1_R3) are selected within the band 12 (downlink) and two contiguous CCs (center frequencies of f1_T1 and f1_T2) are selected within the band 11 (uplink) in the same frequency band 1.

Case 2 shows the combination of CCs if two non-contiguous CCs (center frequencies of f1_R1 and f1_R3, the Intra CA case) are selected within the band 12 and two non-contiguous CCs (center frequencies of f1_T1 and f1_T3) are selected within the band 11 in the same frequency band 1.

Case 3 shows the combination of CCs if a CC (center frequency of f1_R1) is selected within the band 12 in the frequency band 1, a CC (center frequency of f2_R1) is selected within band 22 in the frequency band 2, and a CC (center frequency of f1_T1) is selected in band 1 in the frequency band 1. The case 3 shows two non-contiguous CCs (the Inter CA case) selected in different frequency bands 1 and 2 for downlink communication, and one CC selected for downlink communication.

Cases 4, 5, and 6 each correspond to the cases 1, 2, and 3. For example, in the case 4, the combination of CCs shown is for the case using band 12 in downlink and uplink communication, and selecting the CCs depending on the time slot. The case 4 shows the combination of CCs in the case of selecting three contiguous CCs (center frequencies of f1_1, f1_2, and f1_3) in band 12 for downlink communication, and selecting two contiguous CCs (center frequencies of f1_1 and f1_2) for uplink communication.

For non-contiguous CCs in the same frequency band (for example, those having center frequencies of f1_R1 and f1_R3 in FIG. 39), there is the case in which multiple base station apparatuses transmit a transmitted signal in synchronization with a frame or the like (referred to as synchronization between base stations), the case of an asynchronous condition in which each base station transmits a transmitted signal independently, and the case in which, although synchronization is done between base stations, for example, propagation path delay occurs, so that the frame timing of the OFDM (orthogonal frequency division multiplexing) signal is offset, causing an asynchronous condition.

With regard to communication using a base station apparatus with contiguous CCs in the same frequency band (for example, center frequencies of f1_R1 and f1_R2), various technologies have been proposed in consideration of elements such as backward compatibility with LTE systems, the 100-kHz UMTS (Universal Mobile Telecommunications System) wireless channel raster, guard bands between CCs, guard bands at both ends of contiguous CCs, and frequency utilization efficiency and the like (for example, Non-Patent Document 1). With contiguous CCs, however, it is necessary to have a separate baseband processing circuit in the transmitting and receiving circuit to maintain compatibility with LTE systems because the guard bands between CCs are not integral multiples of the 15-kHz subcarrier bandwidth.

In order to accommodate the various cases noted above, the constitution of the mobile station apparatus is dependent upon such things as: (a) the number of frequency bands; (b) the total number of uplink and downlink CCs; (c) contiguous or non-contiguous CCs (Intra CA or Inter CA); (d) the wireless transmission mode; (e) synchronous or asynchronous between downlink CCs or between base station apparatuses; (f) various CC bandwidths (for example, 1.4 MHz, 3 MHz, 5 MHz, 10 MHz, 15 MHz, and 20 MHz); and (g) the bandwidth (for example, 100 MHz) of multiple contiguous CCs having an OFDM subcarrier bandwidth of 15 MHz (for example, Non-Patent Documents 2 and 3).

<The Relationship Between the Adoption of Other Technologies in LTE-A and Combination of Mobile Station Apparatus Configurations>

The conditions required by LTE-A (Non-Patent Document 4) for the case in which a mobile station apparatus is moving at high speed in the case of a 100-Mbps downlink and a 75-Mbps uplink, are a data transfer rate of 1000 Mbps for the downlink and of 500 Mbps for the uplink. To achieve this, other than adopting CA technology, technology for achieving high-order MIMO will be adopted. For example, with 8×8 MIMO (in which there are eight base station apparatus transmitting antennas, eight mobile station apparatus receiving antennas, the number of MIMO streams or the number of ranks being referred to hereafter as a rank of 8) for the downlink, a data transfer rate of 1000 Mbps is achieved with a 100-MHz transmission bandwidth. With 4×4 MIMO (hereinafter referred to as the number of MIMO streams or the number of ranks of 4) for the uplink, a 600-Mbps data transfer rate is achieved with a 40-MHz transmission bandwidth. Also, to expand the cell edge data transfer rate and the cell coverage area, technology for coordinated communication (CoMP: coordinated multipoint) between base station apparatuses and technology for uplink transmitting diversity are introduced.

The constitution of the mobile station apparatus is, therefore, dependent upon (h) the downlink and uplink MIMO system, (i) the coordinated communication CoMP between base stations, and (j) the uplink transmitting diversity system and the like.

<The Relationship Between the Carrier Operating Condition and the Combination of Mobile Station Apparatus Configurations>

Frequency allocations with respect to IMT-Advanced were determined at the 2007 World Radiocommunication Conference WRC-07. However, the current IMT bands (Non-Patent Documents 4 and 5) are not all bands common to all countries, each mobile telephone service operator operating under the frequency allocation of its own country. Depending upon the frequency allocation situation in each country, the mobile telephone service operators use different transmission modes (TDD and FDD). Blending of the different transmission modes (for example, mixed coexistence of different transmission modes between macrocells and microcells, indoor and outdoor areas, and at proximity to and at the edge of cells) has been proposed.

LTE-A mobile telephone service operators, for example as described in Non-Patent Document 5, can select from the EUTRA system frequency band numbers 1 to 41 (E-UTRA operating band numbers; hereinafter referred to a frequency band numbers) that are indicated by the EUTRA system frequency bands (E-UTRA operating bands). Also, for example, each of the mobile telephone service operators participating in the 3GPP standards organization have been studying various frequency operation priority scenarios (deployment scenarios with the highest priority for the feasibility study). Additionally, for example, US mobile telephone service operators have been proposing frequency operating priority scenarios (US cellular bandwidth aggregation scenarios).

Therefore, considering (k) the frequency allocation situation of each mobile telephone service operator and (l) domestic and overseas roaming, the configuration of the mobile station apparatus becomes even more complex (Non-Patent Documents 6, 7, and 8).

The above-noted elements (a) to (l) (referred to as LTE-A technical elements) did not greatly influence the constitution of mobile station apparatuses in past mobile communication systems. For example, as shown in FIG. 19, in the LTE-A system, it was possible to define the category of the mobile station apparatus (UETRA category, five types existing) by the buffer size of the mobile station apparatus data processing software (downlink maximum data rate of 10 Mbps to 300 Mbps) and the maximum MIMO constitution (1×1, 2×2, 4×4). Once the category is determined, the constitution of the mobile station apparatus can be established. Stated differently, it is sufficient to provide the mobile telephone service operators with five types of mobile station apparatuses or to distribute five types of mobile station apparatuses into the market.

PRIOR ART DOCUMENT

Non-Patent Documents

Non-Patent Document 1: 3GPP TR36.814, Further advancements for E-UTRA Physical layer aspects, http://www.3gpp.org/ftp/Specs/html-in_fo/36814.htm Non-Patent Document 2: Motorola, R1-083828, 3GPP TSG-RAN1 Meeting #53bis, Prague, Czech Republic, Sep. 29-Oct. 3, 2008

Non-Patent Document 3: LG Electronics, R1-082946, 3GPP TSG-RAN1 Meeting #54bis, Jeju, Korea 18-22, August 2008

Non-Patent Document 4: 3GPP TR36.913, Requirements for Further Advancements for E-UTRA, http://www.3gpp.org/ftp/Specs/html-info/36913.htm Non-Patent Document 5: 3GPP TR36.815, LTE-Advanced feasibility studies in RAN WG4, http://www.3gpp.org/ftp/Specs/html-info/36815.htm Non-Patent Document 6: NTT docomo, T-Mobile Intl., CMCC, Orange, Vodafone, Telecom Italia, R4-091011, 3GPP TSG-RAN WG4 Meeting #50, Athens, Greece, Feb. 9-13, 2009

Non-Patent Document 7: Ericsson, R4-090594, 3GPP TSG-RAN WG4 Meeting #50, Athens, Greece, Feb. 9-13, 2009

Non-Patent Document 8: Nokia, R4-091204, 3GPP TSG-RAN WG4 Meeting #50bis, Seoul, South Korea, 23-27 Mar. 2009

Non-Patent Document 9: U.S. Cellular Corporation, Alcatel-Lucent, RP-091211, 3GPP TSG RAN Meeting #46, Sanya, P. R. China, Dec. 1-4, 2009

DISCLOSURE OF INVENTION

Problem to be Solved by the Invention

As noted above, in an LTE-A communication system, the mobile station apparatus and the base station apparatus use one or multiple CCs (component carriers) to perform communication.

However, if multiple CCs are allocated to the mobile station apparatus based on the categories of mobile station apparatus in the past, there are, for example, cases in which a mobile station apparatus cannot communicate using the allocated CCs. Also, it is difficult to accommodate various LTE-A technical elements as much as possible and also to achieve reduction of circuit complexity, low power consumption, low cost, compactness, and improvement of productivity. In this manner, the conventional art had the drawback of not being able to allocate wireless resources appropriate for communication between a mobile station apparatus and a base station apparatus.

The present invention was made in consideration of the above-noted points, and has as an object the provision of a mobile station apparatus, a base station apparatus, a wireless communications system, a communications control method, a communications control program, and a processor capable of allocating wireless resources appropriate for communication between a mobile station apparatus and a base station apparatus.

Means to Solve the Problem (1) The present invention was made to solve the above-described problem, a first aspect of the present invention is a mobile station apparatus performing communication with a base station apparatus using one or multiple component carriers that are pre-established frequency bands, wherein the mobile station apparatus transmits to the base station apparatus mobile station component carrier capability information including information that defines a component carrier supported by communication with the base station apparatus, and performs communication with the base station apparatus, using a component carrier that is allocated by the base station apparatus, based on the mobile station component carrier capability information.

(2) In the first aspect of the present invention, the mobile station apparatus may perform communication with the base station apparatus using one or multiple component carriers on each of multiple frequency bands, and transmit to the base station apparatus mobile station component carrier capability information that includes identification information of a frequency band supported by communication with the base station apparatus.

(3) In the first aspect of the present invention, the mobile station apparatus may perform communication with the base station apparatus using one or multiple component carriers on each of multiple frequency bands, and transmit to the base station apparatus mobile station component carrier capability information that includes frequency bandwidth information defining a frequency bandwidth of a component carrier supported by communication with the base station apparatus.

(4) In the first aspect of the present invention, the mobile station apparatus may perform communication with the base station apparatus using one or multiple contiguous component carriers on each of multiple frequency bands, and transmit to the base station apparatus mobile station component carrier capability information that includes number of contiguous component carriers information defining the number of component carriers supported by communication with the base station apparatus and that are contiguous in a frequency band.

(5) In the first aspect of the present invention, the mobile station apparatus may perform communication with the base station apparatus using one or multiple component carriers on each of multiple frequency bands, and transmit to the base station apparatus mobile station component carrier capability information that includes number of non-contiguous component carriers information defining the number of component carriers supported by communication with the base station apparatus and that are non-contiguous in a frequency band.

(6) In the first aspect of the present invention, the mobile station apparatus may perform communication with the base station apparatus using one or multiple component carriers on each of multiple frequency bands, and transmit to the base station apparatus mobile station component carrier capability information that includes information of the number of MIMO streams in a component carrier supported by communication with the base station apparatus.

(7) In the first aspect of the present invention, the mobile station apparatus may perform communication with the base station apparatus using one or multiple component carriers on each of multiple frequency bands, and transmits to the base station apparatus mobile station component carrier capability information that includes mobile station apparatus category information defining the maximum data transfer rate supported by communication with the base station apparatus.

(8) In the first aspect of the present invention, the mobile station apparatus may perform communication with the base station apparatus using one or multiple component carriers on each of multiple frequency bands, and transmit to the base station apparatus mobile station component carrier capability information including scenario identification information that is scenario identification information defining a pre-established combination of component carriers, and that is scenario identification information defining a combination of component carriers supported by communication with the base station apparatus.

(9) A second aspect of the present invention is a base station apparatus performing communication with a mobile station apparatus using one or multiple component carriers that are pre-established frequency bands, wherein the base station apparatus allocates with respect to the mobile station apparatus a component carrier for use in communication, based on mobile station component carrier capability information including information that defines a component carrier supported by the mobile station apparatus in communication.

(10) In the second aspect of the present invention, the base station apparatus may perform communication with a mobile station apparatus using one or multiple component carriers that are pre-established frequency bands, and decide the number of MIMO streams in the component carrier, based on the mobile station component carrier capability information.

(11) A third aspect of the present invention is a communications control method in a mobile station apparatus that performs communication with a base station apparatus using one or multiple component carriers that are pre-established frequency bands, the communications control method including: transmitting, by the mobile station apparatus, to the base station apparatus mobile station component carrier capability information including information that defines a component carrier supported by communication with the base station apparatus; and performing, by the mobile station apparatus, communication with the base station apparatus, using a component carrier that is allocated by the base station apparatus, based on the mobile station component carrier capability information.

(12) A fourth aspect of the present invention is a communications control method in a base station apparatus that performs communication with a mobile station apparatus using one or multiple component carriers that are pre-established frequency bands, the communications control method including: allocating, by the base station apparatus, with respect to the mobile station apparatus a component carrier for use in communication, based on mobile station component carrier capability information including information that defines a component carrier supported by the mobile station apparatus in communication.

(13) A fifth aspect of the present invention is a communications control program in which a computer of a mobile station apparatus that performs communication with a base station apparatus using one or multiple component carrier that are pre-established frequency bands, the communications control program performing: transmitting to the base station apparatus mobile station component carrier capability information including information that defines a component carrier supported by communication with the base station apparatus; and communicating with the base station apparatus, using a component carrier that is allocated by the base station apparatus, based on the mobile station component carrier capability information.

(14) A sixth aspect of the present invention is a communications control method in which a computer of a base station apparatus that performs communication with a mobile station apparatus using one or multiple component carrier that are pre-established frequency bands, the communications control method performing: allocating with respect to the mobile station apparatus a component carrier for use in communication, based on mobile station component carrier capability information including information that defines a component carrier supported by the mobile station apparatus in communication.

(15) A seventh aspect of the present invention is a wireless communications system including a base station apparatus and a mobile station apparatus that performs communication with the base station apparatus, using one or multiple component carriers that are pre-established frequency bands, wherein the mobile station apparatus transmits to the base station apparatus mobile station component carrier capability information including information that relates to a component carrier supported by communication with the base station apparatus, and the base station apparatus allocates with respect to the mobile station apparatus a component carrier for use in communication, based on the mobile station component carrier capability information.

(16) A eighth aspect of the present invention is a processor installed in a mobile station apparatus that performs communication with a base station apparatus using one or multiple component carriers that are pre-established frequency bands, the processor performing: generating mobile station component carrier capability information including information that defines a component carrier supported by communication with the base station apparatus.

(17) A ninth aspect of the present invention is a processor installed in a base station apparatus that performs communication with a mobile station apparatus using one or multiple component carriers that are pre-established frequency bands, the processor performing: allocating with respect to the mobile station apparatus a component carrier supported by communication, based on mobile station component carrier capability information including information that defines a component carrier supported by communication by the mobile station apparatus.

Effect of the Invention

According to the present invention, a communications system is able to allocate wireless resources appropriate for communication between a mobile station apparatus and a base station apparatus.

BRIEF DESCRIPTION OF THE DRAWINGS

FIG. 2 is a descriptive chart of the frequency band numbers according to the present embodiment.
FIG. 3 is a simplified chart showing an example of frequency operation priority scenario information according to the present embodiment.
FIG. 4 is a simplified chart showing another example of frequency operation priority scenario information according to the present embodiment.
FIG. 10 is a simplified chart showing an example of the relationship between scenarios and wireless parameters according to the present embodiment.
FIG. 11 is a descriptive chart showing the CC frequency bandwidth numbers according to the present embodiment.
FIG. 13 is a chart showing an example of the mobile station CC capability message structure according to the present embodiment.
FIG. 14 is a chart showing an example of the actual data of the mobile station CC capability message according to the present embodiment.
FIG. 18 is a chart showing another example of the actual data of the mobile station CC capability message according to the present embodiment.
FIG. 19 is a simplified chart of LTE mobile station apparatus category correspondence information according to a second embodiment of the present invention.
FIG. 20 is a chart of the relationship between the CC frequency bandwidth and the number of wireless resource blocks in the present embodiment.
FIG. 21 is a simplified chart showing an example of the relationship between the CC frequency bandwidth and the maximum transport block size according to the present embodiment.
FIG. 22 is a simplified chart showing an example of a chart of the relationship between the number of MIMO streams and the maximum data transfer rate for each scenario according to the present embodiment.
FIG. 23 is a conceptual chart showing an example of the uplink and downlink maximum data transfer rates according to the present embodiment.
FIG. 24 is a simplified chart showing an example of the LTE-A mobile station apparatus categories according to the present embodiment.

FIG. 26 is a simplified chart showing an example of the mobile station CC capability message structure according to the present embodiment.

FIG. 27 is a chart showing an example of the actual data of the mobile station CC capability message according to the present embodiment.

FIG. 28 is a simplified block diagram showing the constitution of a base station apparatus B2 according to the present embodiment.

FIG. 29 is a simplified chart showing another example of the actual data of the mobile station CC capability message according to the present embodiment.

FIG. 31 is a simplified chart showing an example of the actual data of the mobile station CC capability message according to the present embodiment.

FIG. 32 is a simplified chart showing another example of the actual data of the mobile station CC capability message according to the present embodiment.

FIG. 35 is a chart showing an example of the mobile station CC capability message structure according to the present embodiment.

FIG. 36 is a simplified chart showing an example of the actual data of the mobile station CC capability message according to the present embodiment.

FIG. 38 is a chart showing an example of the relationship between scenarios and wireless parameters according to the present embodiment.

BEST MODE FOR CARRYING OUT THE INVENTION

First Embodiment

A first embodiment of the present invention will be described in detail below, with references made to the drawings.

The present embodiment will be described for the case in which a mobile station apparatus transmits a mobile station CC capability message that includes wireless parameters to a base station apparatus, which uses the mobile station CC capability information of the mobile station CC capability message to allocate wireless resources to be used in communication with the mobile station apparatus.

<Communications System>

Figure 1:
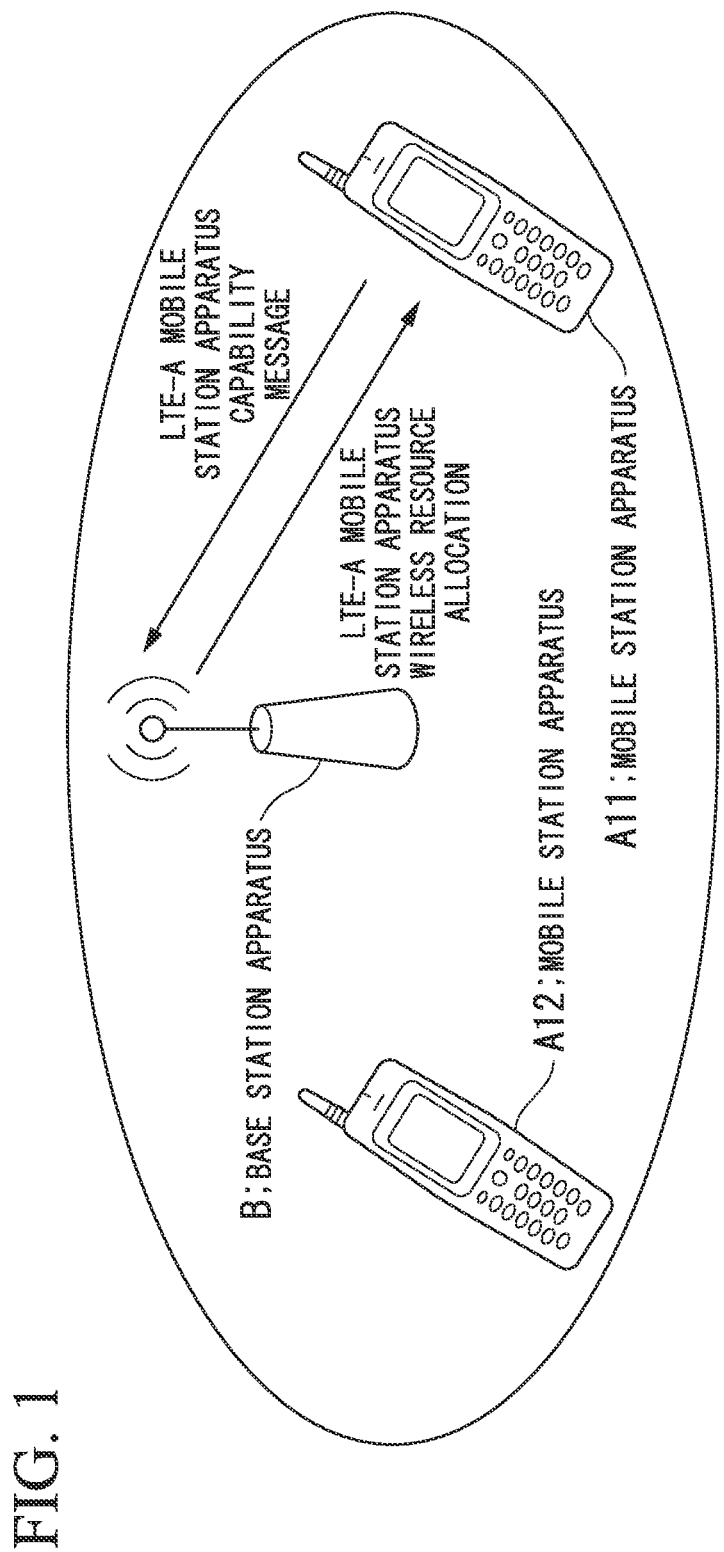
FIG. 1 is a conceptual drawing of a communications system according to a first embodiment of the present invention.

FIG. 1 is a conceptual drawing of a communication system according to the first embodiment of the present invention. In this drawing, a base station apparatus B communicates with mobile station apparatuses A11 and A12. This drawing shows that the mobile station apparatus A1 transmits a mobile station CC capability message to the base station apparatus B. Also, this drawing shows that the base station apparatus B allocates wireless resources to the mobile station apparatus A11 based on the mobile station CC capability message received from the mobile station apparatus 11. Communication from the mobile station apparatus A11 or A12 to the mobile station apparatus B is referred to as the uplink, and communication from the base station apparatus B to the mobile station A11 or A12 is referred to as the downlink.

In the following, each of the mobile station apparatuses A11 and A12 is referred to as a mobile station apparatus A1.

The mobile station apparatus A1 and the base station apparatus B communicate using CA technology. In CA technology, the mobile station apparatus A1 simultaneously receives signals using multiple contiguous or non-contiguous downlink CCs transmitted from the base station apparatus B, so as to emulate the formation of a carrier signal with a broad frequency bandwidth (for example, 100 MHz using five CCs) to achieve high-speed downlink data transfer. In the same manner, in CA technology, the base station apparatus B simultaneously receives multiple contiguous or non-contiguous uplink CC signals from the mobile station apparatus A1 to emulate the formation of a carrier signal having a broad frequency bandwidth (for example, 40 MHz with two CCs) to achieve high-speed uplink data transfer.

FIG. 2 is a descriptive chart of the frequency band numbers according to the present embodiment (extracted part of Table 5.5-1 E-UTRA operating bands from 3GPP TS 36.101). This chart shows the frequency band numbers, the uplink frequency bandwidths, the downlink frequency bandwidths, and the transmission modes. For example, the relationship on the first line indicates that the frequency band with the frequency band number 1 (refer to frequency band 1 in FIG. 39) has an uplink frequency bandwidth (refer to band 11 in FIG. 39) of 1920 MHz to 1980 MHz (bandwidth of 60 MHz) and a downlink frequency bandwidth (refer to band 12 in FIG. 39) of 2110 MHz to 2170 MHz (bandwidth of 60 MHz), and that the transmission mode is FDD. As a result of additions to the bandwidths for IMT-Advance, it is expected that there will be additional frequency bandwidth numbers (from number 41) for LTE-A system in the related specifications.

<CC Combinations>

Specific CC combinations will be described below.

FIG. 3 is a simplified chart that shows an example of frequency operation priority scenario information. The scenarios in FIG. 3 will be referred to as scenario group 1. FIG. 4 is a simplified chart showing another example of frequency operation priority scenario information. The scenarios in FIG. 4 will be referred to as scenario group 2.

This scenario information defines indicates pre-established combinations of CCs. In FIG. 3 and FIG. 4, the scenario information shows the correspondence between the scenario number that identifies a scenario, the placement scenario (Deployment Scenario), the frequency bandwidth (Transmission BWs of LTE-A carriers), the CC information (No. of LTE-A component carriers), the frequency band information (Bands for LTE-A carriers), and the transmission modes (Duplex modes).

Figure 5:
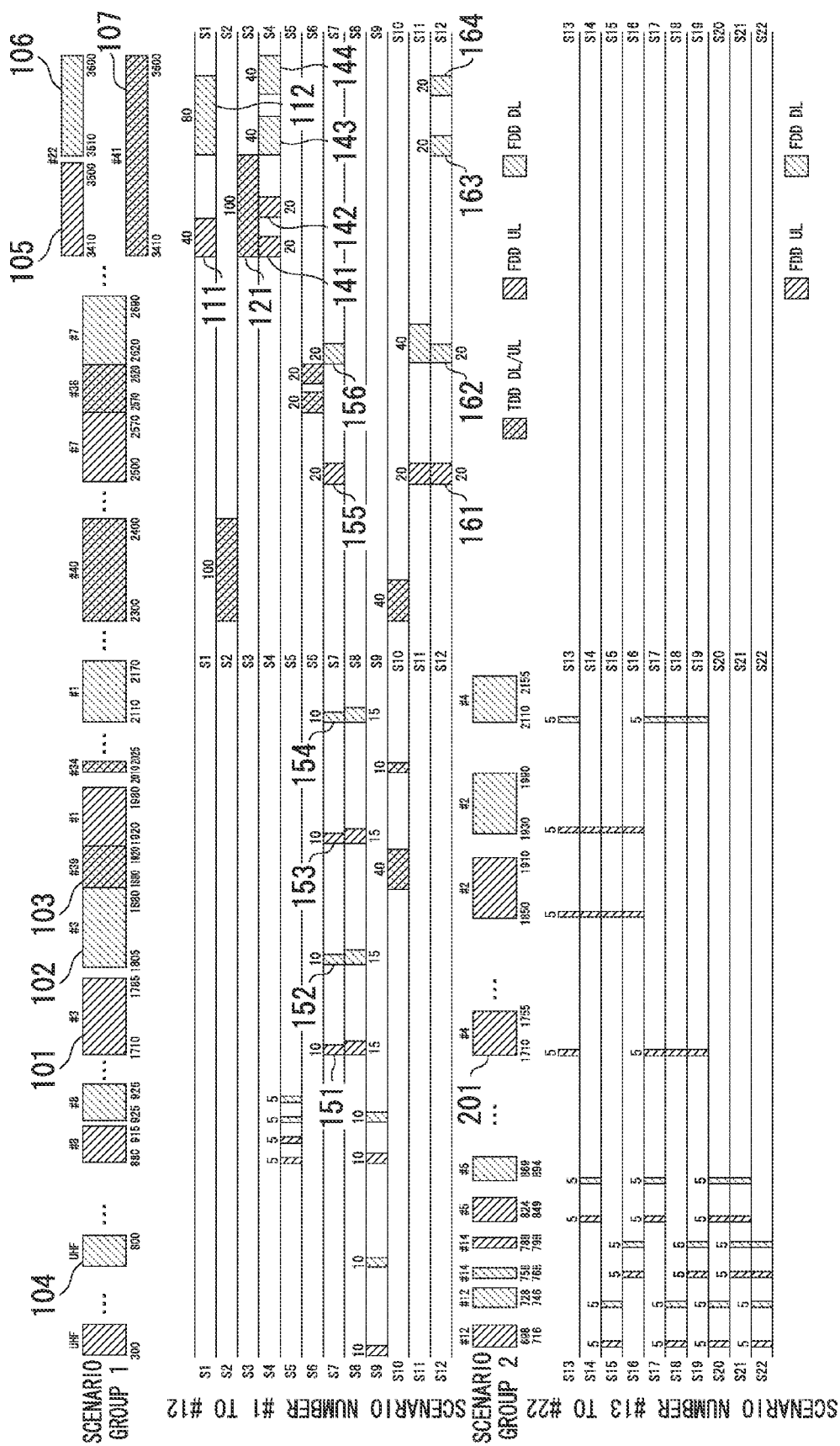
FIG. 5 is a simplified drawing showing an example of the frequency allocation indicated by scenario information according to the present embodiment.

FIG. 5 is a simplified drawing showing an example of the frequency allocation indicated by scenario information. FIG. 5 is a drawing that shows the frequency allocation indicated by the scenario information (S1 to S12) of scenario numbers 1 to 12 in FIG. 3 and the scenario information (S13 to S22) of scenario numbers 13 to 22 in FIG. 4. In this drawing, the horizontal axis indicates frequency, and the vertical axis is divided into two parts, respectively showing the scenario group 1 (S1 to S12 in the upper drawing) and scenario group 2 (S13 to S22 in the lower drawing) of frequency bands. The drawings of each of the scenario groups indicate the frequency bands (upper drawing) and the CCs (lower drawing).

In this drawing, blocks with hatching inclined downward toward the right indicate bands (frequency bands or CCs) that are FDD mode bands used for the uplink UL. Blocks with hatching inclined downward toward the left indicate bands that are FDD mode bands used for the downlink DL. Blocks with cross-hatching indicate bands (frequency bands or CCs) that are TDD mode bands used in common for downlink and uplink (DL/UP).

In FIG. 5, for each block indicating a frequency band the numbers at the top indicate the frequency band numbers (refer to FIG. 2), and the numbers at the bottom indicate the frequencies. For example, in scenario group 1, the block with the reference symbol 101 indicates an uplink frequency band with the frequency band number of 3, and that the frequency band is 1710 to 1785 MHz ($F_{UL\_low}$-$F_{UL\_high}$ in FIG. 2). Also, for example, the block with the reference symbol 102 indicates a downlink frequency band with the frequency band number of 3, and that the frequency band is 1805 to 1880 MHz ($F_{DL\_low}$-$F_{DL\_high}$ in FIG. 2).

Also, for example, the block with the reference symbol 103 indicates a common uplink/downlink frequency band with the frequency band number of 39, and that the frequency band is 1880 to 1920 MHz. Also, the block with the reference symbol 104 indicates a 800-MHz UHF (ultrahigh frequency) band that is not shown in the example of FIG. 2 and, because it is supported as a frequency band for LTE-A in the future, applies UHF as a scenario number for study.

In FIG. 5, with respect to blocks indicates CCs, the numbers at the top part and at the bottom part indicate bandwidths (the CC frequency bandwidths).

For example, the scenario S4 of the scenario group 1 indicates that the frequency band 22 with the reference symbols 105 and 106 (3.5-GHz band, which is allocated as the frequency band 41 to the TDD mode as well) is allocated. The scenario S1 indicates the CC combination if CA technology communication is performed using the frequency band 22 in the FDD mode, four contiguous CCs (20×4=80 MHz; the block marked with the reference symbol 112) being selected in the downlink band (3510 to 3600 MHz), and two contiguous CCs (20×2=40 MHz; the block marked with the reference symbol 111) being selected in the uplink band (3410 to 3500 MHz). The scenario S1 is the case 1 in FIG. 39.

Also, for example, in the scenario S4 of the scenario group 1, the CC combination indicated is that of the case in which CA technology communication is performed using the frequency band 22 (3.5-GHz band) in the FDD mode, four non-contiguous CCs (20×4=80 MHz; the block marked with the reference symbol 144) being selected in the downlink band (3510 to 3600 MHz), and two non-contiguous CCs (20×2=40 MHz; the blocks marked by the reference symbols 141 and 142) being selected in the uplink band (3410 to 3500 MHz). The scenario S4 is the case 2 (Intra CA case) in FIG. 39.

In the same manner, for example, in the scenario S7 of the scenario group 1, CA technology communication is performed using the frequency band numbers 1, 3, and 7 in the FDD mode. In the scenario S7, one CC (10×1=10 MHz; block marked by the reference symbol 154) is selected in the downlink frequency band 1 (1805 to 1880 MHz), one CC (10×1=10 MHz; block marked by the reference symbol 152) is selected in the downlink frequency band 3 (1805 to 1880 MHz), and one CC (20×1=20 MHz; the block marked by the reference symbol 156) is selected in the downlink frequency band 7 (2620 to 2690 MHz). That is, this is a CC combination if a downlink bandwidth of 40 MHz is selected, this being made up of non-contiguous CCs in three bands. In the scenario S7, one CC (10×1=10 MHz; the block marked by the reference symbol 153) is selected in the uplink frequency band 1 (1920 to 1980 MHz), one CC (10×1=10 MHz; the block marked by the reference symbol 151) is selected in uplink frequency band 3 (1710 to 1785 MHz), and one CC (20×1=20 MHz; the block marked by the reference symbol 155) is selected in the uplink frequency band 7 (2500 to 2570 MHz). That is, this is a CC combination for the case in which an uplink bandwidth of 40 MHz is selected, this being made up of non-contiguous CCs in three bands. The scenario S7 is the case 3 (Inter CA case) in FIG. 39.

Also, for example, in the scenario S12 of the scenario group 1, CA technology communication is performed using the frequency band numbers 7 and 22 in the FDD mode. In the scenario S12, one CC (20×1=20 MHz; block marked by the reference symbol 162) is selected in the downlink frequency band 7 (2620 to 2690 MHz), and two non-contiguous CCs (20×2=40 MHz; the blocks marked by the reference symbols 163 and 164) are selected in the downlink frequency band 22 (3510 to 3600 MHz). That is, this is a CC combination for the case in which a downlink bandwidth of 60 MHz is selected, this being made up of non-contiguous CCs in two bands. In the scenario S7, one CC (20×1=20 MHz; the block marked by the reference symbol 161) is selected in the uplink frequency band 7 (1920 to 1980 MHz). That is, this is a CC combination for the case in which a 20-MHz uplink bandwidth is selected, this being made up of a CC in one band. The scenario S12 is a mixed case of the Inter CA case and the Intra CA case.

Also, for example, in the scenario S3 of the scenario group 1 indicates that the frequency band 41 marked with the reference symbol 107 (3.5-GHz band; which is also allocated as frequency band 22 to the FDD mode) is allocated. In the scenario S3, CA technology communication is performed using the frequency band 41 in the TDD mode, the CC combination shown being that of selecting five contiguous uplink/downlink CCs (20×5=100 MHz; the block marked by the reference symbol 121) in the uplink/downlink band (3410 to 3510 MHz). The scenario S3 is the case 4 in FIG. 39.

The mobile station apparatus A1 and the base station apparatus B communicate using the selected CCs. There are cases in which each of the mobile station apparatuses A1 has a transceiver device having a different constitution, and the CCs that can accommodate CA technology differ. The following is a description of examples of multiple constitutions for the transceiver device of the mobile station apparatus A1 (transceiver devices a1 to a3).

<Constitution of the Transceiver Device a1>

First, the transceiver device a1, which communicates using one CC or multiple contiguous CCs will be described.

Figure 6:
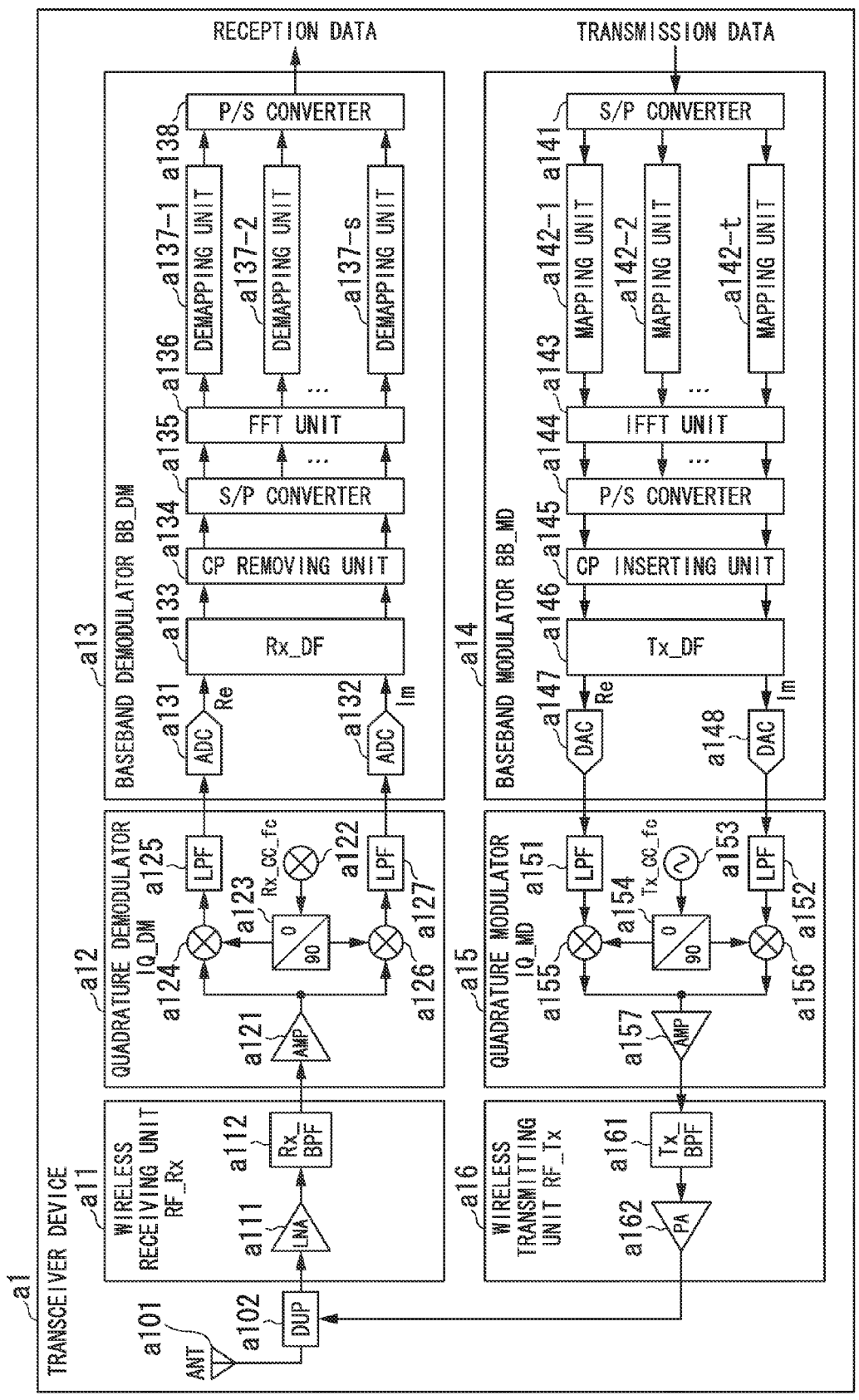
FIG. 6 is a simplified block diagram showing the constitution of a transceiver device according to the present embodiment.

FIG. 6 is simplified block diagram showing the constitution of the transceiver device a1 according to the present embodiment. In this drawing, the transceiver device a1 is constituted by a common transmitting/receiving antenna a101, an antenna sharer (DUP) a102, a wireless receiving unit (RF_Rx) a11, a quadrature demodulator (IQ_DM) a12, a baseband demodulator (BB_DM) a13, a baseband modulator (BB_MD) a14, a quadrature modulator (IQ_MD) a15, and a wireless transmitting unit (RF_Tx) a16.

The receiving processing will first be described.

The antenna sharer a102 outputs to the wireless receiving unit a11 a signal received from the base station apparatus B via the common transmitting/receiving antenna a101. The antenna sharer a102 transmits the signal input from the wireless transmitting unit a16 to the base station apparatus B via the common transmitting/receiving antenna a101.

The wireless receiving unit a11 is constituted by an LNA (low-noise amplifier) a111, and an RF receiving bandpass filter (Rx_BPF) a112. The LNA a111 amplifies the signal input from the common transmitting/receiving antenna a102 and outputs it to the RF receiving bandpass filter a112. The RF receiving bandpass filter a112 extracts the receiving band signal from the signal input from the antenna sharer a102, and outputs it to the quadrature demodulator a12.

The quadrature demodulator a12 is constituted by an amplifier (AMP) a121, a local oscillator a122, a phase shifter a123, multipliers a124 and a126, and LPFs (lowpass filters) a125 and a127. The amplifier a121 amplifies the signal input from the RF receiving bandpass filter a112 and outputs it to the multipliers a124 and a126. The local oscillator a122 generates a sine wave and outputs it to the phase shifter a123. The phase shifter a123 outputs the sine wave input from the local oscillator a122 to the multiplier a124. The phase shifter a123 also shifts the phase of the sine wave input from the local oscillator a122 by 90 degrees to generate a cosine wave, which it outputs to the multiplier a126.

The multiplier a124 multiplies the signal input from the amplifier a121 by the sine wave input from the phase shifter a123 to extract the in-phase component of the signal, and also down-converts the signal. The multiplier a124 outputs the signal that is multiplied by the sine wave to the LPF a125. The LPF a125 extracts the low-frequency components of the signal input from the multiplier a124. The LPF a125 outputs the in-phase component of the extracted signal to the baseband demodulator a13.

The multiplier a126 multiplies the signal input from the amplifier a121 by the cosine wave input from the phase shifter a123, thereby extracting the quadrature component of the signal and down-converting the signal. The multiplier a126 outputs the signal that is multiplied by the cosine wave to the LPF a127. The LPF a127 extracts the low-frequency components of the signal input from the multiplier a126. The LPF a127 outputs the in-phase component of the extracted signal to the baseband demodulator a13.

The baseband demodulator is constituted so as to include AD converter units (ADCs: analog-to-digital converters) a131 and a132, a receiving digital filter (Rx DF) a133, a CP (cyclic prefix) removing unit a133, an S/P (serial/parallel) converter a135, an FFT (fast Fourier transform) unit a136, demapping units a137-1 to a137-s, and a P/S (parallel-to-serial) converter a138. The AD converters a131 and a132 convert to digital signals the respective signals (analog signals) input from the LPFs a125 and a127 and output them to the receiving digital filter a133. The receiving digital filter a133 extracts the receiving band signal from the signals input from the AD converters a131 and a132, and output them to the CP removing unit a133. The CP removing unit a133 removes the CP from the signals input from the receiving digital filter a133 and outputs the signals to the S/P converter a135. The S/P converter a135 performs serial-to-parallel conversion of the signals input from the CP removing unit a133 and outputs them to the FFT unit a136. The FFT unit a136 performs a Fourier transformation on the signals input from the S/P converter a135, converting them from the time domain to the frequency domain, and outputting them to the demapping units a137-1 to a137-s. The demapping units a137-1 to a137-s demap the signals in the frequency domain, which has been input from the FFT unit a136 and output them to the P/S converter a138. The P/S converter a138 performs parallel-to-serial conversion of the signals input from the demapping units a137-1 to a137-s to obtain the reception data, which it outputs.

Next, the transmission processing will be described.

The baseband modulator a14 is constituted so as to include an S/P (serial-to-parallel) converter a141, mapping units a142-1 to a142-t, an IFFT (inverse fast Fourier transform) unit a143, a P/S (parallel-to-serial) converter a144, a CP inserting unit a145, a transmitting digital filter (Tx_DF) a146, and DACs (digital-to-analog converters) a147 and 148. The S/P converter a141 performs parallel-to-serial conversion of the input transmission data and outputs it to the mapping units a142-1 to a142-t. The mapping units a142-1 to a142-t map the signals input from the S/P converter a141, and output them to the IFFT unit a143. The IFFT unit a143 performs an inverse Fourier transformation on the signals input from the mapping units a142-1 to a142-t, converting them from the frequency domain to the time domain, and outputting them to the P/S converter a144. The P/S converter a144 performs a parallel-to-serial conversion of the signals of the time domain, which have been input from the IFFT unit a143, and outputs them to the CP inserting unit a145. The CP inserting unit a145 performs a parallel-to-serial conversion of the signals input from the P/S converter a144 and outputs them to the transmitting digital filter a146. The transmitting digital filter a146 extracts the transmitting band signal from the signal input from the CP inserting unit a145. The transmitting digital filter a146 outputs the in-phase component and the quadrature component of the extracted signal to the respective DA converters a147 and a148. The DA converters a147 and a148 convert the respective signals (digital signals) input from the transmitting digital filter a146 into the analog signals and output them to the quadrature modulator a15.

The quadrature modulator a15 is constituted so as to include LPFs a151 and a152, a local oscillator a153, a phase shifter a154, multipliers a155 and a156, and an amplifier (AMP) a157. The LPFs a151 and a152 each extract the low-frequency components of the signals input from the DA converters a147 and a148. The local oscillator a153 generates a sine wave and outputs it to the phase shifter a154. The phase shifter a154 outputs the sine wave input from the local oscillator a153 to the multiplier a155. The phase shifter a154 also shifts the phase of the sine wave input from the local oscillator a153 by 90 degrees to generate a cosine wave, which it outputs to the multiplier a156.

The multiplier a155 multiplies the signal input from the LPF a151 by the sine wave input from the phase shifter a154 so as to generate an in-phase signal and also to up-convert the signal. The multiplier a155 outputs the signal multiplied by the sine wave to the amplifier a157. The multiplier a156 multiplies the signal input from the LPF a152 by the cosine wave input from the phase shifter a154 to generate a quadrature component signal and also up-convert the signal. The multiplier a156 outputs the signal multiplied by the cosine wave to the amplifier a157. The amplifier a157 amplifies the signals input from the multipliers a155 and a156 and outputs the result to the wireless transmitting unit a16.

The wireless transmitting unit a16 is constituted so as to include a RF transmitting bandpass filter (Tx_BPF) a161 and a PA (power amplifier) a162. The RF transmitting bandpass filter a161 extracts the transmitting band signal from the signal input from the amplifier a157 and outputs it to the PA a162. The PA a162 amplifies the signal input from the RF transmitting bandpass filter a161 and outputs it to the antenna sharer a102.

According to the above-noted constitution, the transceiver device a1 transmits a signal on, for example, an uplink CC having a frequency bandwidth of 20 MHz. Although the constitution of the transceiver device a1 shown in FIG. 6 generates an uplink OFDM signal CC, the present invention is not restricted in this manner, and may, by a different combination of circuit blocks and by a constitution of SC-FDMA (single-carrier frequency-division multiple access), generate an uplink contiguous SC-FDMA signal or a non-contiguous SC-FDMA (clustered DFT-S-OFDM or CL-DFT-S-OFDM)

signal and use CCs to transmit. Also, although FIG. 6 describes the direct-conversion type of transceiver device a1, the present invention is not restricted to this, and can be applied to a transceiver device of another type, such as a superheterodyne type. In this case, if the accomodating relationship of the quadrature de/modulator of a12/a15 is modified, it is possible to apply.

Figure 7:
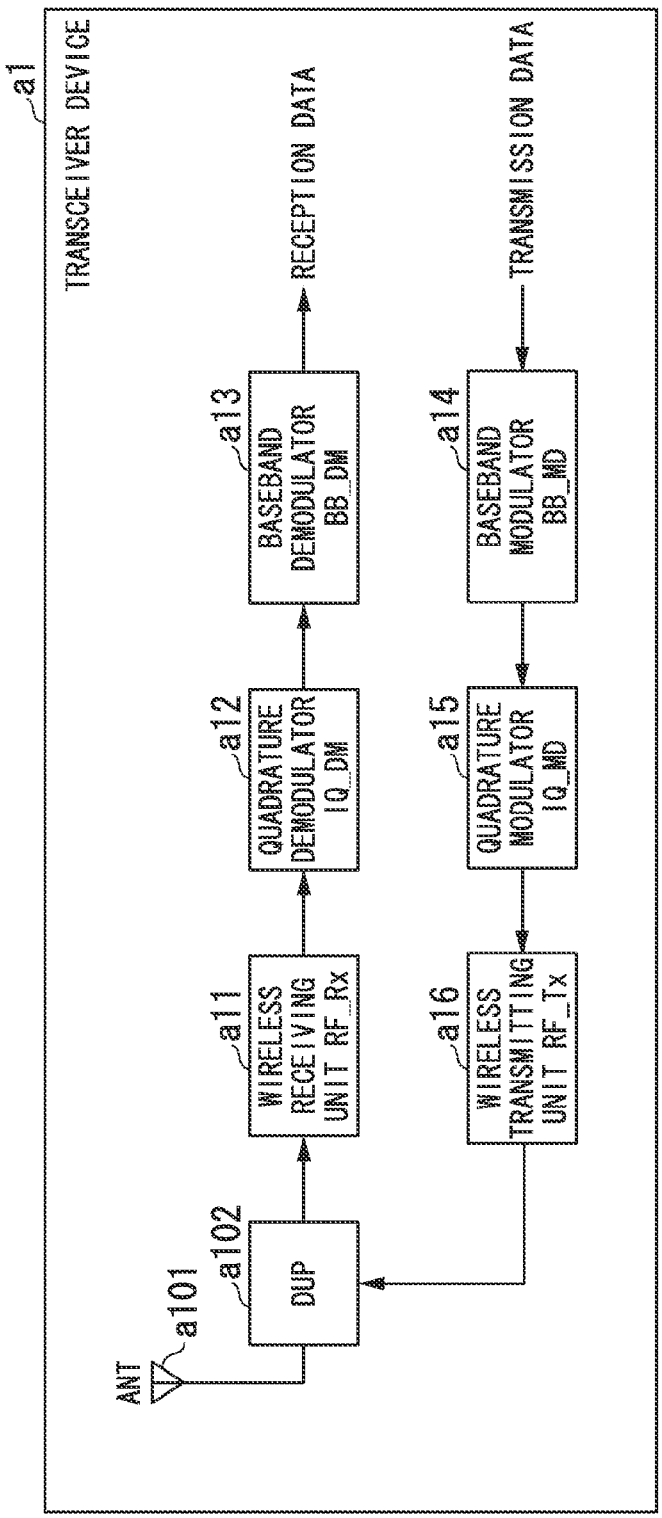
FIG. 7 is a simplified block diagram showing the simplified constitution of the transceiver device according to the present embodiment.

FIG. 7 is a simplified block diagram showing a simplified constitution of the transceiver device a1 according to the present embodiment. This drawing simplifies the constitution of the transceiver device a1 shown in FIG. 6. The transceiver device a1 is constituted so as to include the common transmitting/receiving antenna a101, the antenna sharer (DUP) a102, the wireless receiving unit (RF_Rx) a11, the quadrature demodulator (IQ_DM) a12, the baseband demodulator (BB_DM) a13, the baseband modulator (BB_MD) a14, the quadrature modulator (IQ_MD) a15, and the wireless transmitting unit (RF_Tx) a16.

The transceiver device a1 uses one downlink frequency band determined by the RF frequency characteristics of the wireless receiving unit (RF_Rx) a11 and the quadrature demodulator (IQ_DM) a 12 (mainly dependent upon the antenna sharer a102 and the RF receiving bandpass filter a112), and the frequency bandwidth of one downlink CC or multiple downlink contiguous CCs determined by the baseband frequency characteristics of the quadrature demodulator (IQ_DM) a12 and the baseband demodulator (BB_DM) a13 (mainly dependent upon the receiving digital filter a133) to receive the CC signal of the base station apparatus B. Also, the baseband modulator (BB_MD) a14 uses the frequency bandwidth of one uplink CC or multiple uplink contiguous CCs determined by the baseband frequency characteristics of the baseband modulator (BB_MD) a14 and the quadrature modulator (IQ_MD) a15 (mainly dependent upon the transmitting digital filter a146) and one uplink frequency band determined by the RF frequency characteristics of the wireless transmitting unit (RF_Tx) a16 and the quadrature modulator (IQ_MD) a15 (mainly dependent upon the antenna sharer a102 and the RF transmitting bandpass filter a161 to transmit the CC signal to the base station apparatus B.

Figure 39:
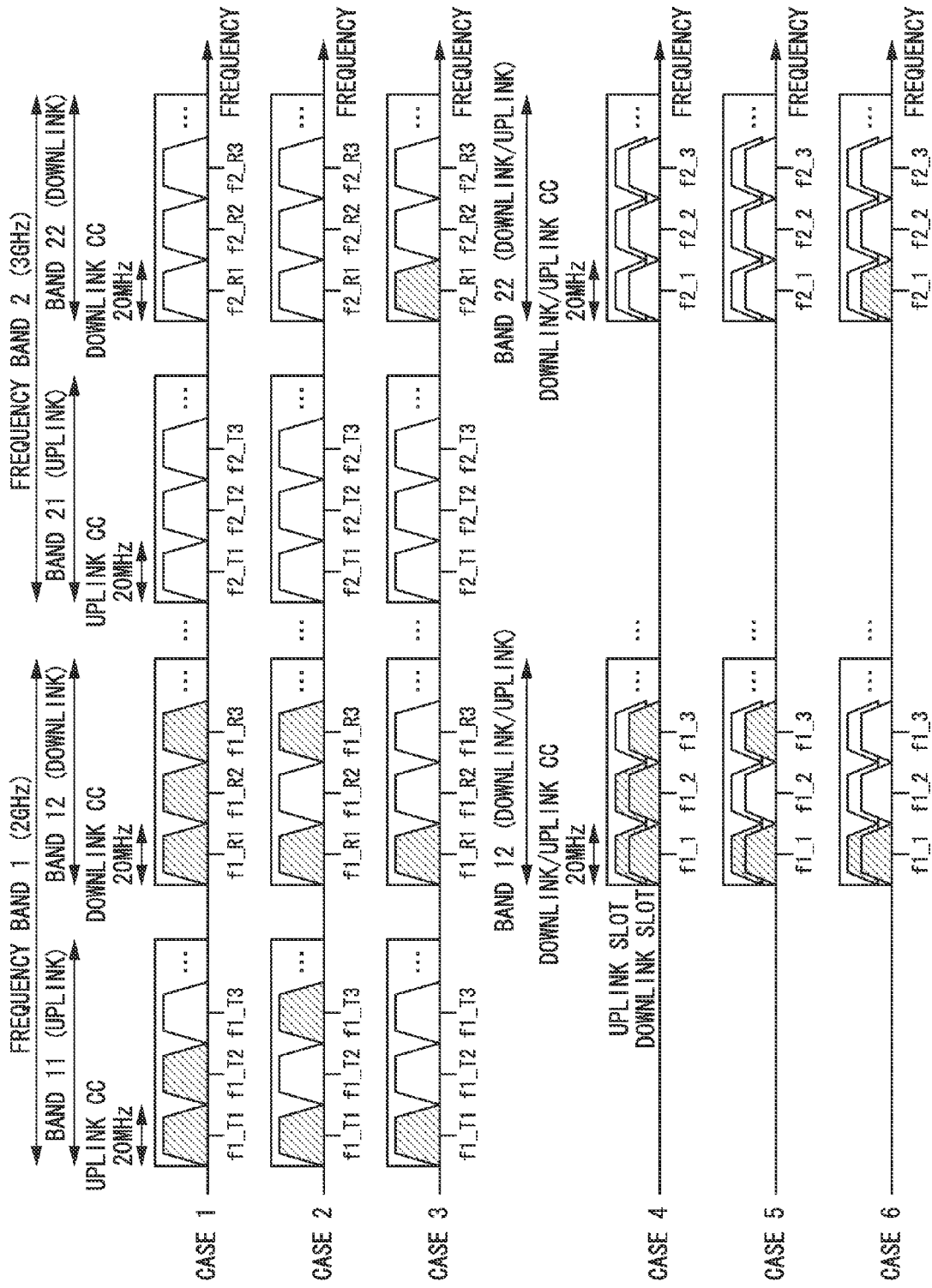
FIG. 39 is a simplified drawing showing the combinations of CCs in the conventional art.

In the case of the CC combination shown as case 1 in FIG. 39, in the downlink band 12 in the frequency band 1 (2 GHz), for example, the transceiver device a1 has, for example, the (IQ_DM) a12 having a 60-MHz baseband frequency bandwidth corresponding to the center frequency f1_R2 and the baseband demodulator (BB_DM) a13. Also, in the uplink band 11 in the frequency band 1 (2 GHz), for example, the transceiver device a1 has the quadrature modulator (IQ_MD) a15 having a 40-MHz baseband frequency bandwidth corresponding to the center frequency ftx (ftx=(f1_T1+f1_T2)/2) and the baseband modulator (BB_MD) a14.

<Constitution of the Transceiver Device a2>

Next, a transceiver device a2, which communicates using multiple contiguous or non-contiguous CCs (L downlink CCs and K uplink CCs) on one frequency band, will be described.

Figure 8:
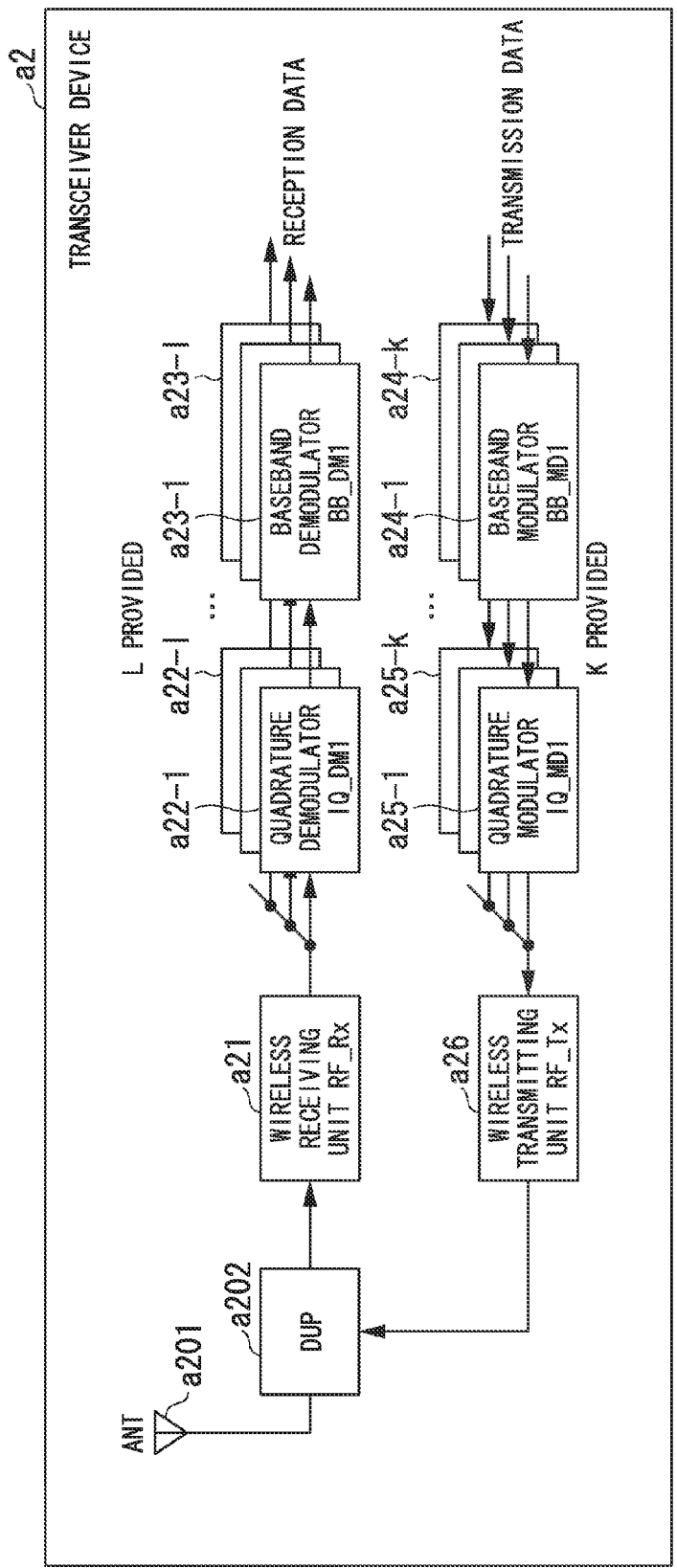
FIG. 8 is a simplified block diagram showing the simplified constitution of the transceiver device according to the present embodiment.

FIG. 8 is a simplified block diagram showing a simplified constitution of the transceiver device a2 according to the present embodiment. In this drawing, the transceiver device a2 is constituted so as to include a common transmitting/receiving antenna a201, an antenna sharer (DUP) a202, a wireless receiving unit (RF_Rx) a21, L quadrature demodulators (IQ_DM1) a22-1 (lower-case l, where l=1, 2, . . . , L), L baseband demodulators (BB_DM1) a23-1 (lower-case l), K baseband modulators (BB_MD1) a24-$k$ (where k=1, 2, . . . , K), K quadrature modulators (IQ_MD1) a25-$k$, and a wireless transmitting unit (RF_Tx) a26. In this case, because constitution and functions of the antenna sharer a202, the wireless receiving unit a21, the quadrature demodulator a22-1, the baseband demodulator a23-1, the baseband modulator a24-$k$, and the quadrature modulator a25-$k$ are the same as the antenna sharer a102, the wireless receiving unit a11, the quadrature demodulator a12, the baseband demodulator a13, the baseband modulator a14, and the quadrature modulator a15 of FIG. 6, the descriptions thereof will be omitted herein. However, each of the quadrature demodulators a22-1 and each of the baseband demodulators a23-1 process the signals received by one or multiple associated contiguous downlink CCs. Also, each of the baseband modulators a24-$k$ and each of the quadrature modulators a25-$k$ process signals transmitted by one or multiple associated contiguous uplink CCs.

In the transceiver device a2 of FIG. 8, within one frequency band, signals can be received using up to L contiguous or non-contiguous downlink CCs, and signals can be transmitted on up to K contiguous or non-contiguous uplink CCs. Also, because the transceiver device a2 has L quadrature demodulators a22-1 and baseband demodulators a23-1, it is also possible to accommodate communication on an asynchronous transmission downlink CC. Also, in the case in which baseband frequency bandwidths of signals that can be processed with respect to the L quadrature demodulators a22-1 and the baseband demodulators a23-1 differ, the total number of contiguous or non-contiguous downlink CCs that can be accommodated, the total number of asynchronous transmission downlink CCs, as well as the aggregated maximum frequency bandwidth with multiple contiguous CCs on OFDM subcarriers bandwidths of 15 kHz change, and various combinations occur. The same is true with regard to the uplink.

In the case of the CC combination shown as the case 2 in FIG. 39, in the downlink band 12 of the frequency band 1 (2 GHz), the transceiver device a2 has, for example, two quadrature demodulators a22-1 and -2 and two baseband demodulators a23-1, and -2, which have a baseband frequency bandwidth of 20 MHz, which correspond to the center frequencies f1_R1 and f1_R3. Alternatively, in the uplink band 11 of the frequency band 1 (2 GHz), the transceiver device a2 has, for example, two quadrature modulators a25-1 and -2 and two baseband modulators a24-1 and -2 having a 20-MHz baseband frequency bandwidth, which correspond to the center frequencies f1_T1 and f1_T3.

In the same manner, in the case of the CC combination shown as the case 1 in FIG. 39, in the downlink band 12 of the frequency band 1 (2 GHz), the transceiver device a2 has, for example, three quadrature demodulators a22-1, -2, and -3 and three baseband demodulators a23-1, -2, and -3 having a 20-MHz baseband frequency bandwidth, which corresponds to the center frequencies f1_R1, f1_R2, and f1_R3. Alternatively, in the uplink band 11 of the frequency band 1 (2 GHz), the transceiver device a2 has, for example, two quadrature modulators a25-1 and -2 and two baseband modulators a24-1 and having a 20-MHz baseband frequency bandwidth, which corresponds to the center frequencies f1_T1 and f1_T2.

In the following, the capability of the transceiver device to accommodate a CC combination will be referred to as the mobile station CC capability.

As noted above, in the case of the FDD mode, the mobile station CC capability of the transceiver device a2 can be expressed by information defining the frequency band that can be accommodated (that is, in which signal receiving and transmitting are possible), information defining the frequency bandwidth of each CC in the downlink band (hereinafter referred to as the downlink CC frequency bandwidths), information defining the number of contiguous CCs having a downlink CC frequency bandwidth (hereinafter referred to as downlink contiguous CCs), information defining the number of non-contiguous CCs having a downlink CC frequency bandwidth (hereinafter referred to as downlink non-contiguous CCs), information defining the frequency bandwidth of each CC in an uplink band (hereinafter referred to as the uplink CC frequency bandwidths), information defining the number of contiguous CCs having an uplink CC frequency bandwidth (hereinafter referred to as uplink contiguous CCs), and information defining the number of non-contiguous CCs having an uplink CC frequency bandwidth in each uplink band (hereinafter referred to as uplink non-contiguous CCs) (refer to FIG. 10, the details of which will be described later).

Also, in the case of the TDD mode, the mobile station CC capability of the transceiver device a2 can be expressed by information defining, because the downlink band CC frequency bandwidth is the same as the uplink band CC frequency bandwidth, the frequency bands that can be accommodated, information defining the downlink CC frequency bandwidth, and information defining the number of non-contiguous CC having an uplink frequency bandwidth in the downlink band.

Also, it is possible distinguish between the FDD or TDD mode by the frequency band number (refer to FIG. 2). Thus, identification information for the FDD or TDD mode need not be directly included in the mobile station CC capability, but may be included in the mobile station CC capability.

<Constitution of the Transceiver Device a3>

Next, the transceiver device a3, which communicates using multiple contiguous or non-contiguous CCs in one or multiple frequency bands will be described.

Figure 9:
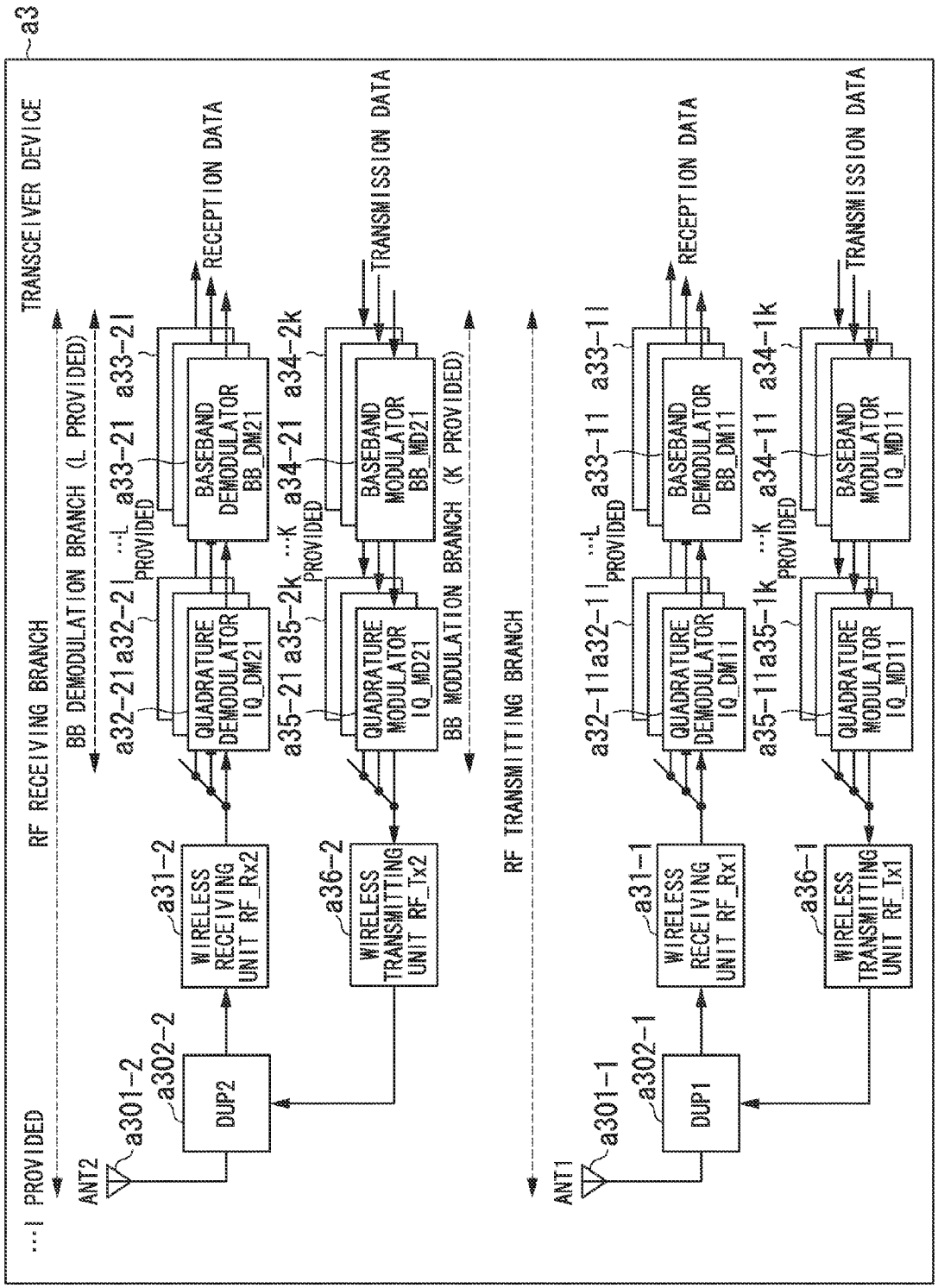
FIG. 9 is a simplified block diagram showing the simplified constitution of the transceiver device according to the present embodiment.

FIG. 9 is a simplified block diagram showing the simplified constitution of the transceiver device a3 according to the present embodiment. In this drawing, the transceiver device a3 is constituted so as to include common transmitting/receiving antennas a301-$i$ ($i$=1, 2, . . . , I), an antenna sharer (DUPi) a302-$i$, a wireless receiving unit (RF_Rxi) a31-$i$, a quadrature demodulator (IQ_DMil) a32-$il$ (lower-case L; l=1, 2, . . . , I), a baseband demodulator (BB_DMil) a33$il$ (lower-case L), a baseband modulator (BB_MDjk) a34-$jk$ (j=1, 2, . . . , I; k=1, 2, . . . , K), a quadrature modulator (IQ_MDjk) a35-$jk$, and a wireless transmitting unit (RF_Txi) a36-$j$. In this case, because the constitutions and functions of the antenna sharer a302-$i$, the wireless receiving unit a31-$i$, the quadrature demodulator a32-$il$, the baseband demodulator a33-$il$, the baseband modulator a34-$jk$, the quadrature modulator a35-$jk$, and the wireless transmitting unit a36-$j$ are the same as the antenna sharer a202, the wireless receiving unit a21, the quadrature demodulator a22-1, the baseband demodulator a23-1, the baseband modulator a24-$k$, and the quadrature modulator a25-$k$, the descriptions thereof are omitted herein.

In this case, the group of quadrature demodulators a32-$il$ and baseband demodulators a33-$il$ process the OFDM baseband signal received on the i-th frequency band l (lower-case L) CC (each combination is known as the BB demodulation branch il, and l (lower-case L) is known as the BB demodulation branch number; component carrier receiving processing unit). The group of the baseband modulator a34-$jk$ and the quadrature modulator a35-$jk$ process the OFDM baseband signal received in the i-th frequency band on the k-th uplink CC (each known as the BB modulation branch ik, k being known as the BB modulation branch number; component carrier transmission processing unit). The group of the wireless receiving unit a31-$i$ and the BB baseband demodulation branches il to iL process the OFDSM wireless received signals received on the i-th frequency band (each group being known as the RF receiving branch i, and i being known as the RF receiving branch number; frequency band reception processing unit). The groups of the wireless transmitting unit a36-$j$ and the BB modulation branches j1 to jK process the OFDM wireless transmitted signal transmitted on the j-th frequency band (each group being known as the RF transmitting branch j, and j being known as the RF transmitting branch number; frequency band transmission processing unit).

In the case of transmitting and receiving on the same frequency band, the transceiver device a3, by providing multiple RF receiving branches i and RF transmitting branches j, can accommodate uplink/downlink MIMO, coordinated CoMP communication between base station apparatuses, and uplink transmitting diversity. Also, if signals in different frequency bands are received, by providing multiple RF receiving branches i and an RF transmitting branch j, the transceiver device a3 can accommodate the above-noted systems in the multiple frequency bands as shown in FIG. 5.

Also, although FIG. 9 shows the case in which the number of RF receiving branches and the number of RF transmitting branches is the same (I), the present invention is not restricted to this, and the number of RF receiving branches may differ from the number of RF transmitting branches. Also, although FIG. 9 shows the case in which the number of BB demodulation branches within each RF receiving branch is the same (L), the present invention is not restricted to this, and the number of BB demodulation branches within each RF receiving branch may be different. In the same manner, the number of BB modulation branches within each RF transmitting branch may be different.

Further, although FIG. 9 shows the case in which one antenna corresponds to one RF transmitting and receiving branch, the present invention is not restricted to this and, depending upon the frequency characteristics of the antenna, because one antenna can accommodate multiple frequency bands, an antenna switching matrix circuit can be inserted between the antennas a301-1, 2, . . . , P (P<I) and the antenna sharers (DUPs) a302-1, 2, . . . , I.

Also, although FIG. 9 shows the case in which one quadrature demodulator (IQ_DM) is associated with one baseband demodulator (BB_DM), the present invention is not restricted to this and, depending upon the frequency characteristics of the quadrature demodulator (IQ_DM), one quadrature demodulator (IQ_DM) may be connected to multiple baseband demodulators (BB_DM) to form one BB demodulation branch. The same is true with regard to the uplink.

Also, in the case of the combination of CCs in case 3 of FIG. 39, the transceiver device a3 has, for example, an RF receiving branch 1 that corresponds to the center frequency f2_R1 of the downlink band 22 in the frequency band 2 (3 GHz), and an RF receiving branch 2 that corresponds to the center frequency f1_R1 of the downlink band 12 in the frequency band 1 (2 GHz). Alternatively, the transceiver device a3, for example, has an RF transmitting branch 1 that corresponds to the center frequency f1_T1 of the uplink band 11 in the frequency 1 (2 GHz).

In the case of accommodating the combination of CCs in case 1 of FIG. 39 and 2×2 MIMO (a number of uplink/downlink MIMO streams of 2) of each uplink/downlink CC, the transceiver device a3 has, for example, two RF receiving branches 1 and 2 corresponding to the downlink band 12 in the frequency band 1 (2 GHz). Alternatively, the transceiver device a3 has, for example, two RF transmitting branches 1 and 2 corresponding to the uplink band 11 in the frequency band 1 (2 GHz).

<Wireless Parameters>

The wireless parameters according to the present embodiment will now be described.

Wireless parameters in the mobile station apparatus include nine wireless parameters, these being SupportedBandEUTRA (supported band of EUTRA; frequency band identification information) that indicates the frequency band number; SupportedDLCCBWList (Supported Downlink Component Carrier Bandwidth List; frequency bandwidth information) that indicates the downlink CC frequency bandwidth; SupportedDLCOCCList (Supported Downlink Contiguous Component Carrier List; number of contiguous component carriers information) that indicates the number of contiguous downlink CCs by frequency bandwidth; SupportedDLNCCCList (Supported Downlink Non-Contiguous Component Carrier List; number of non-contiguous component carriers information) that indicates the number of downlink non-contiguous CCs by frequency bandwidth; SupportedDLCCMIMOList (Supported Downlink Component Carrier MIMO List; number of MIMO streams information) that indicates the number of downlink CC MIMO streams; SupportedULCCBWList (Supported Uplink Component Carrier Bandwidth List; frequency bandwidth information) that indicates the uplink CC frequency bandwidth; SupportedULCOCCList (Supported Uplink Contiguous Component Carrier List; number of contiguous component carriers information) that indicates the number of contiguous uplink CC by frequency bandwidth; SupportedULNCCCList (Supported Uplink Con-Contiguous Component Carrier List; number of non-contiguous carriers information) that indicates the number of non-contiguous uplink CCs by frequency bandwidth; and SupportedULCCMIMOList (Supported Uplink Component Carrier MIMO List; number of MIMO streams information) that indicates the number of uplink CC MIMO streams.

Next, each of the wireless parameters will be described.

[SupportedBandEUTRA]

The wireless parameter SupportedBandEUTRA is information that defines the frequency band numbers of FIG. 2. This wireless parameter is a series of numbers that indicates the frequency band numbers of frequency band that can be accommodated by the transceiver device a3 of FIG. 9, this indicating the mobile station CC capability with regard to the number of RF transmitting and receiving branches and RF transmitting and receiving branch frequency characteristics.

[SupportedDLCCBWList]

The wireless parameter SupportedDLCCBWList is information that defines the downlink CC frequency bandwidth numbers. This wireless parameter is a list that indicates the frequency bandwidths of contiguous CCs that are included in the downlink bands that can be accommodated by the transceiver device a3 of FIG. 9, that is, a series of numbers that indicates the downlink contiguous CC frequency bandwidth numbers, this indicating the mobile station CC capability in relation to the BB demodulation branch frequency characteristics.

FIG. 11 is a descriptive drawing of the CC frequency bandwidth numbers according to the present embodiment. This drawing shows the relationship between the CC frequency bandwidth numbers and the CC frequency bandwidths. This drawing shows, for example, that the CC frequency bandwidth numbers 1 to 6 correspond to CC frequency bandwidths from 1.4 to 20 MHz, and that the CC frequency bandwidth of CC frequency bandwidth number 4 is 10 MHz. The CC frequency bandwidth numbers 7 and higher are spares, and may be associated with other CC frequency bandwidths, or with an aggregated maximum frequency bandwidth of contiguous CCs. Although the ascending order of the CC frequency bandwidth numbers is in the order of increasing CC frequency bandwidth, other relationships of correspondence may be used.

[SupportedDLCOCCList]

The wireless parameter SupportedDLCOCCList is information that defines the number of downlink contiguous CCs. This wireless parameter is a list of number of contiguous downlink CCs that are included in the downlink bands that can be accommodated by the transceiver device a3 in FIG. 9, that is, a series of numbers of the number of downlink contiguous CCs, this indicating the mobile station CC capability in relation to the number of BB demodulation branches.

[SupportedDLNCCCList]

The wireless parameter SupportedDLNCCCList is information that defines the number of downlink non-contiguous CCs. This wireless parameter is a list of numbers of non-contiguous downlink CCs that are included in the downlink bands that can be accommodated by the transceiver device a3 of FIG. 9, that is, a series of numbers of the number of downlink non-contiguous CC, this indicating the mobile station CC capability in relation to the number of BB demodulation branches.

[SupportedDLCCMIMOList]

The wireless parameter SupportedDLCCMIMOList is information that defines the number of downlink CC MIMO streams. This wireless parameter is a series of numbers of the number of MIMO streams for each CC, with regard to downlink CCs that are included in the downlink bands that can be accommodated by the transceiver device a3 of FIG. 9, this indicating the mobile station CC capability in relationship to the number of RF receiving branches.

[SupportedULCCBWList]

The wireless parameter SupportedULCCBWList is information that defines the uplink CC frequency bandwidth numbers. This wireless parameter is a list of contiguous CC frequency bandwidths that are included in the uplink bands that can be accommodated by the transceiver device a3 of FIG. 9, that is, a series of numbers of the uplink contiguous CC frequency bandwidth numbers, this indicating the mobile station CC capability in relationship to the BB modulation branch frequency characteristics.

[SupportedULCOCCList]

The wireless parameter SupportedULCOCCList is information that defines the number of uplink contiguous CCs. This wireless parameter is a list of number of contiguous uplink CCs that are included in the uplink bands that can be accommodated by the transceiver device a3 in FIG. 9, that is, a series of numbers of the number of uplink contiguous CCs, this indicating the mobile station CC capability in relation to the number of BB modulation branches.

[SupportedULNCCCList]

The wireless parameter SupportedULNCCCList is information that defines the number of uplink non-contiguous CCs. This wireless parameter is a list of numbers of non-contiguous uplink CCs that are included in the uplink bands that can be accommodated by the transceiver device a3 of FIG. 9, that is, a series of numbers that indicate the number of uplink non-contiguous CCs, this indicating the mobile station CC capability in relation to the number of BB modulation branches.

[SupportedULCCMIMOList]

The wireless parameter SupportedULCCMIMOList is information that defines the number of uplink CC MIMO streams. This wireless parameter is a series of numbers of the number of MIMO streams for each CC, with regard to uplink CCs that are included in the uplink bands that can be accommodated by the transceiver device a3 of FIG. 9, this indicating the mobile station CC capability in relationship to the number of RF transmitting branches.

Specific examples of the wireless parameters in an example of the transceiver device a3 capable of accommodating each scenario are described below. FIG. 10 is a simplified drawing that shows an example of the relationship between scenarios and the wireless parameters according to the present embodiment. FIG. 10 shows the wireless parameters of a transceiver device a3 that accommodates the scenarios S4, S7, and S10 of FIG. 5.

<Wireless Parameters of a Transceiver Device a3 Accommodating the Scenario S4>

In the wireless parameters of a transceiver device a3 that can accommodate the scenario S4, in order to accommodate the frequency band number 22 (refer to FIG. 5), SupportedBandEUTRA=22, in order to accommodate the downlink CC frequency bandwidth of 20 MHz (refer to FIG. 5), from FIG. 11, SupportedDLCCBWList=6, in order to accommodate a number of downlink contiguous CCs of 2 (refer to FIG. 5), SupportedDLCOCCList=2, and in order to accommodate a number of downlink non-contiguous CCs of 2 (refer to FIG. 5), SupportedDLNCCCList=2. Also, the result of multiplying SupportedDLCOCCList and SupportedDLNCCCList is 4, (2×2). That is, because this transceiver device a3 uses 20-MHz downlink contiguous CCs and downlink non-contiguous CCs, a total of four, if each of the numbers of MIMO streams of 1 is used for communication, SupportedDLCCMIMOList would be [1, 1, 1, 1]. That is, this indicates that the transceiver device a3 allocates one MIMO stream (one RF receiving branch) with respect to each 20-MHz downlink CC in the frequency band 22.

In a transceiver device a3 that can accommodate the scenario S4, in order to accommodate an uplink CC frequency bandwidth of 20 MHz (refer to FIG. 5), from FIG. 11, SupportedULCCBWList=6, in order to accommodate a number of uplink contiguous CCs of 1 (refer to FIG. 5), SupportedULCOCCList=1, and in order to accommodate a number of uplink non-contiguous CCs of 2 (refer to FIG. 5), SupportedULNCCCList=2. Also, the result of multiplying SupportedULCOCCList and SupportedDLNCCCList is 2 (1×2). That is, because this transceiver device a3 uses 20-MHz uplink contiguous CCs and uplink non-contiguous CCs, a total of two, if each of the numbers of MIMO streams of 1 is used for communication, SupportedULCCMIMOList would be [1, 1]. That is, this indicates that the transceiver device a3 allocates one MIMO stream with respect to each 20-MHz uplink CC in the frequency band 22.

<Wireless Parameters of a Transceiver Device a3 Accommodating Scenario S7>

In the wireless parameter of a transceiver device a3 that can accommodate the scenario S7 in order to accommodate the frequency band numbers 3, 1, and 7 in sequence of increasing frequencies, SupportedBandEUTRA=[3, 1, 7], in order to accommodate the CC frequency bandwidths of 10 MHz, 10 MHz, and 20 MHz (refer to FIG. 5) of the downlink CCs in the respective frequency bands, from FIG. 11, SupportedDLCCBWList=[4, 4, 6], in order to accommodate the numbers of downlink contiguous CCs of 1, 1, and 1 (refer to FIG. 5) in the respective frequency bands, SupportedDLCOCCList=[1, 1, 1], and in order to accommodate the numbers of downlink non-contiguous CCs of 1, 1, and 1 (refer to FIG. 5) in the respective frequency bands, SupportedDLNCCCList=[1, 1, 1]. Also, the results of multiplying SupportedDLCOCCList and SupportedDLNCCCList (multiplication of the same components) is 1 (1×1), 1 (1×1), and 1 (1×1). That is, because this transceiver device a3 uses 10-MHz and 20-MHz downlink contiguous CCs and downlink non-contiguous CCs, a total of three, if each of the numbers of MIMO streams of 1, 2, and 4 is used for communication, SupportedDLCCMIMOList would be [1; 2; 4]. That is, this indicates that the transceiver device a3 allocates, respectively, one MIMO stream with respect to a 10-MHz downlink CC in the frequency band 3, two MIMO streams with respect to a 10-MHz uplink CC in the frequency band 1, and four MIMO streams with respect to a 20-MHz CC in the frequency band 7. Also, if each of the numbers of MIMO streams is 1, SupportedDLCCMIMOList would be [1; 1; 1]. Although this wireless parameter shows a semicolon (;) being used as the delimiter of the frequency bands, delimiting by semicolons is not required.

In a transceiver device a3 that can accommodate the scenario S7, in order to accommodate the uplink CC frequency bandwidths of 10 MHz, 10 MHz, and 20 MHz (refer to FIG. 5) in each respective frequency bands, from FIG. 11, the SupportedULCCBWList=[4, 4, 6], in order to accommodate the number of uplink contiguous CCs of 1, 1, and 1 (refer to FIG. 5) in each respective frequency bands, SupportedULCOCCList=[1, 1, 1], and in order to accommodate the number of uplink non-contiguous CCs of 1, 1, and 1 (refer to FIG. 5) in each respective frequency bands, SupportedULNCCCList=[1, 1, 1]. The results of multiplying SupportedULNCCCList and SupportedULCCCList are 1, 1, and 1. That is, because the transceiver device a3 uses 10-MHz and 20-MHz uplink contiguous CCs and uplink non-contiguous CCs, a total of three, if each of the numbers of MIMO streams of 1, 1, and 1 is used for communication, SupportedULCCMIMOList=[1; 1; 1]. That is, this indicates that the transceiver device a3 allocates, respectively, one MIMO stream with respect to a 10-MHz uplink CC in the frequency band 3, one MIMO stream with respect to a 10-MHz uplink CC in the frequency band 1, and one MIMO stream with respect to a 20-MHz uplink CC in the frequency band 7.

<Wireless Parameters of a Transceiver Device a3 Accommodating Scenario S10>

In FIG. 10, for example, in the wireless parameters of a transceiver device a3 that can accommodate the scenario S10, in order to accommodate the frequency band numbers 39, 34, and 40 (refer to FIG. 5) in sequence of increasing frequency, SupportedBandEUTRA=[39, 34, 40], in order to accommodate downlink CC frequency bandwidths of 20 MHz, 10 MHz, and 20 MHz (refer to FIG. 5) in each respective frequency band, from FIG. 11, SupportedDLCCBWList=[6, 4, 6], in order to accommodate the numbers of downlink contiguous CCs of 2, 1, and 2 (refer to FIG. 5) in each respective frequency band, SupportedDLCOCCList=[2, 1,2] and in order to accommodate numbers of downlink non-contiguous CCs of 1, 1, and 1 (refer to FIG. 5) in each respective frequency band, SupportedDLNCCCList=[1, 1, 1]. Also, the results of multiplying SupportedDLCOCCList and SupportedDLNCCCList (multiplying the same components) are 2 (2×1), 1 (1×1), and 2 (2×1). That is, because the transceiver device a3 uses 10-MHz and 20-MHz downlink contiguous CCs and downlink non-contiguous CCs, a total of five, if each of the numbers of MIMO streams of 1, 2, 2, 4, and 4 is used for communication, SupportedDLCCMIMOList=[1, 2; 2; 4, 4]. That is, this indicates that the transceiver device a3 allocates one and two MIMO streams respectively with respect to the two 20-MHz downlink CCs in the frequency band 39. It also indicates that the transceiver device a3 allocates two MIMO streams with respect the one 10-MHz downlink CC in the frequency band 34, and allocates four MIMO streams with respect to the two respective 20-MHz downlink CCs in the frequency band 40.

In a transceiver device a3 that can accommodate the scenario S10, in order to accommodate uplink CC frequency bandwidths of 20 MHz, 10 MHz, and 20 MHz (refer to FIG.

5) in each respective frequency band, from FIG. 11, SupportedULCCBWList=[6, 4, 6], in order to accommodate numbers of uplink contiguous CCs of 2, 1, and 2 (refer to FIG. 5) in each respective frequency band, SupportedULCOCCList=[2, 1, 2], and in order to accommodate numbers of uplink non-contiguous CCs of 1, 1, and 1 (refer to FIG. 5) in each respective frequency band, SupportedULNCCCList=[1, 1, 1]. The results of multiplying SupportredULCOCCList and SupportedDLNCCCList (multiplying same components) are 2 (2×1), 1 (1×1), and 2 (2×1). That is, because the transceiver device a3 uses 10-MHz and 20-MHz uplink contiguous CCs and uplink non-contiguous CCs, a total of five, if each of the numbers of MIMO streams of 1, 1, 1, 4, and 2 is used for communication, SupportedULCCMIMOList=[1, 1; 1; 4, 2]. That is, the transceiver device a3 allocates one MIMO stream with respect to each of two 20-MHz CCs in the frequency band 39. The transceiver device a3 also allocates one MIMO stream with respect to one 10-MHz uplink CC in the frequency band 34, and allocates four and two MIMO streams, in sequence of increasing frequency, for example, with respect to two 20-MHz uplink CCs in the frequency band 40.

<Constitution of the Mobile Station Apparatus A1>

Figure 12:
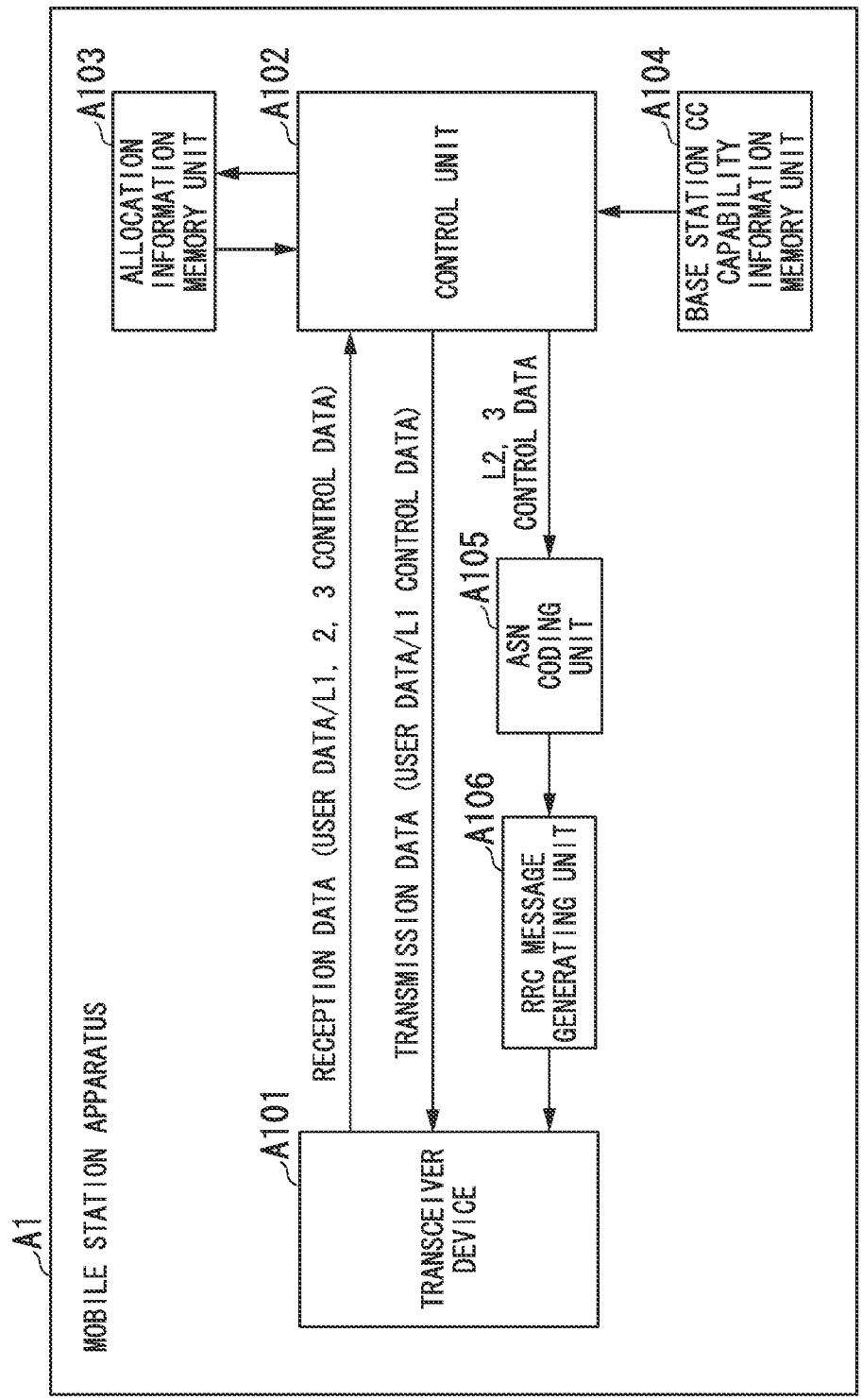
FIG. 12 is a simplified block diagram showing the constitution of a mobile station apparatus according to the present embodiment.

The mobile station apparatus A1 that has the transceiver device a1, a2, or a3 will now be described. FIG. 12 is a simplified block diagram showing the constitution of the mobile station apparatus A1 according to the present embodiment. In this drawing, the mobile station apparatus A1 is constituted so as to include a transceiver device A101, a control unit A102, an allocation information memory unit A103, a mobile station CC capability information memory unit A104, an ASN (abstract syntax notation) coding unit A105, and an RRC (Radio Resource Control) message generating unit A106.

The transceiver device A101 is the above-noted transceiver device a1, a2, or a3.

The control unit A102 controls the various parts of the mobile station apparatus A1. For example, the control unit A102 receives wireless resource information assigned from the base station apparatus B as control data and stores the received wireless resource information into the allocation information memory unit A103. At the time of transmitting and receiving user data, the control unit A102 reads the wireless resource information from the allocation information memory unit A103 and controls the transmission and receiving of user data.

The mobile station CC capability information memory unit A104 stores mobile station CC capability information (for example, wireless parameters, described in detail later) that defines the CCs that can be accommodated by itself into memory. The mobile station CC capability information is information in accordance with the mobile station apparatus constitution, and is written into the mobile station CC capability information memory unit A104 at the time of shipment from the factory, but may be subsequently updated.

The control unit A102 outputs to the ASN coding unit A105 mobile station CC capability information that is stored by the mobile station CC capability information memory unit A104. In this case, the mobile station CC capability information includes wireless parameters of the mobile station apparatus. Details of the mobile station CC capability information will be described later, along with the RRC message generation processing.

The ASN coding unit A105 performs coding of the mobile station CC capability information input from the control unit A102, converting and encoding it to abstract syntax notation (ASN. 1), and outputs the coded information to the RRC message generating unit A106. That is, the ASN coding unit A105 generates mobile station CC capability information that includes information defining the CCs in which the mobile station apparatus A1 can use in the communication with the base station apparatus B1. Details of the processing performed by the ASN coding unit A105 will be described later, along with the RRC message generation processing.

The RRC message generating unit A106 generates an LTE-A mobile station CC capability message (UE-EUTRA-Capability), which is mobile station CC capability information that includes information input from the ASN coding unit A105, and outputs it to the transceiver device A101 as a part of an uplink RRC message that includes control data. Details of the processing performed by the RRC message generating unit A106 will be described later, along with the RRC message generation processing.

The transceiver device A101 processes the RRC message input from the RRC message generating unit A106 on one or multiple RF transmitting branches and transmits it to the base station apparatus B.

The control unit A102, the allocation information memory unit A103, the mobile station CC capability information memory unit A104, the ASN coding unit A105, and the RRC message generating unit A106 may be included within an integrated circuit chip. Alternatively, a part of or all of the transceiver device A101 may be constituted so as to be included in an integrated circuit chip, and this is not a restriction.

<RRC Message Generation Processing>

The RRC message generation processing performed by the ASN coding unit A105 and the RRC message generating unit A106 will now be described.

FIG. 13 is a simplified drawing that shows an example of the structure of mobile station CC capability information message (UE-CC-Capability) according to the present embodiment.

In this drawing, the parameter maxCCBWs is the number of the maximum CC frequency bandwidth number. This maxCCBWs is, for example, in the example shown in FIG. 11, the maximum CC frequency bandwidth number of 6. The parameter maxCOCCs is the maximum number of contiguous CCs. In the case of considering the various scenarios of FIG. 5 and combination of two scenarios, maxCOCCs is, for example, 6. The parameter maxNCCCs is the maximum number of non-contiguous CCs. In the case of considering, for example, the various scenarios of FIG. 5 and combination of two scenarios, maxNCCCs is 6. The parameter maxMIMOs is the maximum number of MIMO streams. If a maximum number of antennas of, for example, 8 is considered, maxMIMOs is 8. The parameter maxBands is the maximum number of frequency bands. If, for example, the frequency band number 41 in FIG. 2 is considered, the maxBands is 64. The parameter maxUEBands is the maximum number of frequency bands that can be accommodated by the mobile station apparatus. If, for example, the level of complexity, power consumption, cost, productivity, and international roaming and the like of the mobile station apparatus are considered, maxUEBands is 6.

In FIG. 13, the structure of the LTE-A mobile station CC capability message (UE-CC-Capability) includes the wireless (UE-Parameters) and other parameters of the mobile station apparatus. The structure of the mobile station apparatus wireless parameters (UE-Parameters) includes nine wireless parameters, these being SupportedBandEUTRA, SupportedDLCCBWList, SupportedDLCOCCList, SupportedDLNCCCList, SupportedDLCCMIMOList, SupportedULCCBWList, SupportedULCOCCList, SupportedULNCCCList, and SupportedULCCMIMOList. The structure of other parameters is of parameters of the other specifications noted in the 3GPP standard TS36.331 (Radio Resource Control), and is omitted herein.

The values of each of the wireless parameters of the mobile station apparatus will now be described.

For example, SupportedBandEUTRA includes bandEUTRA, which indicates the maximum frequency band numbers of the maxBands of 64, an integer from 1 to 64 being substituted into bandEUTRA. SuppoortDLCCBWList includes DLCCBW, which indicates the numbers of CC frequency bandwidths of the maximum maxCCBWs of 6, an integer from 0 to 6 being substituted into DLCCBW. SupportedDLCOCCList includes DLCOCC, which indicates the number of downlink contiguous CCs of the maximum maxUEBands of 6, an integer from 0 to 6 being substituted into DLCOCC. SupportedDLNCCCList includes DLNCCC, which indicates the number of downlink non-contiguous CCs of the maximum maxUEBands 6, an integer from 0 to 6 being substituted into DLNCCC. SupportedDLCCMIMOList includes DLCCMIMO, which indicates the number of downlink CC MIMO streams of the maximum maxUEBands 6×maxCOCCs 6×maxNCCCs 6, which is 216, an integer from 0 to 8 being substituted into DLCCMIMO.

SupportedULCCBWList includes ULCCBW, which indicates the numbers of CC frequency bandwidths of the maximum maxCCBWs of 6, an integer from 0 to 6 being substituted into ULCCBW. SupportedULCOCCList includes ULCOCC, which indicates the number of uplink contiguous CCs of the maximum maxUEBands of 6, an integer from 0 to 6 being substituted into ULCOCC. SuppoertedULNCCCList includes ULNCCC, which indicates the number of uplink non-contiguous CCs of the maximum maxUEBands of 6, an integer from 0 to 6 being substituted into ULNCCC. SupportedULCCMIMOList includes ULCCMIMO, which indicates the number of uplink CC MIMO streams of the maximum maxUEBands 6×maxCOCCs 6×maxNCCCs 6, which is 216, an integer from 0 to 8 being substituted into ULCCMIMO.

For example, the LTE-A mobile station apparatus A1, in LTE-A mobile station CC capability information structure of FIG. 13, substitutes wireless parameter values of the LTE-A mobile station apparatus A1 capable of accommodating each of the scenarios S4, S7, and S10.

FIG. 14 is a simplified drawing showing an example of actual (ASN.1 Object Instance) data of the mobile station CC capability message according to the present embodiment. Because the values of each of the wireless parameters are the same as described regarding FIG. 10, the descriptions thereof will be omitted.

In this case, in an LTE-A mobile station apparatus A1 that can accommodate the scenario S10, a TDD mode CC is used, meaning that some of the wireless parameters are the same between the uplink and the downlink. In this case, those wireless parameters may be omitted. In FIG. 14, for example, in the wireless parameters of the LTE-A mobile station apparatus A1 that accommodates the scenario S10, because the wireless parameters SupportedULCCBWList, SupportedULCOCCList, and SupportedULNCCCList are the same as for the downlink, they may be omitted.

In this case, although in the LTE-A mobile station apparatus A1 that can accommodate the scenarios S3, S7, and S10, a different number of MIMO streams may be used in each CC, a limitation of using the same number of MIMO streams in each frequency band may be imposed. For example, in the case of an LTE-A mobile station apparatus A1 that can accommodate the scenario 510, when accommodating a number of MIMO streams of 1 on two downlink contiguous CCs in the frequency band number 39, a number of MIMO streams of 2 on one downlink non-contiguous CC in the frequency band number 34, and a number of MIMO streams of 4 on two downlink non-contiguous CCs in the frequency band number 40, SuppoortedDLCCMIMOList=[1, 2, 4]. Also, in the case of accommodating a number of MIMO streams of 1 on two uplink contiguous CCs in the frequency band number 39, a number of MIMO streams of 1 on one uplink non-contiguous CC in the frequency band number 34, and a number of MIMO streams of 2 on two uplink contiguous CCs in the frequency band number 40, SupportedULCCMIMOList=[1, 1, 2]. The LTE-A mobile station CC capability message may be shortened.

In this case, in the LTE-A mobile station apparatus A1 that can accommodate the scenarios S3, S7, and S10 although the same number of MIMO streams supported in each frequency band, a limitation of using the same number of MIMO streams in each frequency band may be imposed. For example, in the case of an LTE-A mobile station apparatus A1 capable of accommodating the scenario S10, when accommodating a number of MIMO streams of 4 on all CCs with respect to the frequency band numbers 39, 34, and 40, SupportedDLCCMIMOList=[4]. Also, in the case of accommodating a number of MIMO streams of 2 on all CCs with respect to the frequency band numbers 39, 34, and 40, SupportedULCCMIMOList=[2]. The LTE-A mobile station CC capability message may be shortened.

<Number of MIMO Streams Setting>

The number of MIMO streams is set so that the mobile station CC capability information of the mobile station apparatus A1 is the data processing capability that is related to the uplink and downlink data transfer rates of the mobile station apparatus. Specifically, the number of MIMO streams is set so that the maximum uplink and downlink data transfer rates calculated from the mobile station CC capability information is within the data buffer bit size.

<Constitution of the Base Station Apparatus B1>

Figure 15:
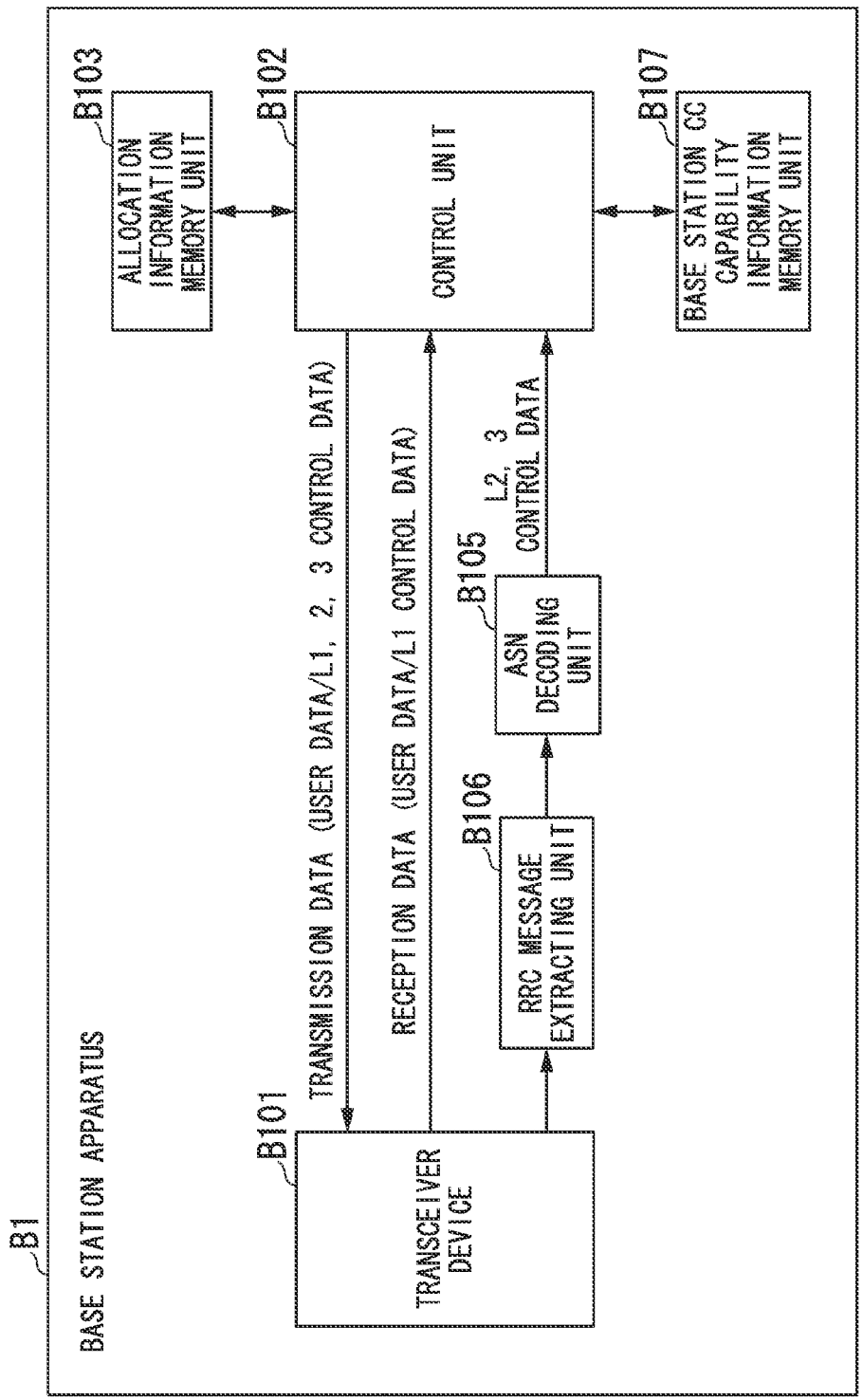
FIG. 15 is a simplified block diagram showing the constitution of a base station apparatus according to the present embodiment.

FIG. 15 is a simplified block diagram that shows the constitution of the mobile station apparatus B1 according to the present embodiment. In this drawing, the base station apparatus 131 is constituted so as to include a transceiver device B101, a control unit B102, an allocation information memory unit B103, an RRC message extracting unit B106, an ASN decoding unit B105, and a mobile station CC capability information memory unit B107.

The transceiver device B101 transmits and receives data with the mobile station apparatus A1. Because the transceiver device B101 has the same basic constitution and basic function as the transceiver device a3, its description will be omitted.

The RRC message extracting unit B106 extracts the RRC message from control data of the upper order layers 2 and 3 transmitted by the mobile station apparatus by the transceiver device B101 and outputs it to the ASN decoding unit B105.

The ASN decoding unit B105 decodes the RRC message input from the RRC message extracting unit B106, that is, the information coded in abstract syntax notation 1 (ASN.1). From the decoded information, the ASN decoding unit B105, based on the structure of the mobile station CC capability message shown in FIG. 13, extracts the actual data. The ASN decoding unit B105 outputs the extracted actual data to the control unit B102 as the mobile station CC capability information.

The control unit B102 controls the various parts of the base station apparatus B1. For example, the control unit B102 stores the mobile station CC capability information input from the ASN decoding unit B105 in the mobile station CC capability information memory unit B107. The control unit B102 also, based on the mobile station CC capability information stored in the mobile station CC capability information memory unit B107, determines the allocation of uplink and downlink wireless resources of the mobile station apparatus A1 (known as resource allocation processing).

The control unit B102, the allocation information memory unit B103, the RRC message extracting unit B106, and the ASN decoding unit B105 may be included within an integrated circuit chip. Alternatively, all or a part of the transceiver device B101 may be constituted so as to be included within an integrated circuit chip, this is not a restriction.

The resource allocation processing will be described in detail below.

The control unit B102, based on its own communication capability and the mobile station CC capability information, determines the allocation of uplink and downlink wireless resources of the mobile station apparatus A1. The control unit B102 also stores beforehand base station apparatus communication capability information that defines its own communication capability. A specific example of the resource allocation processing is shown below.

<First Example of Resource Allocation Processing>

Figure 16:
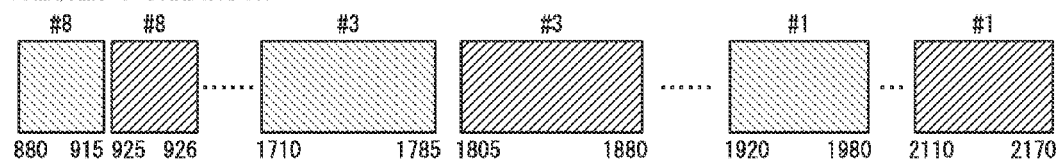
FIG. 16 is a chart showing another example of the actual data of the mobile station CC capability message according to the present embodiment.

The first example, the case in which the base station apparatus B1 communicates using the frequency bands 3, 1, and 8 will be described. In this case, the control unit B102 stores the frequency bands 3, 1, and 8 beforehand as base station communication capability information. Also, in the first example, the case will be described in which the mobile station apparatus A1 transmits a mobile station CC capability message (refer to FIG. 16) that indicates that it is capable of accommodating the scenarios S5 and S8. FIG. 16 is a drawing showing another example of the actual data of the mobile station CC capability message according to the present embodiment. In this case, the control unit B102 performs the following described resource allocation processing.

The control unit B102 makes the determination that, in the frequency band 3, it is possible to allocate one 15-MHz (CC frequency bandwidth number 5) uplink non-contiguous CC and one 15-MHz downlink non-contiguous CC. In the same manner, the control unit B102 makes the determination that, in the frequency band 1, it is possible to allocate one 15-MHz uplink non-contiguous CC and one 15-MHz downlink non-contiguous CC. In this case, the control unit B102, considering the wireless propagation conditions, the load balance, and the like, allocates, for example, two appropriate 15-MHz uplink non-contiguous CCs and two appropriate 15-MHz downlink non-contiguous CCs in the frequency bands 3 and 1.

At the time of the initial access (for example, random access) from the mobile station apparatus A1, the control unit B102 notifies information such as the allocated CC numbers, the carrier frequencies, and the like to the mobile station apparatus A1. The control unit B102 also allocates downlink wireless resources of the mobile station apparatus A1, that is, a downlink resource block RB for the mobile station apparatus A1 to receive its own data, to one or two downlink CCs of the two allocated downlink CCs. The control unit B102 also allocates uplink wireless resources of the mobile station apparatus A1, that is, an uplink resource block RB for the mobile station apparatus A1 to transmit its own data, to one or two uplink CCs of the two allocated uplink CCs.

The control unit B102 also, based on SupportedDLCCMI-MOList=[2, 2, 4, 4], makes the determination that the number of MIMO streams that can be accommodated by each of two 5-MHz downlink non-contiguous CCs in the frequency band 8 is 2, and makes the determination that the number of MIMO streams that can be accommodated by each of two 15-MHz downlink non-contiguous CCs in the frequency bands 3 and 1 is 4. In this case, the control unit B102, considering the wireless propagation conditions, the load balance, and the like, allocates, for example, a number of MIMO streams of 2 with respect to each of the two 15-MHz downlink con-contiguous CCs in the frequency bands 3 and 1.

The control unit B102 also, based on SupportedULCCMI-MOList=[1, 1, 2, 2], makes the determination that the number of MIMO streams that can be accommodated by two 5-MHz uplink non-contiguous CCs in the frequency band 8 is 1, and that the number of MIMO streams that can be accommodated by each of two 15-MHz uplink non-contiguous CCs in the frequency bands 3 and 1 is 2. For example, the control unit B102, considering the wireless propagation conditions, the load balance, and the like, allocates, for example, a number of MIMO streams of 1 with respect to each of the two 15-MHz uplink non-contiguous CCs in the frequency bands 3 and 1.

The allocation information memory unit B103 stores the wireless resource allocation information with respect to the mobile station apparatus A1 determined by the control unit B102. The control unit B102 generates layer 1, 2 and 3 control data that is control data and that includes the wireless resource allocation information, and transmits it via the transceiver device B101 to the mobile station apparatus A1.

<Second Resource Allocation Processing Example>

In the second example, the case will be described in which the base station apparatus B1 communicates using the frequency band 1. In this second example, the case will be described in which the mobile station apparatus A1 transmits a mobile station CC capability message (refer to FIG. 16) that indicates that it is capable of accommodating scenarios S5 and S8. In this case, the control unit B102 performs the following described resource allocation processing.

The control unit B102 makes the determination that, in the frequency band 1, it is possible to allocation one 15-MHz uplink non-contiguous CC and one 15-MHz downlink non-contiguous CC. In this case, the control unit B102, considering the wireless propagation conditions, the load balance, and the like, allocates, for example, an appropriate one 15-MHz uplink non-contiguous CC and an appropriate one 15-MHz downlink non-contiguous CC in, for example, the frequency band 1.

At the time of initial access (for example, random access) from the mobile station apparatus A1, the control unit B102 notifies information such as the allocated CC numbers, the carrier frequencies, and the like to the mobile station apparatus A1. The control unit B102 also allocates downlink wireless resources of the mobile station apparatus A1 within the allocated CCs.

The control unit B102, based on SupportedDLCCMI-MOList=[2, 2, 4, 4], makes the determination that the number of MIMO streams that can be accommodated by each of two 5-MHz downlink non-contiguous CCs in the frequency band 8 is 2, and that the number of MIMO streams that can be accommodated by each of two 15-MHz downlink non-contiguous CCs in the frequency bands 3 and 1 is 4. In this case, the control unit B102, considering the wireless propagation conditions, the load balance, and the like, allocates, for example, the number of MIMO streams of 2 with respect to the two 15-MHz downlink non-contiguous CCs in the frequency band 1

The control unit B102 also, based on SupportedULCCMI-MOList=[1, 1, 2, 2], makes the determination that the number of MIMO streams that can be accommodated by each of two 5-MHz uplink non-contiguous CCs in the frequency band 8 is 1, and that the number of streams that can be accommodated by each of two 15-MHz uplink non-contiguous CCs in the frequency bands 3 and 1 is 2. For example, the control unit B102, considering the wireless propagation conditions, the load balance, and the like, allocates, for example, the number of MIMO streams of 1 with respect to one 15-MHz uplink non-contiguous CC in the frequency band 1. The allocation information memory unit B103 stores the wireless resource allocation information with respect to the mobile station apparatus A1, which has been determined by the control unit B102, and the control unit B102 generates control data that includes the wireless resource allocation information and transmits it via the transceiver device B101 to the mobile station apparatus A1.

Although the foregoing presents two examples in which the mobile station apparatus A1 is a mobile station apparatus A1 that can accommodate the scenarios S5 and S8, in the LTE-A mobile station CC capability message of the mobile station apparatus A1, there is no restriction to the scenarios S1 to S22, and various CC combinations can be expressed. That is, the base station apparatus B1 can select CCs that accommodate a variety of LTE-A mobile station CC capability messages of the mobile station apparatus A1.

<Third Resource Allocation Processing Example>

Figure 17:
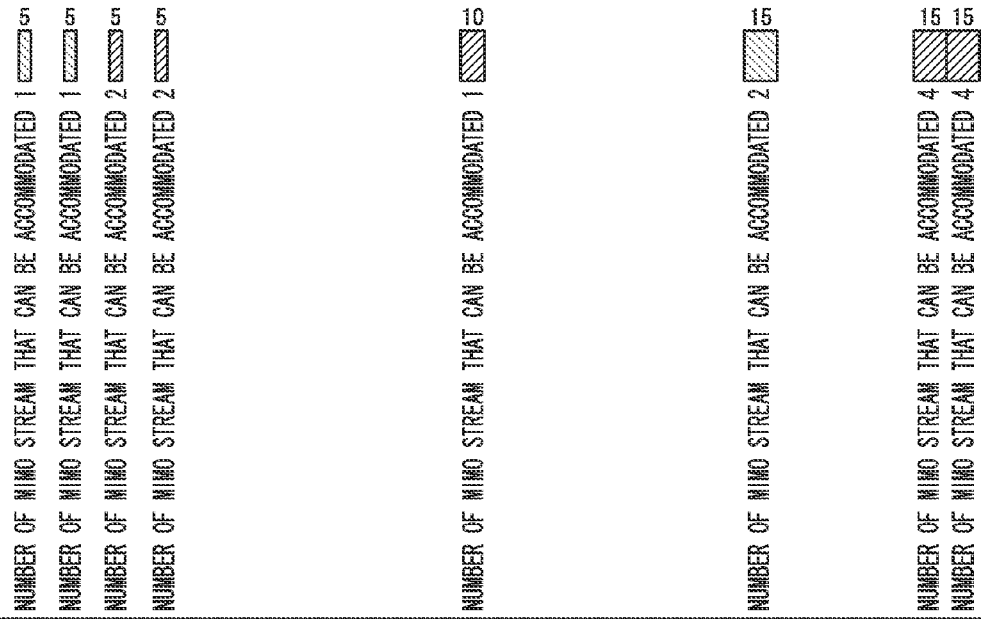
FIG. 17 is a simplified drawing showing an example of frequency allocation indicated by other scenario information according to the present embodiment.

In the third example, the case will be described in which the base station apparatus B1 can communicate using the frequency bands 8 and 1. Also, in the third example, the case is described in which the mobile station apparatus A1 can accommodate the scenario shown in FIG. 17 and the case in which it transmits the mobile station CC capability message shown in FIG. 18. FIG. 17 is a simplified drawing that shows an example of frequency allocation indicated by other scenario information according to the present embodiment. FIG. 18 is a drawing that shows another example of actual data of a mobile station CC capability message according to the present embodiment. In this case, the control unit B102 performs the following described resource allocation processing.

The control unit B102 makes the determination that two 5-MHz uplink non-contiguous CCs and two 5-MHz downlink non-contiguous CCs can be assigned in the frequency band 8. The control unit B102 also makes the determination that one 15-MHz uplink non-contiguous CC and two 15-MHz downlink contiguous CCs can be allocated in the frequency band 1. In this case, the control unit B102, considering the wireless propagation conditions, the load balance, and the like, allocates, for example, two appropriate 5-MHz uplink non-contiguous CCs and two appropriate 5-MHz downlink non-contiguous CCs in the frequency band 8. The control unit B102 also, for example, allocates one appropriate 15-MHz uplink non-contiguous CC and two appropriate 15-MHz downlink contiguous CCs in the frequency band 1.

At the time of initial access (for example, random access), the control unit B102 notifies information such as the allocated CC numbers, the carrier frequencies, and the like to the mobile station apparatus A1. The control unit B102 also allocates downlink wireless resources of the mobile station apparatus A1 within the allocated CCs.

The control unit B102, based on SupportedDLCCMI-MOList=[2, 2, 1, 4, 4], makes the determination that the number of MIMO streams that can be accommodated by each of two 5-MHz downlink non-contiguous CCs in the frequency band 8 is 2, that the number of MIMO streams that can be accommodated by each one 10-MHz downlink non-contiguous CC in the frequency band 3 is 1, and that the number of MIMO streams that can be accommodated by each of two 15-MHz downlink non-contiguous CCs in the frequency band 1 is 4. In this case, the control unit B102, considering the wireless propagation conditions, the load balancing, and the like, allocates, for example, a number of MIMO streams of 2 with respect to one 5-MHz downlink non-contiguous CC in the frequency band 8, and allocates a number of MIMO streams of 2 and 4, respectively, to two 15-MHz downlink non-contiguous CCs in the frequency band 1.

The control unit B102, based on SupportedULCCMI-MOList=[1,1,0,2], makes the determination that the number of MIMO streams that can be accommodated by each of two 5-MHz uplink non-contiguous CCs in the frequency band 8 is 1, and that the number of MIMO streams that can be accommodated by each one 15-MHz uplink non-contiguous CC in the frequency band 1 is 2. For example, the control unit B102, considering the wireless propagation conditions, the load balance, and the like, allocates the number of MIMO streams of 1 with respect to the two 5-MHz uplink non-contiguous CCs in the frequency band 8, and allocates the number of M IMO streams of 2 with respect to the one 15-MHz uplink non-contiguous CC in the frequency band 1. The allocation information memory unit B103 stores the wireless resource allocation information with respect to the mobile station apparatus A1, which has been determined by the control unit B102, and the control unit B102 generates control data that includes the wireless resource allocation information and transmits it via the transceiver device B101 to the mobile station apparatus A1.

In this manner, according to the present embodiment, the mobile station apparatus A1 transmits to the base station apparatus B1 mobile station CC capability information that includes information defining the CCs supported to communicate with the base station apparatus B1. Also, the base station apparatus B1, based on the mobile station CC capability information received from the mobile station apparatus A1, allocates CCs used for communication with respect to the mobile station apparatus A1. The mobile station apparatus A1, based on the mobile station component carrier capability information, uses the CCs allocated by the base station apparatus B1 to communicate with the base station apparatus. By doing this, in the present embodiment, it is possible to allocate wireless resources appropriate to communication between the mobile station apparatus A1 and the base station apparatus B1.

That is, according to the present embodiment, the control unit B102 of the base station apparatus B compares the mobile station CC capability information from the mobile station apparatus A1 with its own base station apparatus communication capability information and, within the range of its own communication capability and the mobile station apparatus communication capability, can allocate to the mobile station apparatus A1 appropriate downlink and uplink wireless resources. Also, according to the present embodiment, with respect to combinations of various LTE-A mobile station apparatus configurations for the purpose of accommodating the various LTE-A technical elements noted as above as (a) to (l), by generating and transmitting the mobile station apparatus configuration information to the base station apparatus B1, the base station apparatus B1, in response to the mobile station apparatus constitution information, can select appropriate mobile station apparatus A1 performance that can accommodate various LTE-A technical elements, thereby enabling appropriate allocation of uplink and downlink wireless resources.

Also, according to the present embodiment, although the LTE-A mobile station apparatus CC capability messages shown in FIG. 13 and FIG. 14 include the wireless parameter SupportedBandListEUTRA, SupportedPAoutList, which indicates the maximum transmission power level as the wireless parameters of the power amplifier PA that is included in each RF transmitting branch number, may be included. Also, this SupportedPAoutList includes a number of maximum transmission power level numbers PAout that is the maximum RF transmission level branch number I, an integer from 1 to 2 may be substituted into the maximum transmission power level number PAout. For example, in the case of four RF transmitting branches (I=4), PAout=[1, 1, 2, 2] may indicate that the maximum transmission power level of the PAs of the RF transmission branch numbers 1 and 2 is 23 dBm, and that the maximum transmission power level of the PAs of the RF transmission branch numbers 3 and 4 is 20 dBm.

Also, although the bandEUTRA included in SupportedBandListEUTRA indicates the relationship to the uplink frequency bandwidth, downlink frequency bandwidth, the frequency bandwidth and the transfer mode as shown in FIG. 2, a number of contiguous uplink frequency bandwidth and downlink frequency bandwidth may be linked, so as to redefine a new uplink frequency bandwidth and downlink frequency bandwidth that are broader. For example, a new uplink frequency bandwidth 1 is formed by linking the frequency band numbers 1 and 2 in FIG. 2, enabling accommodation of an uplink frequency bandwidth of 1920 MHz to 2170 MHz and a downlink frequency bandwidth of 1850 MHz to 1990 MHz. Although in FIG. 9 indicates that multiple BB demodulation branches are included in one RF receiving branch and that multiple 1313 modulation branches are included in one RF transmitting branch, if technological advances result in a wide band for the frequency bandwidth of the quadrature modulator a15 and the quadrature demodulator a12 of FIG. 6, this being the same as the transmitting and receiving bandwidths, one quadrature modulator and one quadrature demodulator may be used in one wireless transceiver device in one RF transmission and receiving branches. Also, a constitution may be adopted in which multiple RF transmitting/receiving branches are constituted by multiple separate wireless transmitting/receiving units, quadrature modulators and demodulators, and baseband modulators and demodulators after one transmitting and receiving antenna and one DUP or multiple transmitting and receiving antennas and multiple DUPs.

Second Embodiment

The second embodiment of the present invention will be described below, with references made to the drawings.

In the above-noted first embodiment, it is shown that, by the mobile station apparatus transmitting to the base station apparatus mobile station CC capability information that includes wireless parameters, it is possible for the base station apparatus to combine various CCs and allocate appropriate wireless resources to the mobile station apparatus. However, because the mobile station CC capability of the mobile station apparatus is related not only to the improvement of the data transfer rate, but also to a variety of LTE-A technical elements, for example, (i) the coordinated communication CoMP between base station apparatuses, and (j) the uplink transmitting diversity system, (k) the frequency allocation situation of each mobile telephone service operator and (l) domestic and overseas roaming, there are cases in which the data transfer rate of the mobile station apparatus is limited not only by the mobile station CC capability of the mobile station apparatus but also by the bit size of the data buffer.

The present embodiment will be described for the case in which the mobile station apparatus transmits to the base station apparatus a mobile station CC capability message that includes, in addition to the wireless parameters of the first embodiment, the mobile station apparatus category information (refer to FIG. 24) that represents the maximum data transfer rate, and in which the base station apparatus, based on the mobile station CC capability message, allocates wireless resources to be used in communication with the mobile station apparatus.

Also, because the conceptual drawing of the communication system according to the present embodiment would be the same as FIG. 1 in the first embodiment, the description thereof will be omitted. Each of the mobile station apparatuses A11 and A12 of the present embodiment are referred to as the mobile station apparatus A2. In this case, as will be described later, the mobile station apparatus A2 is constituted so as to include a transceiver device a1 (FIG. 6), a2 (FIG. 8), or a3 (FIG. 9).

The categories (known as the LTE mobile station apparatus categories) of mobile station apparatuses in the conventional art (LTE) will be described, followed by a description of the categories (known as the LTE-A mobile station apparatus categories) of mobile station apparatuses in the present embodiment (LTE-A).

<Mobile Station Apparatus Categories>

FIG. 19 is a simplified chart that shows the LTE mobile station apparatus category correspondence information in the second embodiment of the present invention. This chart shows that there are five LTE mobile station apparatus categories (Category1 to 5). This chart also shows that these LTE mobile station apparatus categories establish the mobile station apparatus downlink (DL) and uplink (UL) data transfer rate (bit rate, related to the bit size of the data buffer), the mobile station apparatus downlink and uplink modulation scheme, and the number of downlink MIMO streams (for example, the number of receiving antennas; number of MIMO streams).

FIG. 19 shows that, in the case of the LTE mobile station apparatus category 1 (Category1), the downlink data transfer rate of the mobile station apparatus is 10 Mbps, the uplink data transfer rate is 5 Mbps, the downlink modulation scheme is QPSK, 16QAM, or 64QAM, the uplink modulation scheme is QPSK, 16QAM, and the number of downlink MIMO streams is 1.

However, because the LTE-A mobile station apparatus adopts CA technology, it cannot accommodate a one-to-one relationship between the downlink data transfer rate and the number of downlink MIMO streams, such as with LTE mobile station apparatuses.

The LTE-A mobile station apparatus categories (refer to FIG. 24) according to the present embodiment will be described below. First, using FIG. 20 to FIG. 23, the uplink and downlink maximum data transfer rate will be described.

FIG. 20 is a simplified chart that shows an example of the relationship between the CC frequency bandwidth $BW_{channel}$ (channel bandwidth) and the number of wireless resource blocks N in the present embodiment. Also, this chart is the same as a drawing that is included in the 3GPP standard TS36.101 (User Equipment (UE) Radio Transmission and Reception). This drawing shows, for example, that in the case of the $BW_{Channel}$ being 20 MHz, the number of wireless resource blocks $N_{RB}$ is 100, meaning that the constitution is one having 100 wireless resource blocks.

FIG. 21 is a simplified chart that shows an example of the relationship between the CC frequency bandwidths and the maximum transport block size in the present embodiment. In the 3GPP standard TS36.213 (Physical Layer Procedures), with regard to the transport block size (TBS), there is a description of the relationship between the transport block size index (TBS Index) and the number of wireless resource blocks $N_{RB}$. Therefore, with regard to the transport block size, it is possible to derive the relationship between the CC frequency bandwidth $BW_{Channel}$ and the transport block size index (TBS Index). The transport block size index (TBS Index) is dependent upon the adaptive modulation MCS index (Modulation and Coding Scheme Index) and the modulation order (Modulation Order), which are data modulation parameters, and is defined by a number in the range 0 to 26.

FIG. 21 is for the transport block size index if the transport block size is maximum ($TBS_{max}$), that is, for the transport block size index number of 26, for which the data transfer rate BR (bit rate) is maximum. This chart shows the relationship between the CC frequency bandwidth $BW_{Channel}$ and the transport block size if the transport block size index is 26. FIG. 21 indicates, for example, that, for the case of $BW_{Channel}$=20 MHz, $TBS_{max}$=75,376 bits. Thus, because the transport block is 1 ms, conversion to the data transfer rate yields approximately 75 Mbps at 75,376 kbps.

In this manner, using the relationship shown in FIG. 21, it is possible to calculate the maximum data transfer rate BR from the CC frequency bandwidth $BW_{Channel}$.

FIG. 22 is a simplified chart that shows an example of the relationship between the number of MIMO streams and the maximum data transfer rate in each scenario in the present embodiment. This chart shows the maximum data transfer rates calculated using the CC frequency bandwidths for each number of MIMO streams in the scenarios S1 to S22. That is, the maximum data transfer rates in this chart are calculated by extracting from the CC frequency bandwidths of CCs in each scenario the maximum data transfer rates using FIG. 21, and multiplying the extracted maximum data transfer rates by the number of CCs and by the number of MIMO streams.

For example, in the uplink of the scenario S4, because there are two 20-MHz non-contiguous CCs, the uplink frequency bandwidth is 20×2 MHz. And in the downlink of the scenario S4, with two 20-MHz contiguous CCs taken as one CC, since there are two of those CCs, the downlink frequency bandwidth is 20×4 MHz. In contrast, in FIG. 21, if the CC frequency bandwidth is 20 MHz, the maximum data transfer BR is 75,376 kbps. Thus, if the number of MIMO streams is 1 in the scenario S4, the maximum data transfer rate BR for an uplink frequency bandwidth of 20×2 MHz becomes 150,752 (=75,376×2), kbps and the maximum data transfer rate BR for a downlink frequency band of 20×4 MHz becomes 301,504 (=75376×4) kbps.

Because the data transfer rate is in principal proportional to the number of MIMO streams, if the number of MIMO streams is 2 in the scenario S4, the uplink frequency bandwidth maximum data transfer rate BR becomes 301,504 (=150,752×2) kbps, and the downlink frequency bandwidth maximum data transfer rate BR becomes 603,008 (=301,504×2) kbps. If the number of MIMO streams is 4 in the scenario S4, the uplink frequency bandwidth maximum data transfer rate BR becomes 603,008 (=150,752×4) kbps, and the downlink frequency bandwidth maximum data transfer rate BR becomes 1,206,016 (=301,504×4) kbps.

FIG. 23 is a conceptual chart that shows an example of the uplink and downlink maximum data transfer rates according to the present embodiment. This chart shows a ranking of all the downlink maximum data transfer rates BR and all the uplink maximum data transfer rates BR in FIG. 22. As shown in FIG. 23, there are 25 different downlink data transfer rates BR (DL BR) and 26 different uplink maximum data transfer rates BR (UL BR).

FIG. 24 is a simplified chart that shows an example of the LTE-A mobile station apparatus category information according to the present embodiment. This chart shows the relationship between the category numbers of the LTE-A mobile station apparatus category (6 to 10: Category6, 7, 8, 9, 10) and the uplink and downlink maximum data transfer rate. The maximum data transfer rate for each of the categories are BR11 to BR15 and BR21 to BR25 maximum data transfer rates selected from the maximum data transfer rates in FIG. 23. FIG. 24 shows that, for example, in the case of the LTE-A mobile station apparatus category 6 (Category6), the mobile station apparatus downlink maximum data transfer rate is 36,672 kbps and the uplink maximum data transfer rate is 35,376 kbps. That is, the mobile station apparatus category information defines the maximum data transfer rate.

In FIG. 24, the category number of 10 of the LTE-A mobile station apparatus categories is selected as the largest one. This is because, with regard to the maximum LTE-A mobile station apparatus category, a maximum uplink data transfer rate of 500 Mbps and a maximum downlink data transfer rate of 1000 Mbps are required as IMT-Advanced required conditions. That is, selected values that satisfy these required conditions are an uplink maximum data transfer rate of 603,008 kbps and a downlink maximum data transfer rate of 1,206,016 kbps. In FIG. 24, the category number of 6 of the LTE-A mobile station apparatus categories is selected as the largest one. This is done because the uplink maximum data transfer rate of 35,376 kbps and the downlink maximum data transfer rate of 36,672 kbps are selected so as to be able to accommodate the scenario in which the downlink maximum data transfer rate is minimum (S12) and the scenarios in which the uplink maximum data transfer rate is minimum (S5, and S13 to S22). With regard to uplink and downlink data transfer rates for the other categories, three pairs are selected, referring to the ratios between the LTE mobile station apparatus categories and the ratios between the uplink and downlink data transfer rates in FIG. 19.

The LTE-A mobile station apparatus categories according to the present invention are not restricted to those shown in FIG. 24. For example, the maximum data transfer rates of FIG. 23 may be selected by considering the complexity of the LTE-A mobile station apparatus hardware constitution (for example, the data buffer memory capacity, the number of RF transmitting and receiving branches, and the number of BB modulation and demodulation branches and the like). Also, the definitions of the LTE mobile station apparatus categories of FIG. 19 may be changed, thereby redefining a part or all of the LTE-A mobile station apparatus categories.

<Constitution of the Mobile Station Apparatus A2>

Figure 25:
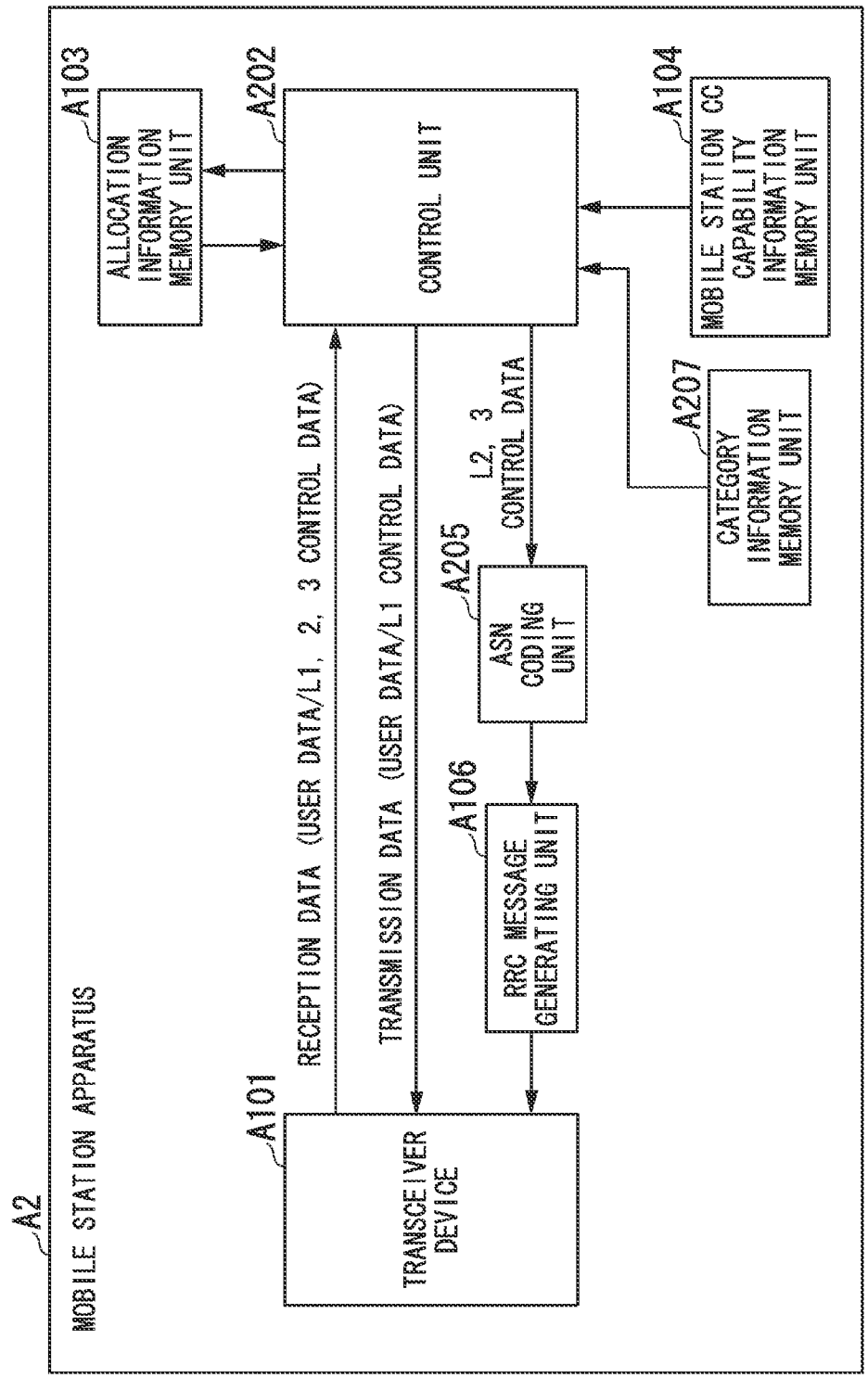
FIG. 25 is a simplified block diagram showing the constitution of a mobile station apparatus A2 according to the present embodiment.

FIG. 25 is a simplified block diagram showing the constitution of the mobile station apparatus A2 according to the second embodiment of the present invention. Compared with the mobile station apparatus A2 (FIG. 25) of the present embodiment and the mobile station apparatus A1 (FIG. 12) of the first embodiment, a category information memory unit A207, a control unit A202 and an ASN coding unit A205 differ. However, the functions of the other constituent elements (the transceiver device A101, the allocation information memory unit A103, the RRC message generating unit A106, and the mobile station CC capability information memory unit A104) are the same as in the first embodiment. The descriptions of the functions that are the same as in the first embodiment will be omitted.

The category information memory unit A207 stores mobile station apparatus category information, which is mobile station apparatus category information (both LTE mobile station apparatus category in FIG. 19 and LTE-A mobile station apparatus category in FIG. 24 or only LTE-A mobile station apparatus category in FIG. 24) that itself can accommodate (and is the maximum data transmission rate that can be transmitted and received). The category information memory unit A207 stores into memory reference symbols (for example, A to J), integers (for example, 1 to 10), or bit information (for example, 3 bits). In this case, the mobile station apparatus category information is set previously and to be written into the category information memory unit A207 at the time of shipment from the factory, and at the time of sales in accordance with the mobile station apparatus configuration. Also, the mobile station apparatus category information may be accommodated with mobile station apparatus individual information such as the individual identification number, serial number, or manufacturing number of the mobile station apparatus.

The control unit A202 controls various parts of the mobile station apparatus A2. For example, the control unit A202 receives wireless resource information allocated from the base station apparatus B and stores the received wireless resource information into the allocation information memory unit A103. At the time of transmitting and receiving user data, the control unit A202 reads the wireless resource information from the allocation information memory unit A103 and controls the transmitted and reception data.

The control unit A202 outputs to the ASN coding unit A205 mobile station CC capability information that is stored by the mobile station CC capability information memory unit A104 and mobile station apparatus category information that is read out from the category information memory unit A207.

The ASN coding unit A205 performs coding of the mobile station CC capability information and mobile station apparatus category information input from the control unit A202, converting and encoding them to abstract syntax notation 1 (ASN. 1), and outputs the coded information to the RRC message generating unit A106. Details of the processing performed by the RRC message generating unit A106 will be described later, along with the RRC message generation processing. The transceiver device A101 processes an RRC message input from the RRC message generating unit A106 on one or multiple RF transmitting branches and transmits it to the base station apparatus B.

The allocation information memory unit A103, the mobile station CC capability information memory unit A104, the RRC message generating unit A106, the control unit A202, the ASN coding unit 205, and the category information memory unit A207 may be included within an integrated circuit chip. Alternatively, a part of or all of the transceiver device A101 may be constituted so as to be included in an integrated circuit chip, and this is not a restriction.

<RRC Message Generation Processing>

The RRC message generation processing performed by the ASN coding unit A205 and the RRC message generating unit A106 will now be described.

FIG. 26 is a simplified drawing that shows an example of the structure of LTE-A mobile station CC capability message (UE-CC-Capability) according to the present embodiment. In this drawing, the parameter maxUECategory is the maximum number of mobile station apparatus categories. The parameter maxUECategory is, for example, 10 in an example of FIG. 24.

The structure of the LTE-A mobile station CC capability message includes UE-Category, which indicates the mobile station apparatus category and wireless parameters (UE-Parameters) of the mobile station apparatus (refer to FIG. 13). In this case, an integer from 1 to 10 is substituted into UE-Category.

FIG. 27 is a simplified drawing showing an example of actual data of the mobile station CC capability message according to the present embodiment. This drawing substitutes a wireless parameter value of the LTE-A mobile station apparatus A2 that can accommodate the scenarios S5 and S8 into the LTE-A mobile station CC capability message structure of FIG. 26.

Compared with the example of actual data of the mobile station CC capability message according to the present embodiment (FIG. 27) and the substance of the mobile station CC capability message according to the first embodiment (FIG. 16), the difference is the addition of the mobile station apparatus category information (UE-Category). Parameters (UE-Parameters) that are the same as parameters as in first embodiment will be omitted.

In FIG. 27, category number 8 that indicates category 6 is substituted into UE-Category.

<Number of MIMO Streams Setting>

The number of MIMO streams is set so that the mobile station CC capability information of the mobile station apparatus A2 is the data processing capability that is related to the uplink and downlink data transfer rates of the mobile station apparatus. Specifically, the number of MIMO streams is set so that the maximum uplink and downlink data transfer rates calculated from the mobile station CC capability information is within the data buffer bit size.

<Constitution of the Base Station Apparatus B2>

FIG. 28 is a simplified block diagram that shows the constitution of the mobile station apparatus 132 according to the present embodiment. Compared with the base station apparatus B2 (FIG. 28) of the present embodiment and the base station apparatus B1 (FIG. 15) of the first embodiment, an ASN decoding unit B205, a control unit B202, a mobile station category information memory unit B208, and a data transfer rate calculating unit B209 differ. The functions of the other constituent elements (the transceiver device B101, the allocation information memory unit B103, the RRC message extracting unit B106, and the mobile station CC capability information memory unit B107) are the same as the first embodiment. Descriptions of functions that are the same as in the first embodiment will be omitted.

The ASN decoding unit B205 decodes the RRC message input from the RRC message extracting unit B106 and, based on the structure of the mobile station CC capability message shown in FIG. 26, extracts the actual data. In this case, this actual data includes mobile station apparatus category information (UE-Category). The ASN decoding unit B205 outputs the extracted actual data to the control unit B202 as the mobile station CC capability information.

The data transfer rate calculating unit B209 calculates each data transfer rate with respect to the CC combination that can be allocated and outputs it to the control unit B202.

The control unit B202 controls the various parts of the base station apparatus B2. For example, the control unit B202 stores, of the mobile station CC capability information input from the ASN decoding unit B205, the mobile station apparatus category information into the mobile station category information memory unit B208. The control unit B202 also, based on the mobile station CC capability information that has been stored in the mobile station CC capability information memory unit B107 and the mobile station category information memory unit B208 and data transfer rate that has been calculated by the data transfer rate calculating unit B209, determines the allocation of uplink and downlink wireless resources of the mobile station apparatus A2 (known as resource allocation processing).

The control unit B202, the mobile station category information memory unit B208, the data transfer rate calculating unit B209, the allocation information memory unit B103, the RRC message extracting unit B106, the ASN decoding unit B205, and the mobile station CC capability information memory unit B107 may be included within an integrated circuit chip. Alternatively, all or a part of the transceiver device B101 may be constituted so as to be included within an integrated circuit chip, and this is not a restriction.

The resource allocation processing will be described in detail below.

The control unit B202, based on its own communication capability and the mobile station CC capability information that includes the mobile station apparatus category information, determines the allocation of uplink and downlink wireless resources of the mobile station apparatus A2. The control unit B202 also stores beforehand base station apparatus communication capability information that defines its own communication capability. A specific example of the resource allocation processing is shown below.

<First Example of Resource Allocation Processing>

In the first example, the case in which the base station apparatus B1 communicates using the frequency bands 3, 1, and 7 will be described. In the first example, the case will be described in which the mobile station apparatus A2 transmits a mobile station CC capability message (refer to FIG. 27) that indicates that it is capable of accommodating the scenarios S5 and S8 and the mobile station apparatus category 8.

The control unit B202 makes the determination that, in the frequency band 3, it is possible to allocate one 15-MHz uplink non-contiguous CC and one 15-MHz downlink non-contiguous CC. In the same manner, the control unit B202 makes the determination that, in the frequency band 1, it is possible to allocate one 15-MHz uplink non-contiguous CC and one 15-MHz downlink non-contiguous CC. The control unit B202 also, based on SupportedDLCCMIMOList=[2, 2, 4, 4], makes the determination that the number of MIMO streams that can be accommodated by each of two 15-MHz downlink non-contiguous CCs in the frequency bands 3 and 1 is 4, and also, based on SupportedULCCMIMOList=[1, 1, 2, 2], makes the determination that the number of MIMO streams that can be accommodated by each of two 15-MHz uplink non-contiguous CCs in the frequency bands 3 and 1 is 2.

The control unit B202 outputs the allocation candidate information, which is the result of the determination, to the data transfer rate calculating unit B209.

The data transfer rate calculating unit B209 calculates the maximum data transfer rate with respect to each combination of allocations based on allocation candidate information input from the control unit B202. Specifically, the data transfer rate calculating unit B209 determines that, in the downlink, there are three candidates of 1, 2, and 5 as the number of MIMO streams with respect to one 15-MHz downlink non-contiguous CC and also that there are three combinations of candidates of 1, 2, and 1, 4 and 2, 4 as the number of MIMO streams with respect to two 15-MHz downlink non-contiguous CCs. That is, the data transfer rate calculating unit B209 determines that there is a total number of nine combinations of allocations.

In this case, the data transfer rate calculating unit B209 evaluates, in the downlink, each maximum data transfer rate DBRn (downlink bit rate n=1 to 9) regarding the nine combinations of allocations. Because by information shown in FIG. 21 the downlink data transfer rate is 55,056 kbps (CC frequency bandwidth is 15 MHz), the data transfer rate calculating unit B209 calculates the following values as each of the DBRs.

$DBR1 = 55{,}056 \times 1(CC) \times 1(MIMO) = 55{,}056$ kbps $DBR2 = 55{,}056 \times 1(CC) \times 2(MIMO) = 110{,}112$ kbps $DBR3 = 55{,}056 \times 1(CC) \times 4(MIMO) = 220{,}224$ kbps $DBR4 = 55{,}056 \times 2(CC) \times 1(MIMO) = 110{,}112$ kbps $DBR5 = 55{,}056 \times 2(CC) \times 2(MIMO) = 220{,}224$ kbps $DBR6 = 55{,}056 \times 2(CC) \times 4(MIMO) = 440{,}448$ kbps $DBR7 = 55{,}056 \times 1(CC) \times 1(MIMO) + 55{,}056 \times 1(CC) \times 2(MIMO) = 165{,}168$ kbps $DBR8 = 55{,}056 \times 1(CC) \times 1(MIMO) + 55{,}056 \times 1(CC) \times 4(MIMO) = 275{,}280$ kbps $DBR9 = 55{,}056 \times 1(CC) \times 2(MIMO) + 55{,}056 \times 1(CC) \times 4(MIMO) = 330{,}336$ kbps The data transfer rate calculating unit B209 determines that, in the uplink, there are two candidates of 1 and 2 as the number of MIMO streams with respect to one 15-MHz downlink non-contiguous CC and also that there are two candidates of 1 and 2 as the number of MIMO streams with respect to two 15-MHz uplink non-contiguous CCs. Also, the data transfer rate calculating unit B209 determines that there is one candidate of combination of 1 and 2 as the number of MIMO streams with respect to two 15-MHz uplink non-contiguous CCs. That is, the data transfer rate calculating unit B209 determines that there is a total number of five combinations of allocations.

In this case, the data transfer rate calculating unit B209 evaluates in the uplink each maximum data transfer rate UBRn (uplink bit rate n=1 to 5) regarding the five combinations of allocations. Because the uplink data transfer rate is 55,056 kbps (CC frequency bandwidth is 15 MHz) by information shown in FIG. 21, the data transfer rate calculating unit B209 calculates the following values as each of the UBRs.

$UBR1 = 55{,}056 \times 1(CC) \times 1(MIMO) = 55{,}056$ kbps $UBR2 = 55{,}056 \times 1(CC) \times 2(MIMO) = 110{,}112$ kbps $UBR3 = 55{,}056 \times 2(CC) \times 1(MIMO) = 110{,}112$ kbps $UBR4 = 55{,}056 \times 2(CC) \times 2(MIMO) = 220{,}224$ kbps $UBR5 = 55{,}056 \times 1(CC) \times 1(MIMO) + 55{,}056 \times 1(CC) \times 2(MIMO) = 165{,}168$ kbps The data transfer rate calculating unit B209 outputs the maximum data transfer rates DBRn and UBRn calculated in the above-described manner to the control unit B202 for each combination of allocations.

The control unit B202 extracts, by the information stored beforehand that is shown in FIG. 24, the uplink and downlink maximum data transfer rates in the mobile station apparatus A2 of the mobile station apparatus category of 8, as 146,784 kbps and 301,504 kbps respectively. The control unit B202 selects, of the maximum data transfer rates DBRm and UBRn input from the data transfer rate calculating unit B209, the minimum one that is greater than the extracted uplink and downlink maximum data transfer rates. The control unit B202 determines the combinations of the allocations in accordance with the selected maximum data transfer rates DBRn and UBRn as the allocation of the uplink and downlink wireless resources of the mobile station apparatus A2.

Specifically, the control unit B202 selects DBR6 (440,448 kbps) for the downlink as the minimum rate of the rates that are greater than the extracted maximum downlink data transfer rate (301,504 kbps) of the mobile station apparatus A2. In this case, the control unit B202, considering the wireless propagation conditions, the load balance, and the like, allocates, for example, two appropriate 15-MHz downlink non-contiguous CCs (the number of MIMO streams of 4) in the frequency bands 3 and 1.

Also, the control unit B202 selects UBR4 (220,224 kbps) for the uplink as the minimum rate of the rates that are greater than the extracted maximum uplink data transfer rate (146,874 kbps) of the mobile station apparatus A2. In this case, the control unit B202, considering the wireless propagation conditions, the load balance, and the like, allocates, for example, two appropriate 15-MHz uplink non-contiguous CCs (the number of MIMO streams of 2) in the frequency bands 3 and 1.

At the time of the initial access (for example, random access) from the mobile station apparatus A2, the control unit B202 notifies information such as the allocated CC numbers, the carrier frequencies, and the like to the mobile station apparatus A2. The control unit B202 also allocates downlink wireless resources of the mobile station apparatus A2 within the allocated downlink CCs. In this case, the control unit B202 allocates the number of MIMO streams of 4 with respect to the downlink CCs, and allocates the number of MIMO streams of 2 with respect to the uplink CCs. Also, the control unit B202, based on other information, may select the combinations of allocation accommodating DBR 7 to 9 and UBR5. The allocation information memory unit B103 stores the wireless resource allocation information with respect to the mobile station apparatus A2, which has been determined by the control unit B202, and the control unit B202 generates control data that includes the wireless resource allocation information and transmits it via the transceiver device B101 to the mobile station apparatus A2.

<Second Example of Resource Allocation Processing>

In the second example, the case in which the base station apparatus B2 communicates using the frequency band 1 will be described. In the second example, the case will be described in which the mobile station apparatus A2 transmits a mobile station CC capability message (refer to FIG. 27) that indicates that it is capable of accommodating the scenarios S5 and S8 and the mobile station apparatus category 8.

The control unit B202 makes the determination that, in the frequency band 1, it is possible to allocate one 15-MHz uplink non-contiguous CC and one 15-MHz downlink non-contiguous CC.

The control unit B202 also, based on SupportedDLCCMIMOList=[2, 2, 4, 4], makes the determination that the number of MIMO streams that can be accommodated by each of one 15-MHz downlink non-contiguous CC in the frequency band 1 is 4. The control unit B202 also, based on SupportedULCCMIMOList=[1, 1, 2, 2], makes the determination that the number of MIMO streams that can be accommodated by each one 15-MHz uplink non-contiguous CC in the frequency band 1 is 2.

The control unit B202 outputs the allocation candidate information that is the result of the above-noted determinations to the data transfer rate calculating unit B209.

The data transfer rate calculating unit B209 calculates the maximum data transfer rate with respect to each combination of allocations based on the allocation candidate information. Specifically, the data transfer rate calculating unit B209 determines in the downlink that there are three candidates of 1, 2, and 4 as the number of MIMO streams with respect to one 15-MHz downlink non-contiguous CC. That is, the data transfer rate calculating unit B209 determines that there is a total number of three combinations of allocations.

In this case, the data transfer rate calculating unit B209 calculates the following values as each of the DBRs by information shown in FIG. 21.

$$DBR1=55,056 \times 1(CC) \times 1(MIMO)=55,056 \text{ kbps}$$

$$DBR2=55,056 \times 1(CC) \times 2(MIMO)=110,112 \text{ kbps}$$

$$DBR3=55,056 \times 1(CC) \times 4(MIMO)=220,224 \text{ kbps}$$

The data transfer rate calculating unit B209 determines that, in the uplink, there are two candidates of 1 and 2 as the number of MIMO streams with respect to one 15-MHz downlink non-contiguous CC. That is, the data transfer rate calculating unit B209 determines that there is a total number of two combinations of allocations. In this case, the data transfer rate calculating unit B209 calculates the following values as each of the UBRs by information shown in FIG. 21.

$$UBR1=55,056 \times 1(CC) \times 1(MIMO)=55,056 \text{ kbps}$$

$$UBR2=55,056 \times 1(CC) \times 2(MIMO)=110,112 \text{ kbps}$$

The data transfer rate calculating unit B209 outputs the maximum data transfer rates DBRn and UBRn to the control unit B202 for each combination of allocations.

The control unit B202 determines the combinations of the allocations, in the same manner as in the first example, as the allocation of the uplink and downlink wireless resources of the mobile station apparatus A2.

Specifically, the control unit selects DBR3 (220,224 kbps) for the downlink as the minimum rate of the rates that are greater than the extracted maximum downlink data transfer rate of the mobile station apparatus A2 (301,504 kbps). In this case, the control unit B202, considering the wireless propagation conditions, the load balance, and the like, allocates, for example, one appropriate 15-MHz downlink non-contiguous CC (the number of MIMO streams of 4) in the frequency band 1.

Also, the control unit B202 determines that, for the uplink, there is no combination of allocations because all values of DBRn are smaller than the maximum uplink data transfer rate (146,784 kbps). In this case, the control unit B202 selects the combination of allocations such that the maximum data transfer rate will be maximum. That is, the control unit B202 selects the combinations in the case of UBR2 (110,112 kbps). In this case, the control unit B202, considering the wireless propagation conditions, the load balance, and the like, allocates, for example, one appropriate 15-MHz uplink non-contiguous CC (the number of MIMO streams of 2) in the frequency band 1.

At the time of the initial access (for example, random access) from the mobile station apparatus A2, the control unit B202 notifies information such as the allocated CC numbers, the carrier frequencies, and the like to the mobile station apparatus A2. The control unit B202 also allocates downlink wireless resources of the mobile station apparatus A2 within the allocated downlink CCs. In this case, the control unit B202 allocates for the downlink CC the number of MIMO streams of 4, and allocates for the uplink CC the number of MIMO streams of 2. The allocation information memory unit B103 stores the wireless resource allocation information with respect to the mobile station apparatus A2, which has been determined by the control unit B202, and the control unit B202 generates control data that includes the wireless resource allocation information and transmits it via the transceiver device B101 to the mobile station apparatus A2.

Although the foregoing presents two examples in which the mobile station apparatus A2 is a mobile station apparatus A2 that can accommodate the scenarios S5 and S8, there is no restriction to the scenarios S1 to S22 in the LTE-A mobile station CC capability message of the mobile station apparatus A2, and various CC combinations can be expressed. That is, the base station apparatus B1 can select CCs that accommodate a variety of LTE-A mobile station CC capability messages of the mobile station apparatus A2.

<Third Example of Resource Allocation Processing>

The third example, the case in which the base station apparatus B2 communicates using the frequency bands 8 and 1 will be described. In the third example, the case will be described in which the mobile station apparatus A2 transmits a mobile station CC capability message (refer to FIG. 29) that indicates that it is capable of accommodating the scenarios shown in FIG. 17 and the mobile station apparatus category 8. FIG. 29 is a drawing that shows another example of actual data of a mobile station CC capability message according to the present embodiment. In this case, the control unit B202 performs the following described resource allocation processing.

The control unit B202 makes the determination that two 5-MHz uplink non-contiguous CCs and two 5-MHz downlink non-contiguous CCs can be allocated in the frequency band 8. The control unit B202 also makes the determination that one 15-MHz uplink non-contiguous CC and two 15-MHz downlink contiguous CCs can be allocated in the frequency band 1.

The control unit B202, based on SupportedDLCCMI-MOList=[2, 2, 1, 4, 4], makes the determination that the number of MIMO streams that can be accommodated by each of two 5-MHz downlink non-contiguous CCs in the frequency band 8 is 2, and that the number of MIMO streams that can be accommodated by each of two 15-MHz downlink non-contiguous CCs in the frequency band 1 is 4. The control unit B202, based on SupportedULCCMOMList=[1,1,0,2], makes the determination that the number of MIMO streams that can be accommodated by each two 5-MHz uplink non-contiguous CC in the frequency band 8 is 1, and that the number of MIMO streams that can be accommodated by each one 15-MHz uplink non-contiguous CC in the frequency band 1 is 2.

The control unit B202 outputs the allocation candidate information that is the results of the above-noted determination to the data transfer rate calculating unit B209.

The data transfer rate calculating unit B209 calculates the maximum data transfer rate with respect to each combination of the allocations based on the allocation candidate information. Specifically, the data transfer rate calculating unit B209 determines that, in the downlink, there are two candidates of 1 and 2 as the number of MIMO streams with respect to one 5-MHz downlink non-contiguous CC, and that there are two candidates of 1 and 2 as the number of MIMO streams with respect to two 5-MHz downlink non-contiguous CCs, and also that there is one combination of candidates of 1 and 2 as the number of MIMO streams with respect to two 15-MHz downlink non-contiguous CCs. Also, the data transfer rate calculating unit B209 determines in the downlink that there are three candidates of 1, 2 and 4 as the number of MIMO streams with respect to one 15-MHz downlink non-contiguous CC, and that there are three candidates of 1, 2 and 4 as the number of MIMO streams with respect to two 15-MHz downlink non-contiguous CCs, and also that there are three combinations of candidates of 1, 2 and 1, 4 and 2, 4 as the number of each of MIMO streams with respect to two 15-MHz downlink non-contiguous CCs. That is, the data transfer rate calculating unit B209 determines that there is a total number of fourteen combinations of allocations.

In this case, the data transfer rate calculating unit B209 calculates the following values as each of the DBRs by information shown in FIG. 21 because the downlink data transfer rate is 18,336 kbps (CC frequency bandwidth is 5 MHz) and 55,056 kbps (CC frequency bandwidth is 15 MHz).

$DBR1=18,336\times1(CC)\times1(MIMO)=18,336$ kbps $DBR2=18,336\times1(CC)\times2(MIMO)=36,672$ kbps $DBR3=18,336\times2(CC)\times1(MIMO)=36,672$ kbps $DBR4=18,336\times2(CC)\times2(MIMO)=73,344$ kbps $DBR5=18,336\times1(CC)\times1(MIMO)+18,336\times1(CC)\times2(MIMO)=55,088$ kbps $DBR6=55,056\times1(CC)\times1(MIMO)=55,056$ kbps $DBR7=55,056\times1(CC)\times2(MIMO)=110,112$ kbps $DBR8=55,056\times1(CC)\times4(MIMO)=220,224$ kbps $DBR9=55,056\times2(CC)\times1(MIMO)=110,112$ kbps $DBR10=55,056\times2(CC)\times2(MIMO)=220,224$ kbps $DBR11=55,056\times2(CC)\times4(MIMO)=440,448$ kbps $DBR12=55,056\times1(CC)\times1(MIMO)+55,056\times1(CC)\times2(MIMO)=165,168$ kbps $DBR13=55,056\times1(CC)\times1(MIMO)+55,056\times1(CC)\times4(MIMO)=275,280$ kbps $DBR14=55,056\times1(CC)\times2(MIMO)+55,056\times1(CC)\times4(MIMO)=330,336$ kbps The data transfer rate calculating unit B209 determines that, in the uplink, there is one candidate of 1 as the number of MIMO streams with respect to one 5-MHz downlink non-contiguous CC and that there are two candidates of 1 as the number of MIMO streams with respect to two 5-MHz uplink non-contiguous CCs, and also that there is one candidate of 1 and 2 as the number of MIMO streams with respect to one 15-MHz uplink non-contiguous CC. That is, the data transfer rate calculating unit B209 determines that there is a total number of four combinations of allocations.

In this case, the data transfer rate calculating unit B209 calculates the following values as each of the UBRs by information shown in FIG. 21.

$UBR1=18,336\times1(CC)\times1(MIMO)=18,336$ kbps $UBR2=18,336\times2(CC)\times1(MIMO)=36,672$ kbps $UBR3=55,056\times1(CC)\times1(MIMO)=55,056$ kbps $UBR4=55,056\times1(CC)\times2(MIMO)=110,112$ kbps The data transfer rate calculating unit B209 outputs the maximum data transfer rates DBRn and UBRn calculated as the above to the control unit B202 for each combination of allocations.

The control unit B202 extracts, by the information stored beforehand shown in FIG. 24, the uplink and downlink maximum data transfer rates in the mobile station apparatus A2 of the mobile station apparatus category of 8, as 146,784 kbps and 301,504 kbps respectively. The control unit B202 selects, of the maximum data transfer rates DBRm and UBRn input from the data transfer rate calculating unit B209, the minimum one that is greater than the extracted uplink and downlink maximum data transfer rates. The control unit B202 determines the combinations of the allocations in accordance with the selected maximum data transfer rates DBRn and UBRn as the allocation of the uplink and downlink wireless resources of the mobile station apparatus A2.

Specifically, the control unit B202 selects DBR14 (330,336 kbps) for the downlink as the minimum rate of the rates that are greater than the extracted maximum downlink data transfer rate (301504 kbps) of the mobile station apparatus A2. In this case, the control unit B202, considering the wireless propagation conditions, the load balance, and the like, allocates, for example, two appropriate 15-MHz downlink non-contiguous CCs (the numbers of MIMO streams of 2, 4) in the frequency band 1.

Also, in the same manner as in the second example, the control unit B202 selects the case of combination of UBR4 (110112 kbps) for the uplink as the combination of allocation in which the maximum data transfer rate is maximum. In this case, the control unit B202, considering the wireless propagation conditions, the load balance, and the like, allocates, for example, one appropriate 15-MHz uplink non-contiguous CC (each of the numbers of MIMO streams of 2) in the frequency band 2.

At the time of the initial access (for example, random access) from the mobile station apparatus A2, the control unit B202 notifies information such as the allocated CC numbers, the carrier frequencies, and the like to the mobile station apparatus A2. The control unit B202 also allocates downlink wireless resources of the mobile station apparatus A2 within the allocated downlink CCs. In this case, the control unit B202 allocates the numbers of MIMO streams of 2 and 4 with respect to the downlink CCs, and allocates the number of MIMO streams of 2 with respect to the uplink CCs. Also, the control unit B202, based on other information, may select a combination of allocations accommodating DBR 11 and 14. The allocation information memory unit B103 stores the wireless resource allocation information with respect to the mobile station apparatus A2, which has been determined by the control unit B202, and the control unit B202 generates control data that includes the wireless resource allocation information and transmits it via the transceiver device B101 to the mobile station apparatus A2.

Although in the above-described first to third examples of the resource allocation processing the control unit B202 selects the minimum UBRn and DBRn of the extracted rates that are greater than the maximum data transfer rate of the mobile station apparatus A2, the control unit N202 may select the maximum UBRn and DBRn of the extracted rates that are smaller than the maximum data transfer rate of the mobile station apparatus A2. Another pre-established method may be used to select the rate.

In this manner, according to the present embodiment, the mobile station apparatus A2 transmits to the base station apparatus B2 a mobile station CC capability message that includes mobile station apparatus category information that defines the maximum data transfer rate supported to communicate with the base station apparatus B1. Also, the base station apparatus B2, based on the mobile station CC capability massage, determines the number of MIMO streams in CCs. By doing this, in the present embodiment, it is possible to allocate wireless resources appropriate to communication between the mobile station apparatus A1 and the base station apparatus B1. Therefore, in the communication system according to the present embodiment, communication can be performed with the maximum data transfer rate supported to communicate between the mobile station apparatus A2 and the base station apparatus B2.

That is, according to the present embodiment, the control unit B202 of the base station apparatus B2 compares the mobile station CC capability information from the mobile station apparatus A2 with its own base station apparatus communication capability information and, within the range of its own communication capability and the mobile station apparatus communication capability, can allocate appropriate downlink and uplink wireless resources to the mobile station apparatus A2. Also, according to the present embodiment, with respect to combinations of various LTE-A mobile station apparatus constitutions for the purpose of accommodating the various LTE-A technical elements noted as above as (a) to (l), by generating and transmitting to the base station apparatus B2 the mobile station apparatus configuration information, considering the data processing ability relating to the uplink and downlink data transfer rates of the mobile station apparatus, that is the bit size of the data buffer, the base station apparatus B2, in response to the mobile station apparatus configuration information, can select appropriate mobile station apparatus A2 performance that can accommodate various LTE-A technical elements, thereby enabling allocation of appropriate uplink and downlink wireless resources.

Third Embodiment

The third embodiment of the present invention will be described below, with references made to the drawings.

In the second embodiment, it is shown that, by the mobile station apparatus transmitting to the base station apparatus mobile station CC capability information that includes mobile station apparatus category information that defines maximum data transfer rate, it is possible for the base station apparatus to combine various CCs and allocate appropriate wireless resources to the mobile station apparatus.

The present embodiment will be described for the case in which related information with respect to the number of MIMO streams of the uplink and downlink CCs of the wireless parameters is deleted and, using a little (shortened) mobile station CC capability information, wireless resources are allocated which the base station apparatus uses to communicate with the mobile station apparatus.

Also, because the conceptual drawing of the communication system according to the present embodiment would be the same as FIG. 1 in the first embodiment, its description will be omitted. Each of the mobile station apparatuses A11 and A12 of the present embodiment are referred to as the mobile station apparatus A3. In this case, as will be described later, the mobile station apparatus A3 is constituted so as to include a transceiver device a1 (FIG. 3 and FIG. 4), a2 (FIG. 8), or a3 (FIG. 9).

<Constitution of the Mobile Station Apparatus A3>

Figure 30:
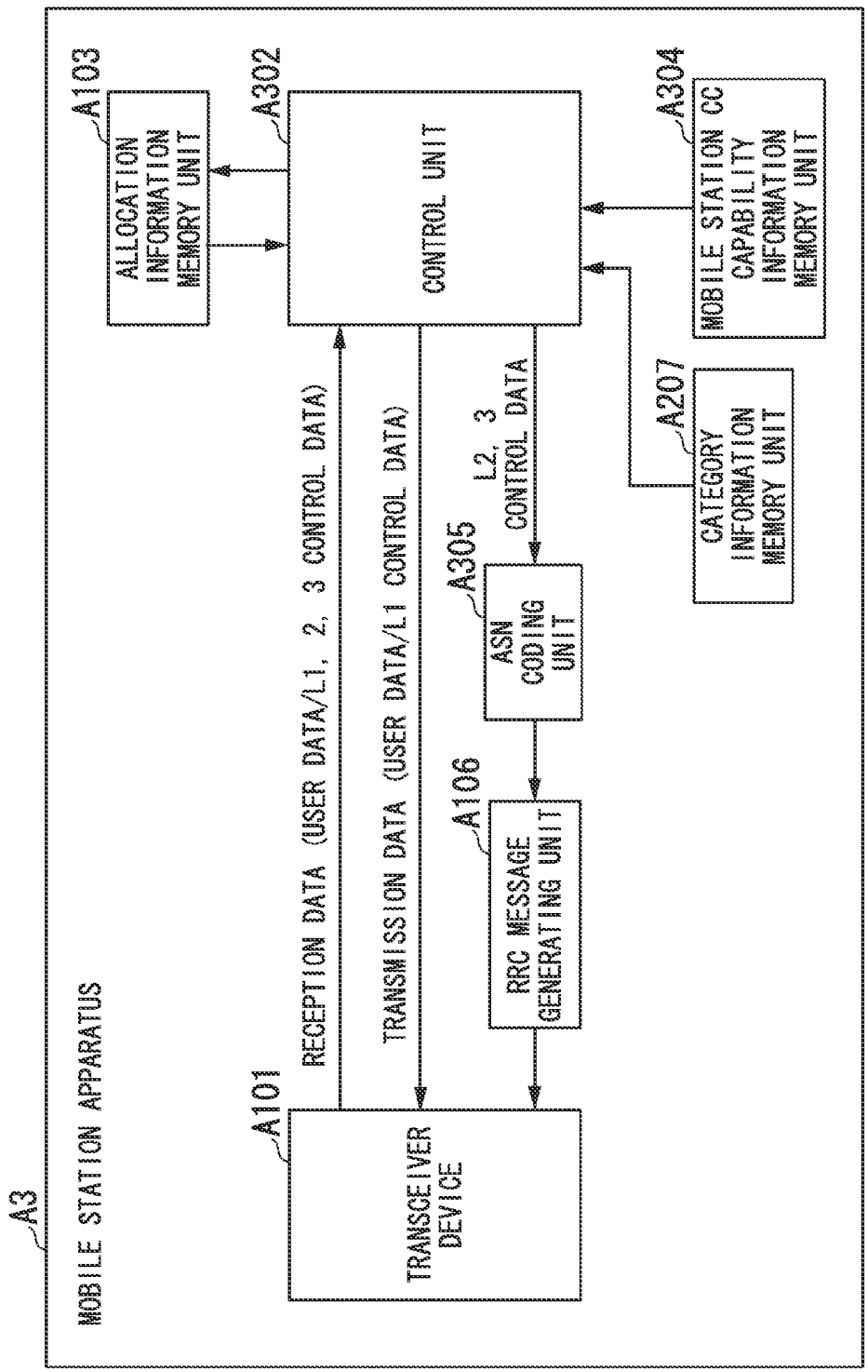
FIG. 30 is a simplified block diagram showing the constitution of a mobile station apparatus A3 according to a third embodiment of the present invention.

FIG. 30 is a simplified block diagram showing the constitution of the mobile station apparatus A3 according to the third embodiment of the present invention. Compared with the mobile station apparatus A3 (FIG. 30) of the present embodiment and the mobile station apparatus A2 (FIG. 25) of the first embodiment, a control unit A302, an ASN coding unit A305, and a mobile station CC capability information memory unit A304 differ. The functions of the other constituent elements (the transceiver device A101, the allocation information memory unit A103, the RRC message generating unit A106, and the category information memory unit A207) are the same as in the second embodiment. The description of the functions that are the same as in the second embodiment will be omitted.

The control unit A302 controls various parts of the mobile station apparatus A3. For example, the control unit A302 receives wireless resource information allocated from the base station apparatus B and stores the received wireless resource information into the allocation information memory unit A103. At the time of transmitting and receiving user data, the control unit A302 reads the wireless resource information from the allocation information memory unit A103 and controls the transmitted and reception data.

The mobile station CC capability information memory unit A304 stores shortened mobile station CC capability information (for example, wireless parameters). The mobile station CC capability information is information in accordance with the mobile station apparatus configuration, and is written into the mobile station CC capability information memory unit A304 at the time of shipment from the factory, but may be subsequently updated.

The control unit A302 outputs to the ASN coding unit A305 mobile station CC capability information that is stored by the mobile station CC capability information memory unit A304 and mobile station apparatus category information that is read out from the category information memory unit A207.

The ASN coding unit A305 performs coding of the mobile station CC capability information and mobile station apparatus category information input from the control unit A302, converting and encoding it to abstract syntax notation 1 (ASN. 1), and outputs the coded information to the RRC message generating unit A106. Details of the processing performed by the RRC message generating unit A106 will be described later, along with the RRC message generation processing. The transceiver device A101 processes the RRC message input from the RRC message generating unit A106 on one or multiple RF transmitting branches and transmits it to the base station apparatus B.

The allocation information memory unit A103, the mobile station CC capability information memory unit A304, the RRC message generating unit A106, the control unit A302, the ASN coding unit 305, and the category information memory unit A307 may be included within an integrated circuit chip. Alternatively, a part of or all of the transceiver device A101 may be constituted so as to be included in an integrated circuit chip, and this is not a restriction.

<RRC Message Generation Processing>

The RRC message generation processing performed by the ASN coding unit A205 and the RRC message generating unit A106 will now be described.

FIG. 31 is a simplified chart that shows an example of the actual data of the mobile station CC capability message according to the present embodiment. The mobile station CC capability message shown in this chart can accommodate the scenarios S5 and is the mobile station CC capability message transmitted by the mobile station apparatus A2 of the mobile station apparatus category 8.

Compared with the LTE-A mobile station CC capability message according to the present embodiment (FIG. 31) and the LTE-A mobile station CC capability message according to the second embodiment (FIG. 27), in the LTE-A mobile station CC capability message according to the present embodiment, related parameters with respect to the number of uplink and downlink MIMO streams, that is, maxMIMOs, SupportedDLCCMIMOList, and SupportedULCCMIMOList are deleted.

FIG. 32 is a simplified chart showing another example of the actual data of the mobile station CC capability message according to the present embodiment. The mobile station CC capability message shown in this chart can accommodate the scenarios shown in FIG. 17 and is the mobile station CC capability message transmitted by the mobile station apparatus A2 of the mobile station apparatus category 8.

Compared with the LTE-A mobile station CC capability message according to the present embodiment (FIG. 32) and the LTE-A mobile station CC capability message according to the second embodiment (FIG. 29), in the LTE-A mobile station CC capability message according to the present embodiment, related parameters with respect to the number of uplink and downlink MIMO streams, that is, maxMIMOs, SupportedDLCCMIMOList, and SupportedULCCMIMOList are deleted.

<Constitution of the Base Station Apparatus B3>

Figure 33:
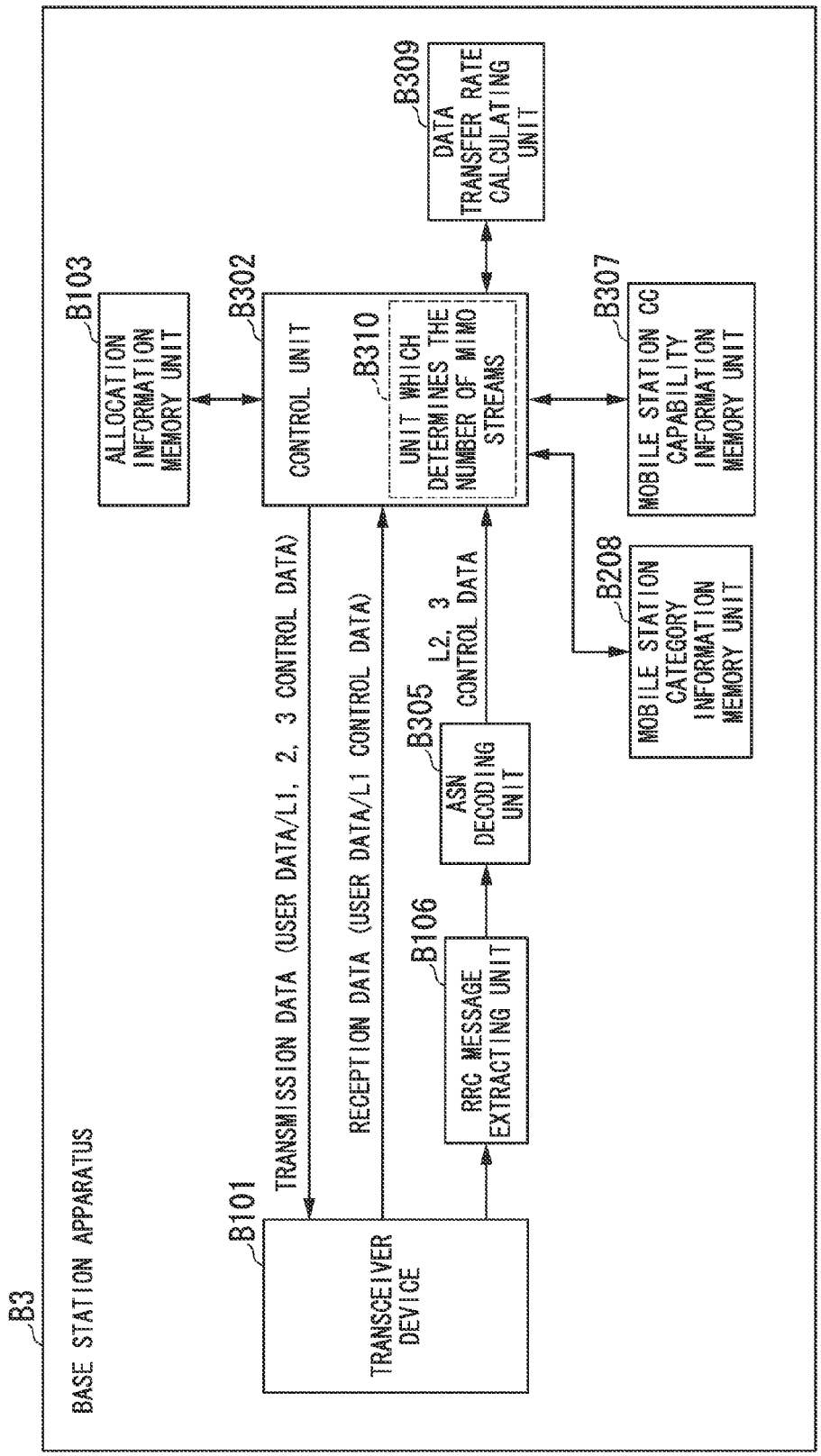
FIG. 33 is a simplified block diagram showing the constitution of a base station apparatus B3 according to the present embodiment.

FIG. 33 is a simplified block diagram that shows the constitution of the mobile station apparatus B3 according to the present embodiment. Compared with the base station apparatus 133 (FIG. 33) of the present embodiment and the base station apparatus B2 (FIG. 28) of the first embodiment, an ASN decoding unit B305, a control unit B302, a mobile station CC capability information memory unit B307, and a data transfer rate calculating unit B309 differ. The functions of the other constituent elements (the transceiver device B101, the allocation information memory unit B103, the RRC message extracting unit B106, and the mobile station category information memory unit B208) are the same as the second embodiment. Descriptions of functions that are the same as in the second embodiment will be omitted.

The ASN decoding unit B305 decodes the RRC message input from the RRC message extracting unit B106 and, based on the structure of the mobile station CC capability message, extracts the actual data. In this case, this actual data includes mobile station apparatus category information (UE-Category) and wireless parameters (UE-Parameters). The ASN decoding unit B305 outputs the extracted actual data to the control unit B302 as the mobile station CC capability information.

The data transfer rate calculating unit B309 calculates each data transfer rate with respect to the CC combination that can be allocated and outputs it to the control unit B302.

The control unit B302 controls the various parts of the base station apparatus B3. For example, the control unit B302 stores, of the mobile station CC capability information input from the ASN decoding unit B305, the mobile station apparatus category information into the mobile station category information memory unit B208 and the other information into the mobile station CC capability information memory unit B307. The control unit B302 (a unit which determines the number of MIMO streams) also, based on the mobile station CC capability information that has been stored in the mobile station CC capability information memory unit B307 and the mobile station category information memory unit B208 and data transfer rate that has been calculated by the data transfer rate calculating unit B309, determines the allocation of uplink and downlink wireless resources of the mobile station apparatus A4 (known as resource allocation processing).

The control unit B302, the mobile station category information memory unit B208, the data transfer rate calculating unit B309, the allocation information memory unit B103, the RRC message extracting unit B106, the ASN decoding unit B305, and the mobile station CC capability information memory unit B307 may be included within an integrated circuit chip. Alternatively, all or a part of the transceiver device B101 may be constituted so as to be included within an integrated circuit chip, and this is not a restriction.

The resource allocation processing will be described in detail below.

The control unit B302, based on its own communication capability and the mobile station CC capability information with the mobile station apparatus category information, determines the allocation of uplink and downlink wireless resources of the mobile station apparatus A3. In this case, the data transfer rate calculating unit B309 calculates data transfer rate taking the mobile station apparatus A3 as the apparatus that can accommodate the same number of MIMO streams in CCs.

In the present embodiment, the case in which the mobile station apparatus A3 can accommodate the pre-established number of MIMO streams of 1, 2, and 4 will be described. The present invention is not, however, restricted to this, and the data transfer rate calculating unit B309 may use another number of MIMO streams and may also use a different number of MIMO streams for each of the CCs. Also, the control unit B302 receives the total number of antennas (or the number of MIMO streams) from the mobile station apparatus A3 and determines the wireless resource allocation, making the number of MIMO streams smaller than the total number of antennas (or the received number of MIMO streams). The control unit B302 also stores beforehand base station apparatus communication capability information that defines its own communication capability. A specific example of the resource allocation processing is shown below.

<First Example of Resource Allocation Processing>

In the first example, the case in which the base station apparatus B1 communicates using the frequency bands 3, 1, and 7 will be described. In the first example, the case will be described in which the mobile station apparatus A3 transmits a mobile station CC capability message (refer to FIG. 31) that indicates that it is capable of accommodating the scenarios S5 and S8 and the mobile station apparatus category 8.

The control unit B302 makes the determination that, in the frequency band 3, it is possible to allocate one 15-MHz uplink non-contiguous CC and one 15-MHz downlink non-contiguous CC. In the same manner, the control unit B302 makes the determination that, in the frequency band 1, it is possible to allocate one 15-MHz uplink non-contiguous CC and one 15-MHz downlink non-contiguous CC.

The control unit B302 outputs the allocation candidate information that is the above-noted determination results to the data transfer rate calculating unit B309.

The data transfer rate calculating unit B309 calculates the maximum data transfer rate based on the pre-established number of MIMO streams and allocation candidate information input from the control unit B302. Specifically, the data transfer rate calculating unit B309 evaluates in the downlink maximum data transfer rate DBRn (downlink bit rate n) of the number of MIMO streams of 1, 2, and 4 in all of the CCs regarding the nine combinations of allocations. The data transfer rate calculating unit B309 calculates the following values as each of the DBRs.

$$DBR1=55,056\times2(CC)\times1(MIMO)=110,112 \text{ kbps}$$

$$DBR2=55,056\times2(CC)\times2(MIMO)=220,224 \text{ kbps}$$

$$DBR3=55,056\times2(CC)\times4(MIMO)=440,448 \text{ kbps}$$

The data transfer rate calculating unit B309 calculates in the same manner for the uplink. In the first example, UBRn=DBRn.

The data transfer rate calculating unit B309 outputs the maximum data transfer rates DBRn and UBRn calculated in the above-described manner to the control unit B302 for each combination of allocations.

The control unit B302 extracts, by the information stored beforehand shown in FIG. 24, the uplink and downlink maximum data transfer rates in the mobile station apparatus A3 of the mobile station apparatus category of 8, as 146,784 kbps and 301,504 kbps, respectively.

The control unit B302 selects DBR3 (440448 kbps) for the downlink as the minimum rate of the rates that are greater than the extracted maximum downlink data transfer rate (301504 kbps) of the mobile station apparatus A3. In this case, the control unit B302, considering the wireless propagation conditions, the load balance, and the like, allocates, for example, two appropriate 15-MHz downlink non-contiguous CCs (the number of MIMO streams of 4) in the frequency bands 3 and 1.

Also, the control unit B302 selects UBR2 (220,224 kbps) for the uplink as the minimum rate of the rates that are greater than the extracted maximum uplink data transfer rate (146,874 kbps) of the mobile station apparatus A3. In this case, the control unit B302, considering the wireless propagation conditions, the load balance, and the like, allocates, for example, appropriate two 15-MHz uplink non-contiguous CCs (the number of MIMO streams of 2) in the frequency bands 3 and 1.

At the time of the initial access (for example, random access) from the mobile station apparatus A3, the control unit B302 notifies information such as the allocated CC numbers, the carrier frequencies, and the like to the mobile station apparatus A3. The control unit B302 also allocates downlink wireless resources of the mobile station apparatus A3 within the allocated downlink CCs. In this case, the control unit B302 allocates the number of MIMO streams of 4 with respect to the downlink CCs, and allocates the number of MIMO streams of 2 with respect to the uplink CCs. The control unit B302, based on other information, may select a combination of allocations accommodating DBR 4. The allocation information memory unit B103 stores the wireless resource allocation information with respect to the mobile station apparatus A3, which has been determined by the control unit B302, and the control unit B302 generates control data that includes the wireless resource allocation information and transmits it via the transceiver device 13101 to the mobile station apparatus A3.

<Second Example of Resource Allocation Processing>

In the second example, the case in which the base station apparatus B3 communicates using the frequency band 1 will be described. In the second example, the case will be described in which the mobile station apparatus A3 transmits a mobile station CC capability message (refer to FIG. 31) that indicates that it is capable of accommodating the scenarios S5 and S8 and the mobile station apparatus category 8.

In the same manner, the control unit B302 makes the determination that, in the frequency band 1, it is possible to allocate one 15-MHz uplink non-contiguous CC and one 15-MHz downlink non-contiguous CC.

The control unit B302 outputs the allocation candidate information, which is above-noted determination result, to the data transfer rate calculating unit B309.

The data transfer rate calculating unit B309 calculates the following values as each of DBRs, based on the pre-established number of MIMO streams and the allocation candidate information input from the control unit B302.

$$DBR1=55,056\times1(CC)\times1(MIMO)=55,056 \text{ kbps}$$

$$DBR2=55,056\times1(CC)\times2(MIMO)=110,112 \text{ kbps}$$

$$DBR3=55,056\times1(CC)\times4(MIMO)=220,224 \text{ kbps}$$

The data transfer rate calculating unit B309 calculates the same manner for the uplink. In the first example, UBRn=DBRn.

The data transfer rate calculating unit B309 outputs the maximum data transfer rates DBRn and UBRn calculated in the above-described manner to the control unit B302 for each combination of allocations.

The control unit B302 extracts, by the information stored beforehand shown in FIG. 24, the uplink and downlink maximum data transfer rates in the mobile station apparatus A3 of the mobile station apparatus category of 8, as 146,784 kbps and 301,504 kbps respectively.

The control unit B302 selects the combination of allocations such that the maximum data transfer rate will be max because all of the values of DBRn are smaller than the maximum downlink data transfer rate (301,504 kbp). In this case, the control unit B302, considering the wireless propagation conditions, the load balance, and the like, allocates, for example, one appropriate 15-MHz downlink non-contiguous CC (the number of MIMO streams of 4) in the frequency band 1.

Also, the control unit B302 selects UBR3 (220,224 kbps) for the uplink as the minimum rate of the rates that are greater than the extracted maximum uplink data transfer rate (146,874 kbps) of the mobile station apparatus A3. In this case, the control unit B302, considering the wireless propagation conditions, the load balance, and the like, allocates, for example, one appropriate 15-MHz uplink non-contiguous CC (the number of MIMO streams of 4) in the frequency band 1.

At the time of the initial access (for example, random access) from the mobile station apparatus A3, the control unit B302 notifies information such as the allocated CC numbers, the carrier frequencies, and the like to the mobile station apparatus A3. The control unit B302 also allocates downlink wireless resources of the mobile station apparatus A3 within the allocated downlink CCs. In this case, the control unit B302 allocates the number of MIMO streams of 4 with respect to the downlink CCs, and allocates the number of MIMO streams of 4 with respect to the uplink CCs. The allocation information memory unit B103 stores the wireless resource allocation information with respect to the mobile station apparatus A3, which has been determined by the control unit B302, and the control unit B302 generates control data that includes the wireless resource allocation information and transmits it via the transceiver device 13101 to the mobile station apparatus A3.

<Third Example of Resource Allocation Processing>

In the third example, the case in which the base station apparatus B3 communicates using the frequency bands 8 and 1 will be described. In the third example, the case will be described in which the mobile station apparatus A3 transmits a mobile station CC capability message (refer to FIG. 32) that indicates that it is capable of accommodating the scenarios shown in FIG. 17 and the mobile station apparatus category 8. FIG. 32 is a drawing that shows another example of the actual data of a mobile station CC capability message according to the present embodiment. In this case, the control unit B302 performs the following described resource allocation processing.

The control unit B302 makes the determination that two 5-MHz uplink non-contiguous CCs and two 5-MHz downlink non-contiguous CCs can be allocated in the frequency band 8. The control unit B302 also makes the determination that one 15-MHz uplink non-contiguous CC and two 15-MHz downlink contiguous CCs can be allocated in the frequency band 1.

The control unit B302 outputs the allocation candidate information that is the above determination results to the data transfer rate calculating unit B309.

The data transfer rate calculating unit B309 calculates the following values as each of the DBRs, based on the pre-established number of MIMO streams and the allocation candidate information input from the control unit B302.

$DBR1=18,336\times 2(CC)\times 1(MIMO)+55,056\times 2(CC)\times 1(MIMO)=146,784$ kbps $DBR2=18,336\times 2(CC)\times 2(MIMO)+55,056\times 2(CC)\times 2(MIMO)=293,568$ kbps $DBR3=18,336\times 2(CC)\times 4(MIMO)+55,056\times 2(CC)\times 4(MIMO)=587,136$ kbps The data transfer rate calculating unit B309 also calculates the following values as each of the UBRs.

$UBR1=18,336\times 2(CC)\times 1(MIMO)+55,056\times 1(CC)\times 1(MIMO)=91,782$ kbps $UBR2=18,336\times 2(CC)\times 2(MIMO)+55,056\times 1(CC)\times 2(MIMO)=238,512$ kbps $UBR3=18,336\times 2(CC)\times 4(MIMO)+55,056\times 1(CC)\times 4(MIMO)=532,080$ kbps The data transfer rate calculating unit B309 outputs the maximum data transfer rates DBRn and UBRn calculated as noted above to the control unit B302 for each combination of allocations.

The control unit B302 extracts, by the information stored beforehand shown in FIG. 24, the uplink and downlink maximum data transfer rates in the mobile station apparatus A3 of the mobile station apparatus category of 8, as 146,784 kbps and 301,504 kbps respectively.

The control unit B302 selects DBR3 (587,136 kbps) for the downlink as the minimum rate of the rates that are greater than the extracted maximum downlink data transfer rate (301504 kbps) of the mobile station apparatus A3. In this case, the control unit B302, considering the wireless propagation conditions, the load balance, and the like, allocates, for example, two appropriate 5-MHz downlink non-contiguous CCs (the number of MIMO streams of 4) and two appropriate 15-MHz downlink contiguous CCs (the number of MIMO streams of 4) in the frequency bands 8 and 1.

Also, the control unit B302 selects DBR2 (238,512 kbps) for the uplink as the minimum rate of the rates that are greater than the extracted maximum uplink data transfer rate (146,784 kbps) of the mobile station apparatus A3. In this case, the control unit B302, considering the wireless propagation conditions, the load balance, and the like, allocates, for example, two appropriate 5-MHz downlink non-contiguous CCs (the number of MIMO streams of 2) and one appropriate 15-MHz downlink contiguous CC (the number of MIMO streams of 2) in the frequency bands 8 and 1.

At the time of the initial access (for example, random access) from the mobile station apparatus A3, the control unit B302 notifies information such as the allocated CC numbers, the carrier frequencies, and the like to the mobile station apparatus A3. The control unit B302 also allocates downlink wireless resources of the mobile station apparatus A3 within the allocated downlink CCs. In this case, the control unit B302 allocates the number of MIMO streams of 2 with respect to the downlink CCs, and allocates the number of MIMO streams of 2 with respect to the uplink CCs. The allocation information memory unit B103 stores the wireless resource allocation information with respect to the mobile station apparatus A3, which has been determined by the control unit B302, and the control unit B302 generates control data that includes the wireless resource allocation information and transmits it via the transceiver device B101 to the mobile station apparatus A3.

<Fourth Example of Resource Allocation Processing>

In the fourth example, the case in which the base station apparatus B3 communicates using all frequency bands will be described. In the fourth example, the case will be described in which the mobile station apparatus A3 transmits a mobile station CC capability message (refer to FIG. 31) that indicates that it is capable of accommodating the scenarios S5 and S8 and the mobile station apparatus category 8.

The control unit B302 makes the determination that two 5-MHz uplink non-contiguous CCs and two 5-MHz downlink non-contiguous CCs can be allocated in the frequency band 8. The control unit B302 also makes the determination that one 15-MHz uplink non-contiguous CC and one 15-MHz downlink non-contiguous CC can be allocated in the frequency band 3. The control unit B302 also makes the determination in the same manner that one 15-MHz uplink non-contiguous CC and one 15-MHz downlink non-contiguous CC can be allocated in the frequency band 1.

The control unit B302 outputs the allocation candidate information that is the above determination results to the data transfer rate calculating unit B309.

The data transfer rate calculating unit B309 calculates the following values as each of DBRs, based on the pre-established number of MIMO streams and the allocation candidate information input from the control unit B302.

$DBR1=18,336\times2(CC)\times1(MIMO)+55,056\times2(CC)\times1(MIMO)=146,784$ kbps $DBR2=18,336\times2(CC)\times2(MIMO)+55,056\times2(CC)\times2(MIMO)=293,568$ kbps $DBR3=18,336\times2(CC)\times4(MIMO)+55,056\times2(CC)\times4(MIMO)=587,136$ kbps The data transfer rate calculating unit B309 calculates in the same manner for the uplink. In the first example, UBRn=DBRn.

The data transfer rate calculating unit B309 outputs the maximum data transfer rates DBRn and UBRn calculated in the above-described manner to the control unit B302 for each combination of allocations.

The control unit B302 extracts, by the information stored beforehand shown in FIG. 24, the uplink and downlink maximum data transfer rates in the mobile station apparatus A3 of the mobile station apparatus category of 8, as 146,784 kbps and 301,504 kbps, respectively.

The control unit B302 selects DBR3 (587,136 kbps) for the downlink as the minimum rate of the rates that are greater than the extracted maximum downlink data transfer rate (301504 kbps) of the mobile station apparatus A3. In this case, the control unit B302, considering the wireless propagation conditions, the load balance, and the like, allocates, for example, two appropriate 5-MHz downlink non-contiguous CCs (the number of MIMO streams of 4) and two appropriate 15-MHz downlink contiguous CCs (the number of MIMO streams of 4) in the frequency bands 8 and 1.

Also, the control unit B302 selects UBR1 (146,784 kbps) for the uplink as the minimum rate of the rates that are greater than the extracted maximum uplink data transfer rate (146,874 kbps) of the mobile station apparatus A3. In this case, the control unit B302, considering the wireless propagation conditions, the load balance, and the like, allocates, for example, two appropriate 5-MHz downlink non-contiguous CCs (the number of MIMO streams of 1) and two appropriate 15-MHz downlink contiguous CCs (the number of MIMO streams of 1) in the frequency bands 8 and 1.

At the time of the initial access (for example, random access) from the mobile station apparatus A3, the control unit B302 notifies information such as the allocated CC numbers, the carrier frequencies, and the like to the mobile station apparatus A3. The control unit B302 also allocates downlink wireless resources of the mobile station apparatus A3 within the allocated downlink CCs. In this case, the control unit B302 allocates the number of MIMO streams of 4 with respect to the downlink CCs, and allocates the number of MIMO streams of 1 with respect to the uplink CCs. The allocation information memory unit B103 stores the wireless resource allocation information with respect to the mobile station apparatus A3, which has been determined by the control unit B302, and the control unit B302 generates control data that includes the wireless resource allocation information and transmits it via the transceiver device 13101 to the mobile station apparatus A3.

<Fifth Example of Resource Allocation Processing>

In the fifth example, the case in which the base station apparatus B3 communicates using all frequency bands will be described. In the fifth example, the case will be described in which the mobile station apparatus A3 transmits a mobile station CC capability message (refer to FIG. 32) that indicates that it is capable of accommodating the scenarios shown in FIG. 17 and the mobile station apparatus category 8.

The control unit B302 makes the determination that it is possible to allocate two 5-MHz uplink non-contiguous CCs and two 5-MHz downlink non-contiguous CCs in the frequency band 8, and that it is possible to allocate one 10-MHz downlink contiguous CCs in the frequency band 3, and also that it is possible to allocate one 15-MHz uplink non-contiguous CCs and two 15-MHz downlink contiguous CCs in the frequency band 1.

The control unit B302 outputs the allocation candidate information that is the above-noted determination results to the data transfer rate calculating unit B309.

The data transfer rate calculating unit B309 calculates the following values as each of the DBRs, based on the pre-established number of MIMO streams and the allocation candidate information input from the control unit B302.

$$DBR1 = 18,336\times2(CC)\times1(MIMO) + 36,696\times1(CC)\times1(MIMO) +$$
$$55,056\times2(CC)\times1(MIMO) = 183,480 \text{ kbps}$$

$$DBR2 = 18,336\times2(CC)\times2(MIMO) + 36,696\times1(CC)\times2(MIMO) +$$
$$55,056\times2(CC)\times2(MIMO) = 366,960 \text{ kbps}$$

$$DBR3 = 18,336\times2(CC)\times4(MIMO) + 36,696\times1(CC)\times4(MIMO) +$$
$$55,056\times2(CC)\times4(MIMO) = 733,920 \text{ kbps}$$

The data transfer rate calculating unit B309 also calculates the following values as each of the UBRs.

$UBR1=18,336\times2(CC)\times1(MIMO)+55,056\times1(CC)\times1(MIMO)=73,392$ kbps $UBR2=18,336\times2(CC)\times2(MIMO)+55,056\times1(CC)\times2(MIMO)=146,784$ kbp $UBR3=18,336\times2(CC)\times4(MIMO)+55,056\times1(CC)\times4(MIMO)=293,568$ kbps The data transfer rate calculating unit B309 outputs the maximum data transfer rates DBRn and UBRn calculated in the above-described manner to the control unit B302 for each combination of allocations.

The control unit B302 extracts, by the information stored beforehand shown in FIG. 24, the uplink and downlink maximum data transfer rates in the mobile station apparatus A3 of the mobile station apparatus category of 8, as 146784 kbps and 301504 kbps respectively.

The control unit B302 selects DBR2 (366960 kbps) for the downlink as the minimum rate of the rates that are greater than the extracted maximum downlink data transfer rate (301504 kbps) of the mobile station apparatus A3. In this case, the control unit B302, considering the wireless propagation conditions, the load balance, and the like, allocates, for example, two appropriate 5-MHz downlink non-contiguous CCs (the number of MIMO streams of 2) and one appropriate 10-MHz downlink contiguous CCs (the number of MIMO streams of 2) and two appropriate 15-MHz downlink contiguous CCs (the number of MIMO streams of 2) in the frequency bands 8 and 3.

Also, the control unit B302 selects UBR2 (146784 kbps) for the uplink as the minimum rate of the rates that are greater than the extracted maximum uplink data transfer rate (146874 kbps) of the mobile station apparatus A3. In this case, the control unit B302, considering the wireless propagation conditions, the load balance, and the like, allocates, for example, two appropriate 5-MHz downlink non-contiguous CCs (the number of MIMO streams of 2) and one appropriate 15-MHz downlink contiguous CC (the number of MIMO streams of 2) in the frequency bands 8 and 1.

At the time of the initial access (for example, random access) from the mobile station apparatus A3, the control unit B302 notifies information such as the allocated CC numbers, the carrier frequencies, and the like to the mobile station apparatus A3. The control unit B302 also allocates downlink wireless resources of the mobile station apparatus A3 within the allocated downlink CCs. In this case, the control unit B302 allocates the number of MIMO streams of 2 with respect to the downlink CCs, and allocates the number of MIMO streams of 2 with respect to the uplink CCs. The allocation information memory unit B103 stores the wireless resource allocation information with respect to the mobile station apparatus A3, which has been determined by the control unit B302, and the control unit B302 generates control data that includes the wireless resource allocation information and transmits it via the transceiver device 13101 to the mobile station apparatus A3.

In this manner, according to the present embodiment, the mobile station apparatus A3 transmits to the base station apparatus B3 mobile station CC capability information that includes mobile station apparatus category information that defines the maximum data transmission data supported to communicate with the base station apparatus B3. Also, the base station apparatus B3, based on the pre-established number of MIMO streams and the mobile station CC capability message, determines the number of MIMO streams in CCs. By doing this, in the present embodiment, it is possible to allocate wireless resources appropriate to communication between the mobile station apparatus A3 and the base station apparatus B3. Therefore, in the communication system in the preset embodiment, it is possible to reduce the capacity of the mobile station CC capability message, thereby enabling improvement of the transmission efficiency.

That is, according to the present embodiment, with respect to combinations of various LTE-A mobile station apparatus constitutions for the purpose of accommodating the various LTE-A technical elements noted as above as (a) to (l), by generating and transmitting the mobile station apparatus configuration information to the base station apparatus B3, the base station apparatus B3, in response to the mobile station apparatus configuration information, can select appropriate mobile station apparatus performance that can accommodate various LTE-A technical elements, thereby enabling appropriate allocation of uplink and downlink wireless resources. By introduction of a unit which determines the number of MIMO streams, it is possible to delete the related information regarding the number of MIMO streams of the upstream and down stream CCs of the wireless parameters, thereby enabling a reduction of the amount of uplink control wireless resources occupied and of the overhead for control signaling.

Fourth Embodiment

The fourth embodiment of the present invention will be described below, with references made to the drawings.

In the present embodiment, the case in which the mobile station apparatus transmits mobile station apparatus CC capability message that indicates the mobile station apparatus category and scenario numbers will be described.

Also, because the conceptual drawing of the communication system according to the present embodiment is would be same drawing as FIG. 1 in the first embodiment, the description thereof will be omitted. Each of the mobile station apparatuses A11 and A12 of the present embodiment are referred to as the mobile station apparatus A4. In this case, as will be described later, the mobile station apparatus A4 is constituted so as to include a transceiver device a1 (FIG. 3 and FIG. 4), a2 (FIG. 8), or a3 (FIG. 9).

<Constitution of the Mobile Station Apparatus A4>

Figure 34:
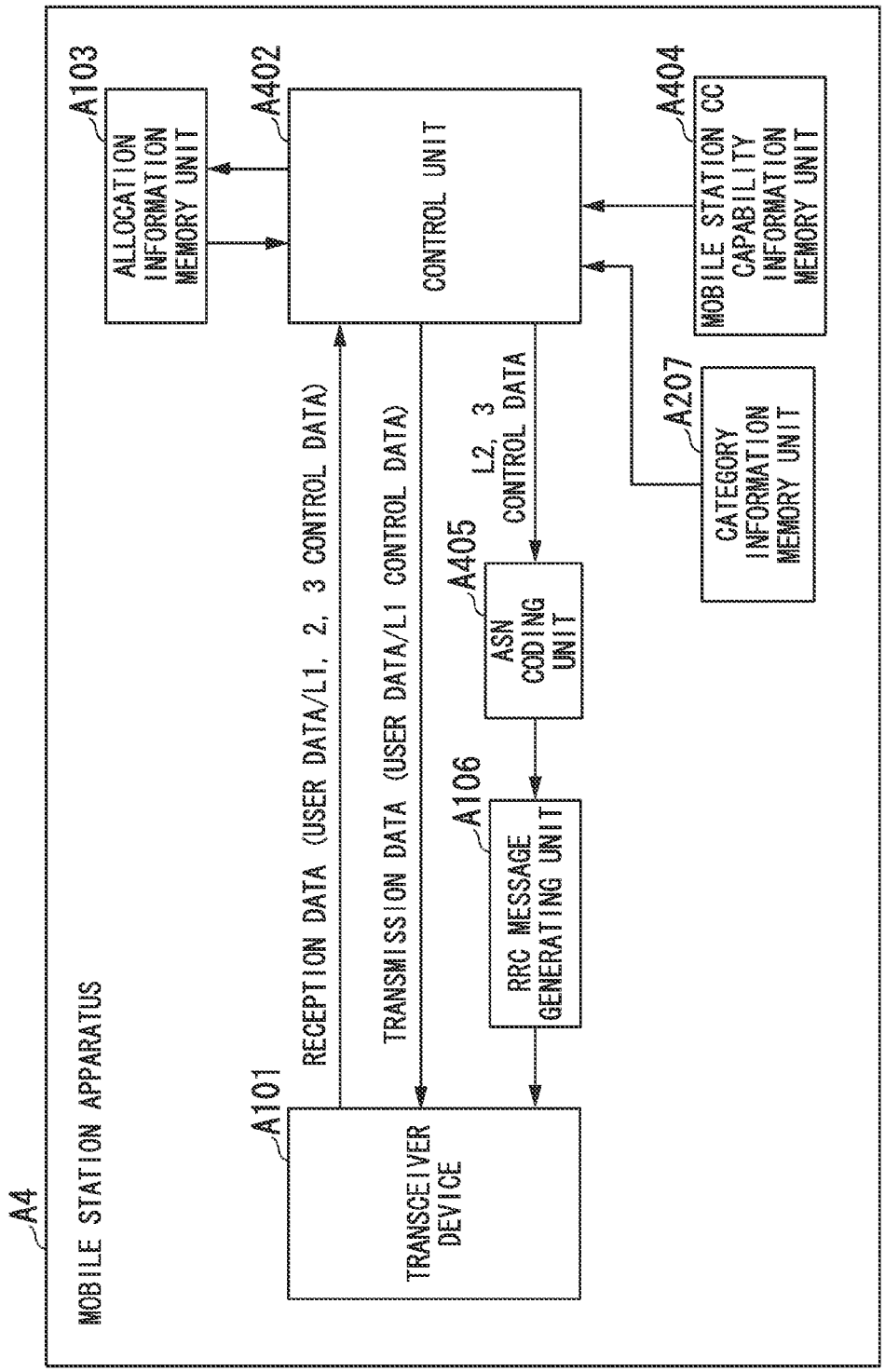
FIG. 34 is a simplified block diagram showing the constitution of a mobile station apparatus A4 according to a fourth embodiment of the present invention.

FIG. 34 is a simplified block diagram showing the constitution of the mobile station apparatus A4 according to the fourth embodiment of the present invention. Compared with the mobile station apparatus A4 (FIG. 34) of the present embodiment and the mobile station apparatus A3 (FIG. 30) of the third embodiment, a mobile station CC capability information memory unit A404, an ASN coding unit A405, a control unit A402, and differ. The functions of the other constituent elements (the category information memory unit A207, the transceiver device A101, the allocation information memory unit A103, and the RRC message generating unit A106) are the same as the third embodiment. The description of functions that are the same as in the third embodiment will be omitted.

The control unit A402 controls various parts of the mobile station apparatus A4. For example, the control unit A402 receives wireless resource information allocated from the base station apparatus B and stores the received wireless resource information into the allocation information memory unit A103. At the time of transmitting and receiving user data, the control unit A402 reads the wireless resource information from the allocation information memory unit A103 and controls the transmitted and reception data.

The mobile station CC capability information memory unit A404 stores mobile station CC capability information (for example, wireless parameter information). The mobile station CC capability information is information in accordance with the mobile station apparatus configuration, and is written into the mobile station CC capability information memory unit A404 at the time of shipment from the factory, but may be subsequently updated.

The control unit A302 outputs to the ASN coding unit A405 mobile station CC capability information that is stored by the mobile station CC capability information memory unit A404 and mobile station apparatus category information that is read out from the category information memory unit A207.

The ASN coding unit A405 performs coding of the mobile station CC capability information and mobile station apparatus category information input from the control unit A202, converting and encoding it to abstract syntax notation 1 (ASN. 1), and outputs the coded information to the RRC message generating unit A106. Details of the processing performed by the RRC message generating unit A106 will be described later, along with the RRC message generation processing. The transceiver device A101 processes the RRC message input from the RRC message generating unit A106 on one or multiple RF transmitting branches and transmits it to the base station apparatus B.

The allocation information memory unit A103, the mobile station CC capability information memory unit A104, the RRC message generating unit A106 the control unit A402, the ASN coding unit 405 and the category information memory unit A207 may be included within an integrated circuit chip.

Alternatively, a part of or all of the transceiver device A101 may be constituted so as to be included in an integrated circuit chip, and this is not a restriction.

<RRC Message Generation Processing>

The RRC message generation processing performed by the ASN coding unit A405 and the RRC message generating unit A106 will now be described.

FIG. 35 is a simplified chart that shows an example of the actual data of the mobile station CC capability message according to the present embodiment (UE-CC-Capability).

In this chart, parameter maxUEScenarios is the maximum number of scenarios that can be accommodated by the mobile station apparatus. The maxUEScenarios, considering the complexity of the mobile station apparatus, consumption power, costs, productivity, overseas roaming, is 3. The parameter maxScenarios is, for example, a maximum scenario number 22. The parameter maxUECategory is the maximum number of mobile station apparatus categories. The parameter maxUECategory, for example in one example shown in FIG. 24, is 10.

The structure of the LTE-A mobile station CC capability message includes the UE-Category that indicates the mobile station apparatus category and the wireless parameter (UE-Parameters) of the mobile station apparatus. In this case, an integer from 1 to 10 is substituted into UE-Category. The structure of the mobile station apparatus wireless parameters (UE-Parameters) includes one wireless parameter, this being SuppertedScenarioList. SuppertedScenarioList is series of numbers that is sequence of three scenario numbers masUEScenarios. An integer from 1 to 22 is substituted into this scenario number.

FIG. 35 is a simplified chart showing an example of the actual data (ASN. 1 Object Instance) of the mobile station CC capability message according to the present embodiment. In this chart, the wireless parameter value of the LTE-A mobile station apparatus A4 capable of accommodating of the scenarios S5 and S8 is substituted into LTE-A mobile station C capability message structure in FIG. 34.

In FIG. 36, into SupportedScenarioList, scenario numbers 5 and 8 are substituted.

<Constitution of the Base Station Apparatus B4>

Figure 37:
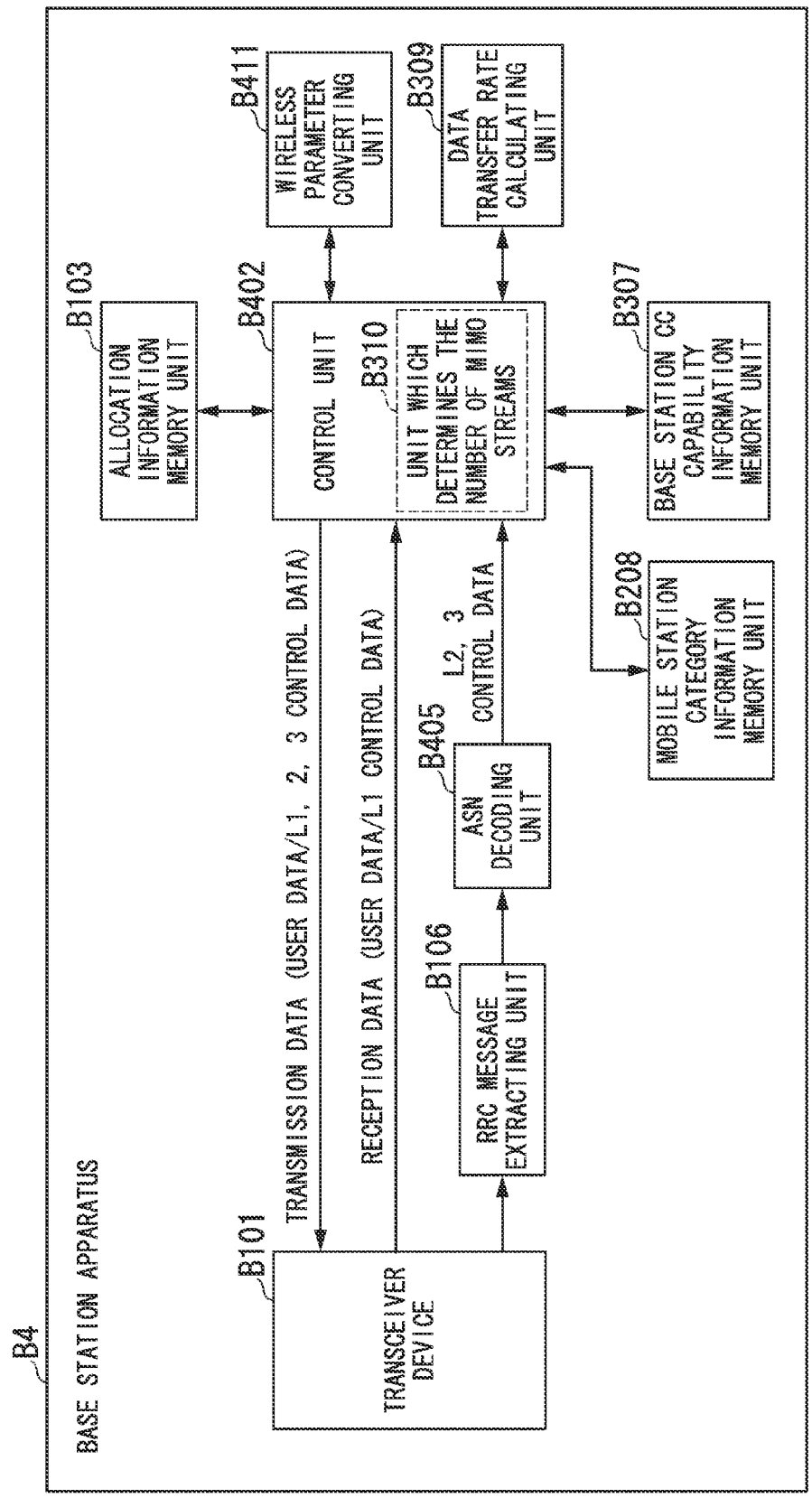
FIG. 37 is a simplified block diagram showing the constitution of a base station apparatus B4 according to the present embodiment.

FIG. 37 is a simplified block diagram that shows the constitution of the mobile station apparatus B4 according to the present embodiment. Compared with the base station apparatus B4 (FIG. 37) of the present embodiment and the base station apparatus 133 (FIG. 33) of the third embodiment, an ASN decoding unit B405, a control unit B402, a wireless parameter converting unit B411 differ. The functions of other constituent elements (the transceiver device B101, the allocation information memory unit B103, the RRC message extracting unit B106, and the mobile station category information memory unit B208, the mobile station CC capability information memory unit B307, and the data transfer rate calculating unit B309) are the same as in the third embodiment. The descriptions of functions that are the same as in third embodiment will be omitted.

The ASN decoding unit B405 decodes the RRC message input from the RRC message extracting unit B106, based on the structure of the mobile station CC capability message, extracts the actual data. In this case, this actual data includes mobile station apparatus category information (UE-Category) and wireless parameters (UE-Parameters). The ASN decoding unit B405 outputs the extracted actual data to the control unit B302 as the mobile station CC capability information.

The wireless parameter converting unit B411 stores scenario numbers and wireless parameters that indicate CC structure in the scenario of the scenario number (SupportedBandEUTRA, SupportedDLCCBW List, SupportedDLCOCCList, SupportedDLNCCCList, SupportedULCCBWList, SupportedULCOCCList, SupportedULNCCCList).

FIG. 38 is a chart showing an example of the relationship between the scenarios and the wireless parameters according to the present embodiment. In this chart shows information that is stored by the wireless parameter converting unit B411.

The wireless parameter converting unit B411 outputs, with respect to the input scenario numbers, wireless parameters that indicate CC structure in the scenario of the scenario number.

The wireless parameter converting unit B411 outputs, for example, the following wireless parameters if the scenario numbers 5 and 8 are input.

SupportedBandList$EUTRA$=[8,3,1]

Supported$DLCCBW$List=[3,5,5]

Supported$DLCOCC$List=[1,1,1]

Supported$DLNCCC$List=[2,1,1]

Supported$ULCCBW$List=[3,5,5]

Supported$ULCOCC$List=[1,1,1]

SupportedULNCCCList=[2,1,1]

The control unit B402 controls the various parts of the base station apparatus B4. For example, the control unit B402 stores, of the mobile station CC capability information input from the ASN decoding unit B405, the mobile station apparatus category information to the mobile station category information memory unit B208 and stores the remaining information to the mobile station CC capability information memory unit B307.

The control unit B402 (a unit which determines the number of MIMO streams) also, outputs the scenario numbers input from the ASN decoding unit B405 to the wireless parameter converting unit B411, so as to obtain wireless parameters that indicate CC structures. The control unit B402 outputs the obtained wireless parameters to the data transfer rate calculating unit B309. The control unit B402, based on the mobile station CC capability information that has been stored in the mobile station category information memory unit B208 and data transfer rate that has been calculated by the data transfer rate calculating unit B309, determines the allocation of uplink and downlink wireless resources of the mobile station apparatus A4 (known as resource allocation processing). Compared with the actual example in this resource allocation processing and the actual example in the third embodiment, the following differ, that is, the control unit B402 reads out the wireless parameters from the mobile station CC capable information memory unit B307 or the wireless parameter is input from the wireless parameter converting unit B411. Because the other points do not differ, the specific description of resource allocation processing is omitted.

The control unit B402, the mobile station category information memory unit B208, the allocation information memory unit B103, the RRC message extracting unit B106, the ASN decoding unit B405, and the mobile station CC capability information memory unit B307, the data transfer rate calculating unit B309, and the wireless parameter converting unit B411 may be included within an integrated circuit chip. Alternatively, all or a part of the transceiver device B101 may be constituted so as to be included within an integrated circuit chip, and this is not a restriction.

In this manner, according to the present embodiment, the mobile station apparatus A4 transmits to the base station apparatus B3 a mobile station CC capability message that includes mobile station apparatus category information and scenario numbers. Also, the base station apparatus B3, based on the pre-established number of MIMO streams and the mobile station CC capability massage, determines the number of MIMO streams in CCs. By doing this, in the present embodiment, it is possible to allocate wireless resources appropriate to communication between the mobile station apparatus A4 and the base station apparatus 134. Therefore, in the communication system according to the present embodiment, it is possible to reduce the capacity of the mobile station CC capability message, thereby enabling improvement of the transmission efficiency.

That is, according to the present embodiment, with respect to LTE-A mobile station apparatus configurations in respond to combination of scenarios for the purpose of accommodating the various LTE-A technical elements noted as above as (a) to (l), by generating and transmitting the mobile station apparatus configuration information to the base station apparatus 134, the base station apparatus 134, in response to the mobile station apparatus configuration information, can select appropriate mobile station apparatus performance that can accommodate various LTE-A technical elements, thereby enabling appropriate allocation of uplink and downlink wireless resources. By limiting the scenario combinations in the LTE-A mobile station apparatus structure and introducing a unit witch determines the number of MIMO streams, it is possible to reduce of the amount of uplink control wireless resources occupied and the overhead of control signaling.

Although, in the present embodiment, SupportedScenarioList is transmitted to the base station apparatus 134 as wireless parameters, FIGS. 3 and 4 that are the charts of frequency operation scenario are modified so that it is possible to specify the combination of scenario using only SupportedBandRUTRA. By doing this, the wireless parameters may be one SupportedBandEUTRA. In this case, the control unit B402 can predict SupportedScenarioList from SupportedBandEUTRA, so as to allocate appropriate uplink and downlink CCs to the mobile station apparatus A4. Frequency operation scenarios for use in the present embodiment are not limited to FIG. 3 and FIG. 4, and a newly defined scenario may be used.

Although in the foregoing embodiments the mobile station apparatuses A1 to A4 transmit to the base station apparatuses B1 to B4 a mobile station component carrier capability message that includes uplink and downlink CCs capable of use in communication with the base station apparatuses B1 to B4, the present invention is not limited to this, and the mobile station apparatuses A1 to A4 may separately transmit information that defines the uplink CC and the downlink CC. In this case, the base station apparatuses B1 to B4 separately perform the uplink CC allocation and the downlink CC allocation.

Alternatively, a computer may implement a part of the mobile station apparatuses A1 to A4 and the base station apparatuses 131 to B4 in the above-described embodiment, for example, the control units A102, A202, A302, and A402, the ASN coding units A105, A205, A305 and A405, the category information memory unit A207, and the controller 13102. In this case, a program for the purpose of implementing the control functions may be recorded on a computer-readable recording medium, and a computer system may read and execute the program recorded on the record medium, thereby implementing the functions. The term "computer system" means a computer system that is incorporated into the mobile station apparatuses A1 to A4 or the base station apparatuses B1 to B4, including an operating system and also hardware, such as peripheral devices. The term "computer-readable record medium" refers to a portable medium, such as a flexible disk, an optical-magnetic disc, a ROM, and a CD-ROM, and a storage device, such as a hard disk, that is built into a computer system. The term "computer-readable record medium" includes a medium that dynamically retains a program for a short time, for example, a communication line when the program is transmitted via a network such as the Internet, a communication line such as a telephone line, as well as a medium to retain a program for a certain time, for example, a flash memory internally provided in a computer system acting as the server and client in that case. The program may have the object of implementing a part of the above-described function, and it may also implement the above-described function in combination with a program already stored in a computer system.

Alternatively, a typical implementation of part or all of the functions of the mobile station apparatuses A1 to A4 or the base station apparatuses B1 to B4 in the above-described embodiments may be done as an LSI device, which is an integrated circuit. Each of the functional blocks of the mobile station apparatuses A1 to A4 or the base station apparatuses B1 to B4 may be implemented as individual chips, or may be integrated by a part or all parts thereof and implemented as chips. The method of implementation by circuit integration is not restricted to being an LSI but may also be by a dedicated circuit or by a general-purpose processor. In the case of the appearance of integrated circuit technology which take the place of LSIs by advancements in semiconductor technology, it still possible to use an integrated circuit according to the present art.

Although the embodiments of the present invention are described in detail above with references made to the accompanying drawings, the specific configuration is not limited to the above, and various designs, changes and the like are possible as long as they are encompassed within the scope thereof, without departing from the spirit of the present invention.

INDUSTRIAL APPLICABILITY

The present invention is preferable for use as a mobile station apparatus, a wireless communications system according to a mobile communication, and in technology similar thereto, wherein appropriate wireless resources can be allocated in the communication between a mobile station apparatus and a base station apparatus.

REFERENCE SYMBOLS

A12, A11 A1 to A4: Mobile station apparatus
B, B1 to B4: Base station apparatus
a1: Transceiver device
a101, a201, a301-$i$: Common transmitting/receiving antennas
a102, a202, a302-$i$: Antenna sharer
a11, a21, a31-$i$: Wireless receiving unit
a12, a22-1, a32-$il$: Quadrature demodulator
a13, a23-1, a33-$il$: Baseband demodulator
a14, a24-$k$, a34-$jk$: Baseband modulator
a15, a25-$k$, a35-$jk$: Quadrature modulator
a16, a26, a36-$j$: Wireless transmitting unit
A102, A202, A302, A402: Control unit
A103: Allocation information memory unit
A104, A304: Mobile station CC capability information memory unit A105, A205, A305, A405: ASN coding unit
A106: RRRC message generating unit
A207: Category information memory unit
B101: Transceiver device
B102, B202, B302, B402: Control unit
B103: Allocation information memory unit
B307: Mobile station CC capability information memory unit
B309: Data transfer rate calculating unit
B310: Unit which determines the number of MIMO streams
B411: Wireless parameter converting unit

The invention claimed is:

1. A mobile station apparatus performing communication with a base station apparatus, the mobile station apparatus comprising:
a radio resource control generating unit configured to include mobile station apparatus capability information in a radio resource control message; and
a transceiver unit configured to communicate with the base station apparatus by using one or multiple component carriers and
to transmit the radio resource control message to the base station apparatus,
wherein the mobile station apparatus capability information includes first information, second information, uplink information, downlink information and mobile station apparatus category information,
the first information relating whether the contiguous component carriers in a frequency band can be aggregated for uplink and downlink respectively and/or whether the non contiguous component carriers in a frequency band can be aggregated for uplink and downlink respectively and/or whether at least one component carrier in a frequency band and at least one component carrier in another frequency band can be aggregated for uplink and downlink respectively, the component carriers being supported by the mobile station apparatus,
the second information relating a combination of one or multiple frequency bands supported by the mobile station apparatus,
the uplink information relating a number of the one or multiple component carriers for at least one frequency band in the frequency band combination and a frequency bandwidth that the component carriers are aggregated for at least one frequency band in the frequency band combination, the component carriers being supported by the mobile station apparatus,
the downlink information relating the number of the one or multiple component carriers for each of one or more frequency bands in the frequency band combination and a frequency bandwidth that the component carriers are aggregated for each of one or more frequency bands in the frequency band combination, the component carriers being supported by the mobile station apparatus,
the mobile station apparatus category information including a number of bits within a unit time supported by the mobile station apparatus.

2. The mobile station apparatus according to claim 1, wherein the uplink information further relating a number of layers of MIMO capabilities supported by the mobile station apparatus for the at least one frequency band in the frequency band combination, and the downlink information further relating the number of layers of MIMO capabilities supported by the mobile station apparatus for the each of one or more frequency bands in the frequency band combination.

3. An integrated circuit installed in a mobile station apparatus performing communication with a base station apparatus, the integrated circuit comprising:
a radio resource control generating unit configured to include mobile station apparatus capability information in a radio resource control message; and a transceiver unit configured to communicate with the base station apparatus by using one or multiple component carriers and
to transmit the radio resource control message to the base station apparatus,
wherein the mobile station apparatus capability information includes first information, second information, uplink information, downlink information and mobile station apparatus category information,
the first information relating whether the contiguous component carriers in a frequency band can be aggregated for uplink and downlink respectively and/or whether the non contiguous component carriers in a frequency band can be aggregated for uplink and downlink respectively and/or whether at least one component carrier in a frequency band and at least one component carrier in another frequency band can be aggregated for uplink and downlink respectively, the component carriers being supported by the mobile station apparatus,
the second information relating a combination of one or multiple frequency bands supported by the mobile station apparatus,
the uplink information relating a number of the one or multiple component carriers for at least one frequency band in the frequency band combination and a frequency bandwidth that the component carriers are aggregated for at least one frequency band in the frequency band combination, the component carriers being supported by the mobile station apparatus,
the downlink information relating the number of the one or multiple component carriers for each of one or more frequency bands in the frequency band combination and a frequency bandwidth that the component carriers are aggregated for each of one or more frequency bands in the frequency band combination, the component carriers being supported by the mobile station apparatus,
the mobile station apparatus category information including a number of bits within a unit time supported by the mobile station apparatus.

4. The integrated circuit according to claim 3, wherein the uplink information further relating a number of layers of MIMO capabilities supported by the mobile station apparatus for the at least one frequency band in the frequency band combination, and the downlink information further relating the number of layers of MIMO capabilities supported by the mobile station apparatus for the each of one or more frequency bands in the frequency band combination.

5. A base station apparatus performing communication with a mobile station apparatus, the base station apparatus comprising:
a transceiver unit configured to communicate with the mobile station apparatus by using one or multiple component carriers; and
to receive, from the mobile station apparatus, mobile station apparatus capability information including first information, second information, uplink information, down link information and mobile station apparatus category information,
the first information relating whether the contiguous component carriers in a frequency band can be aggregated for uplink and downlink respectively and/or whether the non contiguous component carriers in a frequency band can be aggregated for uplink and downlink respectively and/or whether at least one component carrier in a frequency band and at least one component carrier in another frequency band can be aggregated for uplink and downlink respectively, the component carriers being supported by the mobile station apparatus the second information relating a combination of one or multiple frequency bands supported by the mobile station apparatus, the uplink information relating a number of the one or multiple component carriers for at least one frequency band in the frequency band combination and a frequency bandwidth that the component carriers are aggregated for at least one frequency band in the frequency band combination, the component carriers being supported by the mobile station apparatus, the downlink information relating the number of the one or multiple component carriers for each of one or more frequency bands in the frequency band combination and a frequency bandwidth that the component carriers are aggregated for each of one or more frequency bands in the frequency band combination, the component carriers being supported by the mobile station apparatus, the mobile station apparatus category information including a number of bits within a unit time supported by the mobile station apparatus, and an allocating unit configured to allocate, to the mobile station apparatus, the one or multiple component carriers that is used in the communication, the allocation being made based on the mobile station apparatus capability information.

6. The base station apparatus according to claim 5, wherein the uplink information further relating a number of layers of MIMO capabilities supported by the mobile station apparatus for the at least one frequency band in the frequency band combination, and the downlink information further relating the number of layers of MIMO capabilities supported by the mobile station apparatus for the each of one or more frequency bands in the frequency band combination.

7. A communication control method performed by a mobile station apparatus performing communication with a base station apparatus, the communication control method comprising:

communicating with the base station apparatus by using one or multiple component carriers; and transmitting, to the base station apparatus, mobile station apparatus capability information including first information, second information, uplink information, downlink information and mobile station apparatus category information, the first information relating whether the contiguous component carriers in a frequency band can be aggregated for uplink and downlink respectively and/or whether the non contiguous component carriers in a frequency band can be aggregated for uplink and downlink respectively and/or whether at least one component carrier in a frequency band and at least one component carrier in another frequency band can be aggregated for uplink and downlink respectively, the component carriers being supported by the mobile station apparatus the second information relating a combination of one or multiple frequency bands supported by the mobile station apparatus, the uplink information relating a number of the one or multiple component carriers for at least one frequency band in the frequency band combination and a frequency bandwidth that the component carriers are aggregated for at least one frequency band in the frequency band combination, the component carriers being supported by the mobile station apparatus, the downlink information relating the number of the one or multiple component carriers for each of one or more frequency bands in the frequency band combination and a frequency bandwidth that the component carriers are aggregated for each of one or more frequency bands in the frequency band combination, the component carriers being supported by the mobile station apparatus, the mobile station apparatus category information including a number of bits within a unit time supported by the mobile station apparatus.

8. The communication control method according to claim 7, wherein the uplink information further relating a number of layers of MIMO capabilities supported by the mobile station apparatus for the at least one frequency band in the frequency band combination, and the downlink information further relating the number of layers of MIMO capabilities supported by the mobile station apparatus for the each of one or more frequency bands in the frequency band combination.

9. An integrated circuit installed in a mobile station apparatus, the integrated circuit comprising a radio resource control generating unit and a transceiver unit, wherein the integrated circuit performs communication with a base station apparatus by using the communication control method according to claim 7.

10. A communication control method performed by a base station apparatus performing communication with a mobile station apparatus, the communication control method comprising:

communicating with the mobile station apparatus by using one or multiple component carriers, wherein frequency bandwidth of each component carrier is pre-established; and receiving, from the mobile station apparatus, mobile station apparatus capability information including first information, second information, uplink information, downlink information and mobile station apparatus category information, the first information relatin whether the conti uous com onent carriers in a fre uenc band can be aggregated for uplink and downlink respectively and/or whether the non contiguous component carriers in a frequency band can be aggregated for uplink and downlink respectively and/or whether at least one component carrier in a frequency band and at least one component carrier in another frequency band can be aggregated for uplink and downlink respectively, the component carriers being supported by the mobile station apparatus, the second information relating a combination of one or multiple frequency bands supported by the mobile station apparatus, the uplink information relating a number of the one or multiple component carriers for at least one frequency band in the frequency band combination and a frequency bandwidth that the component carriers are aggregated for at least one frequency band in the frequency band combination, the component carriers being supported by the mobile station apparatus, the downlink information relating the number of the one or multiple component carriers for each of one or more frequency bands in the frequency band combination and a frequency bandwidth that the component carriers are aggregated for each of one or more frequency bands in the frequency band combination, the component carriers being supported by the mobile station apparatus, the mobile station apparatus category information including a number of bits within a unit time supported by the mobile station apparatus, and allocating, to the mobile station apparatus, the one or multiple component carriers that is used in the communication, the allocation being made based on the mobile station apparatus capability information.

11. The communication control method according to claim 10, wherein the uplink information further relating a number of layers of MIMO capabilities supported by the mobile station apparatus for the at least one frequency band in the frequency band combination, and the downlink information further relating the number of layers of MIMO capabilities supported by the mobile station apparatus for the each of one or more frequency bands in the frequency band combination.

12. An integrated circuit installed in a mobile station apparatus, the integrated circuit comprising a radio resource control generating unit and a transceiver unit, wherein the integrated circuit performs communication with a base station apparatus by using the communication control method according to claim 10.

\* \* \* \* \*